United States Patent
Matsumura et al.

(10) Patent No.: US 9,467,841 B2
(45) Date of Patent: Oct. 11, 2016

(54) INFORMATION PROCESSING APPARATUS, WIRELESS COMMUNICATION APPARATUS, AND COMMUNICATION SYSTEM

(71) Applicant: Sony Corporation, Tokyo (JP)

(72) Inventors: Tomoaki Matsumura, Tokyo (JP); Katsutoshi Itoh, Tokyo (JP); Masanori Sato, Tokyo (JP); Tadashi Ehara, Kanagawa (JP); Shinji Takae, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/386,866

(22) PCT Filed: Feb. 28, 2013

(86) PCT No.: PCT/JP2013/055284
§ 371 (c)(1),
(2) Date: Sep. 22, 2014

(87) PCT Pub. No.: WO2013/146055
PCT Pub. Date: Oct. 3, 2013

(65) Prior Publication Data
US 2015/0056949 A1    Feb. 26, 2015

(30) Foreign Application Priority Data
Mar. 30, 2012  (JP) ................. 2012-079561

(51) Int. Cl.
*H04W 4/26*   (2009.01)
*H04M 15/00*  (2006.01)
*H04W 48/02*  (2009.01)

(52) U.S. Cl.
CPC .............. *H04W 4/26* (2013.01); *H04M 15/58* (2013.01); *H04M 15/61* (2013.01); *H04W 48/02* (2013.01)

(58) Field of Classification Search
CPC ...... H04M 3/38; H04M 3/365; H04M 15/58; H04M 15/61; H04W 4/24; H04W 4/26; H04W 48/02; H04W 48/08; H04W 48/16
USPC ......................................... 455/406, 407, 411
See application file for complete search history.

(56) References Cited

U.S. PATENT DOCUMENTS

| | | | |
|---|---|---|---|
| 8,644,255 B1* | 2/2014 | Burcham et al. | 370/331 |
| 2002/0183038 A1* | 12/2002 | Comstock et al. | 455/406 |
| 2004/0006512 A1* | 1/2004 | Rebsamen | 705/16 |
| 2008/0032728 A1* | 2/2008 | Patel et al. | 455/518 |
| 2008/0310608 A1* | 12/2008 | Johnson et al. | 379/112.01 |

FOREIGN PATENT DOCUMENTS

| | | |
|---|---|---|
| JP | 2004-192098 A | 7/2004 |
| JP | 2006-129323 A | 5/2006 |
| JP | 2006-203329 A | 8/2006 |

OTHER PUBLICATIONS

JP 2006-129323, published on May 18, 2006.*
No Author Listed, Feasibility study on the security aspects of remote provisioning and change of subscription for machine to machine (M2M) equipment. 3rd Generation Partnership Project Technical Report. Jun. 2010:1-59.

* cited by examiner

*Primary Examiner* — Siu Lee
(74) *Attorney, Agent, or Firm* — Chip Law Group

(57) ABSTRACT

An appropriate communication service is provided in response to usage of a user.
The information processing apparatus includes a control unit and a recording unit. The control unit is configured to perform control so as to give a wireless communication apparatus a connection credit for connecting to a predetermined network using a wireless communication, wherein the connection credit is used to provide a particular service. The recording unit is configured to record a usage history of a service other than a particular service by the wireless communication apparatus connecting to the network using the given connection credit.

14 Claims, 33 Drawing Sheets

FIG. 1
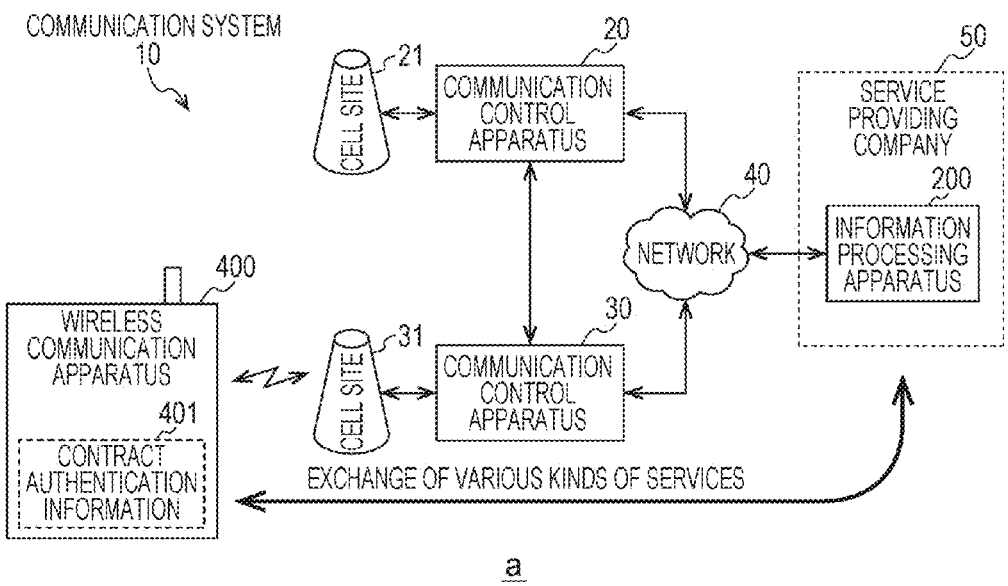
a
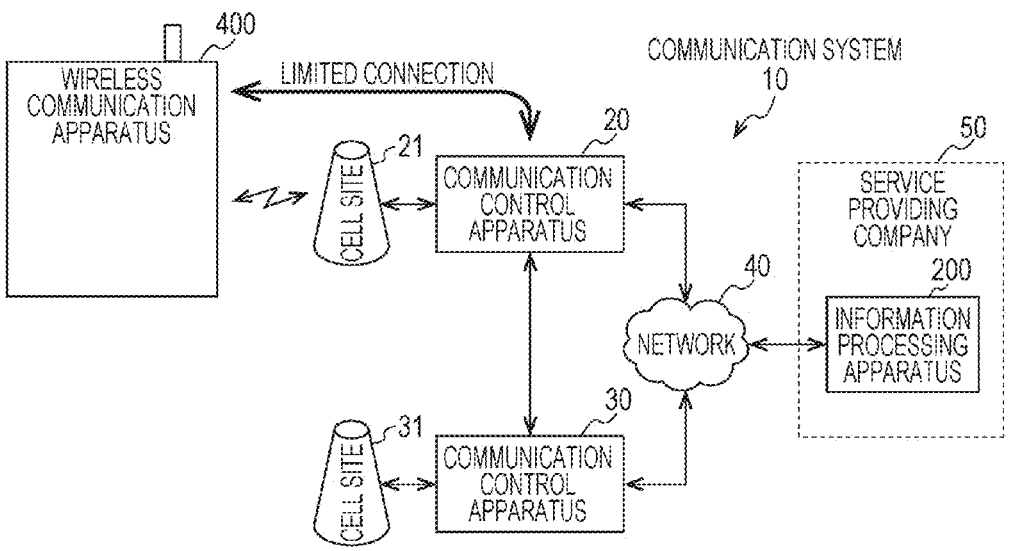
b

FIG. 4

SERVICE MANAGEMENT DATABASE
240

| | 241<br>USER ID | 242<br>PASSWORD | 243<br>TERMINAL IDENTIFICATION INFORMATION | 244<br>USAGE HISTORY INFORMATION |
|---|---|---|---|---|
| 1 | Y1452 | P2233 | AAAA | ... |
| 2 | Y5432 | P5768 | BBBB | ... |
| 3 | Y5678 | P8907 | CCCC | ... |
| ⋮ | ⋮ | ⋮ | ⋮ | ⋮ |

FIG. 6

COMMUNICATION CONTROL CONDITION DATABASE
330

| SERVICE ID (331) | SERVICE NAME (332) | SERVICE PROVIDER (333) | PARTICULAR SERVICE (URL or IP) (334) | MAXIMUM COMMUNICATION SPEED (335) | COMMUNICATION PERMISSION FOR SERVICE OTHER THAN DESIGNATED SERVICE (336) | USER CHARGE FOR AMOUNT OF COMMUNICATION OF SERVICE OTHER THAN DESIGNATED SERVICE (337) | FREE-OF-CHARGE COMMUNICATION PERMISSION AMOUNT FOR SERVICE OTHER THAN DESIGNATED SERVICE (338) | USER BORNE RATIO OF AMOUNT OF COMMUNICATION FOR SERVICE OTHER THAN DESIGNATED SERVICE (339) |
|---|---|---|---|---|---|---|---|---|
| 1234 | PROVIDING MOVIES | FIRST COMPANY | http://○○ | 1Mbps | NOT PERMITTED | — | — | — |
| 1235 | PROVIDING GAMES | SECOND COMPANY | http://△○ | 512Kbps | PERMITTED | NO | — | 0% |
| 1236 | PROVIDING GAMES | THIRD COMPANY | http://○▽ | 512Kbps | PERMITTED | NO | 50MByte | 0% |
| 1237 | PROVIDING GAMES | FOURTH COMPANY | http://△□ | 512Kbps | PERMITTED | YES | — | — |
| 1238 | PROVIDING GAMES | FIFTH COMPANY | http://□▽ | 512Kbps | PERMITTED | YES | — | 100% |
| 1239 | SHOPPING SITE | SIXTH COMPANY | http://▽▽ | 512Kbps | PERMITTED | NO | 50MByte | 0% |
| 1240 | PROVIDING MUSIC | SEVENTH COMPANY | http://△▽ | 512Kbps | PERMITTED | YES | — | — |
| 1241 | PROVIDING ELECTRONIC BOOKS | EIGHTH COMPANY | http://□□ | 512Kbps | PERMITTED | YES | — | 100% |
| ⋮ | ⋮ | ⋮ | ⋮ | ⋮ | ⋮ | ⋮ | ⋮ | ⋮ |

FIG. 7

DEVICE MANAGEMENT DATABASE
340

| | 341 | 342 | 343 | 344 | 345 |
|---|---|---|---|---|---|
| | USER ID | TERMINAL IDENTIFICATION INFORMATION | COMMUNICATION EXPENSE | CONTRACT AUTHENTICATION INFORMATION IDENTIFICATION INFORMATION | GIVING TIME |
| 1 | Y1452 | AAAA | ¥ 10,000 | 1 | 00:23:56 |
| 2 | Y5432 | BBBB | ¥ 20,000 | 2 | 00:09:57 |
| 3 | Y5678 | CCCC | ¥ 15,000 | 3 | 00:07:17 |
| ⋮ | ⋮ | ⋮ | ⋮ | ⋮ | ⋮ |

FIG. 8

COMMUNICATION AMOUNT MANAGEMENT DATABASE
350

| OPERATION ID (351) | TERMINAL IDENTIFICATION INFORMATION (352) | SERVICE ID (353) | SERVICE START TIME (354) | SERVICE END TIME (355) | PARTICULAR SERVICE COMMUNICATION AMOUNT (356) | NON-PARTICULAR SERVICE COMMUNICATION AMOUNT (357) |
|---|---|---|---|---|---|---|
| 135241123 | AAAA | 1236 | 2012/3/16 8:58PM | 2012/3/16 10:59PM | 18MByte | 50MByte |
| 135241124 | BBBB | 1235 | 2012/3/16 7:38PM | 2012/3/16 8:33PM | 100MByte | 100MByte |
| 135241125 | CCCC | 1236 | 2012/3/14 10:50PM | 2012/3/14 11:30PM | 1GByte | 3GByte |
| 135241126 | DDDD | 1237 | 2012/3/16 8:56PM | 2012/3/16 9:36PM | 100MByte | 50Mbyte |
| 135241127 | EEEE | 1234 | 2012/3/16 8:26PM | 2012/3/16 10:23PM | 200MByte | 0Mbyte |

FIG. 11
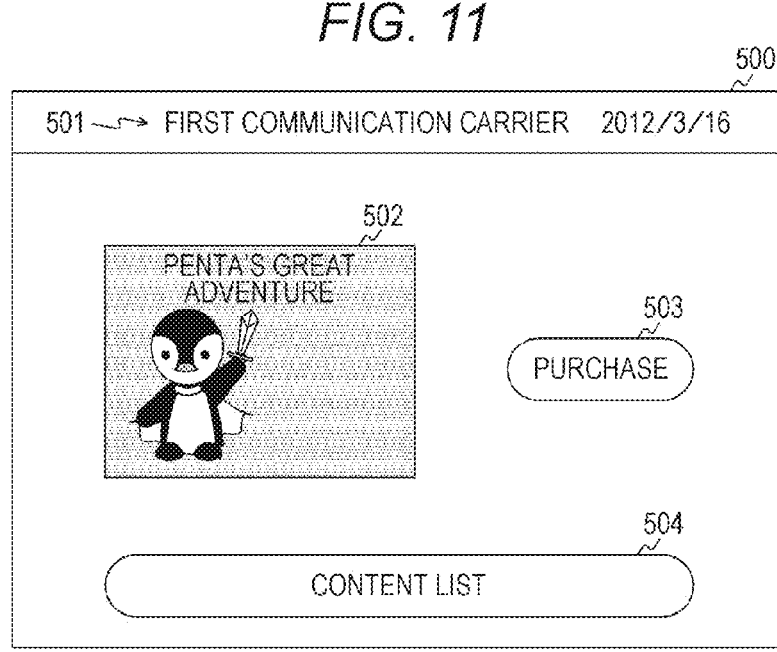
a
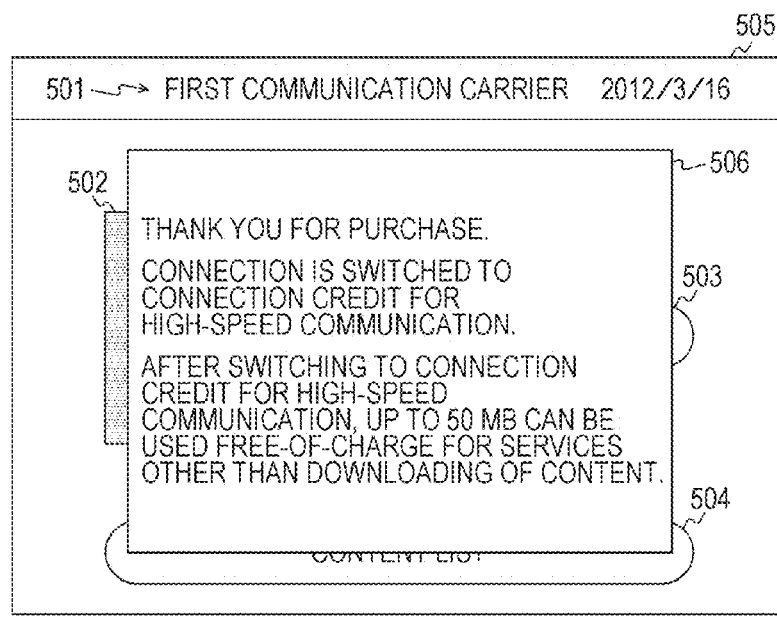
b

FIG. 12
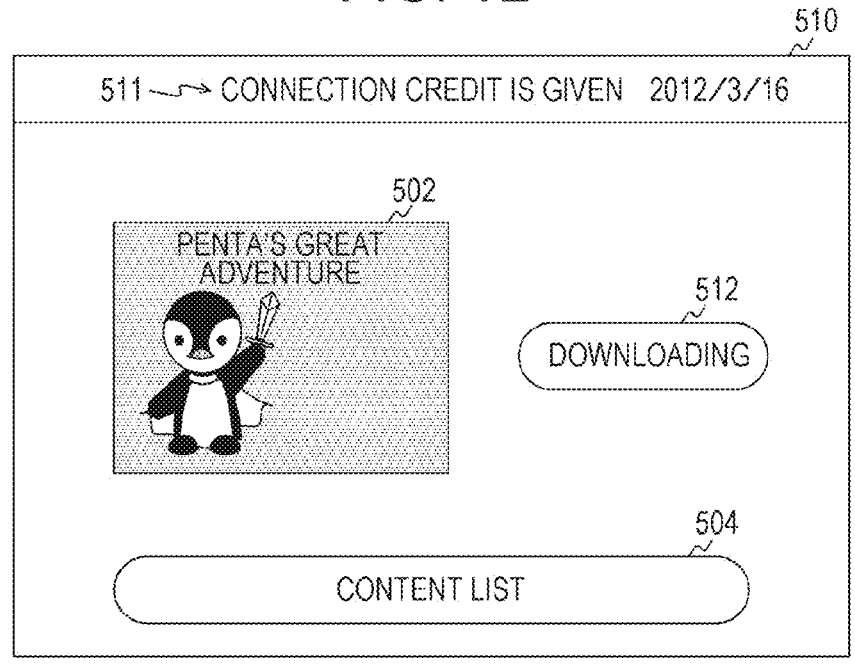
a
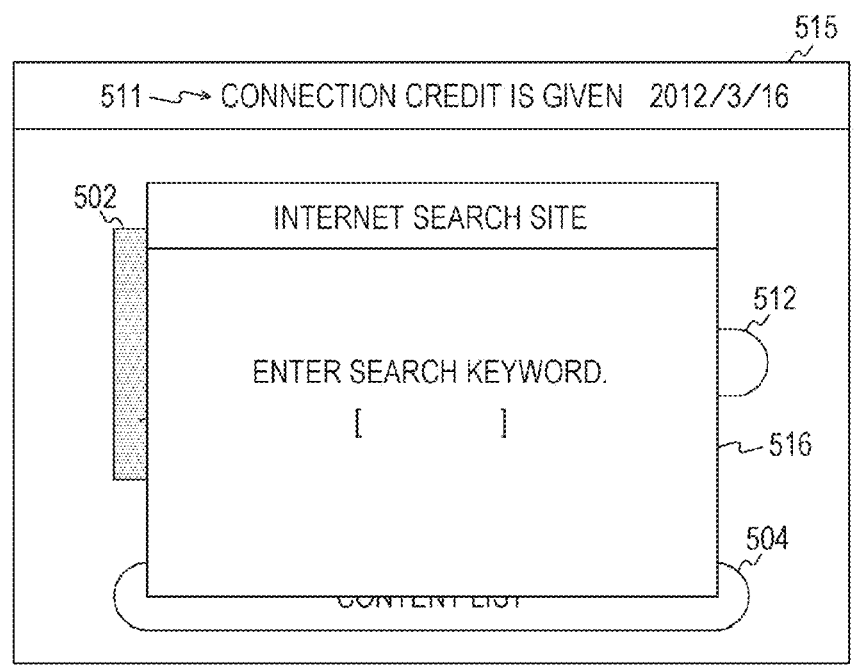
b

FIG. 13
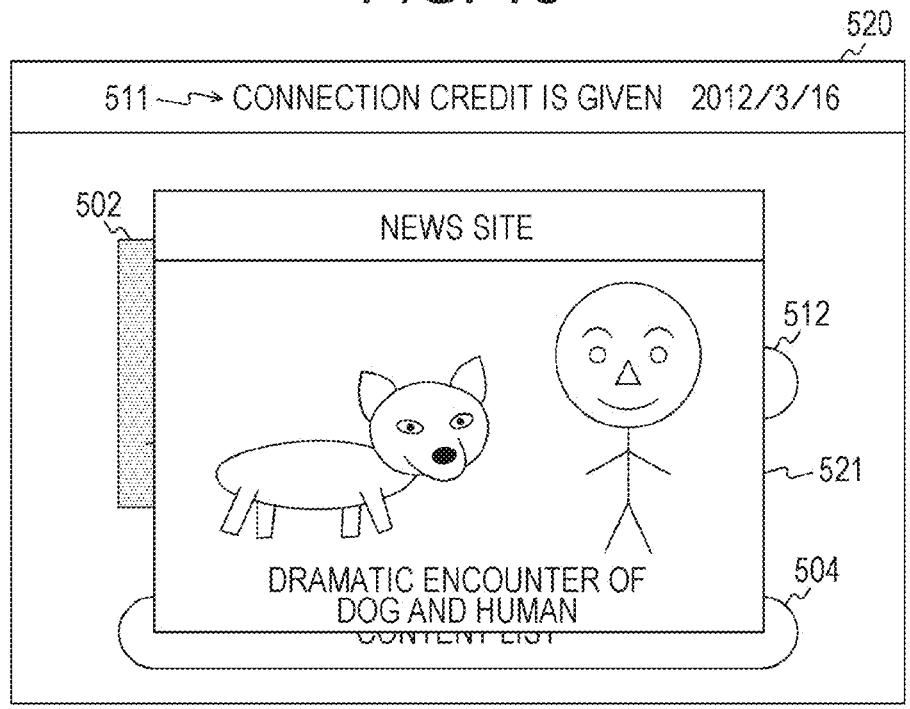
a
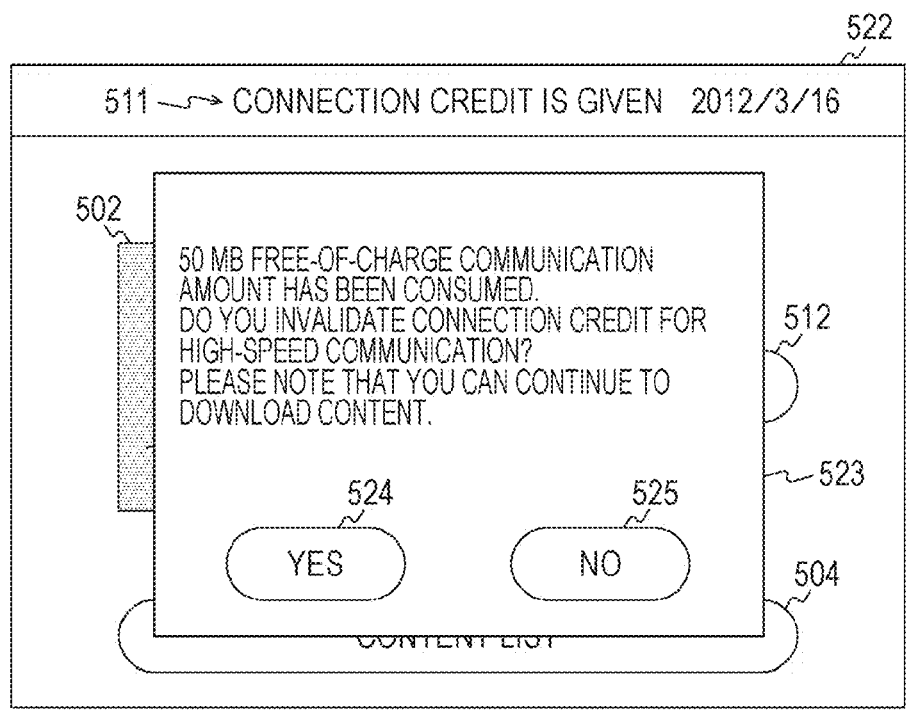
b

FIG. 14
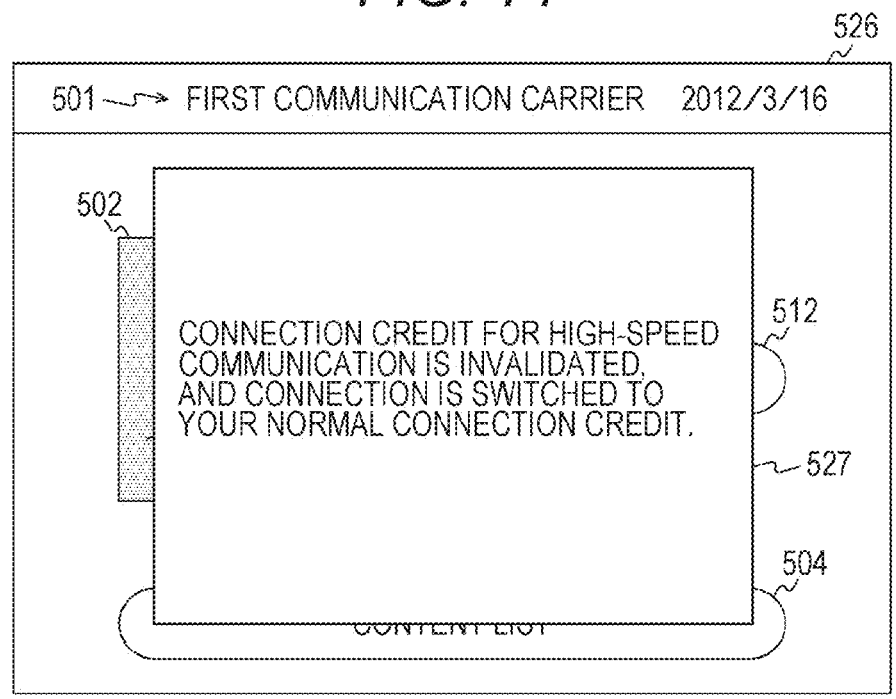
a
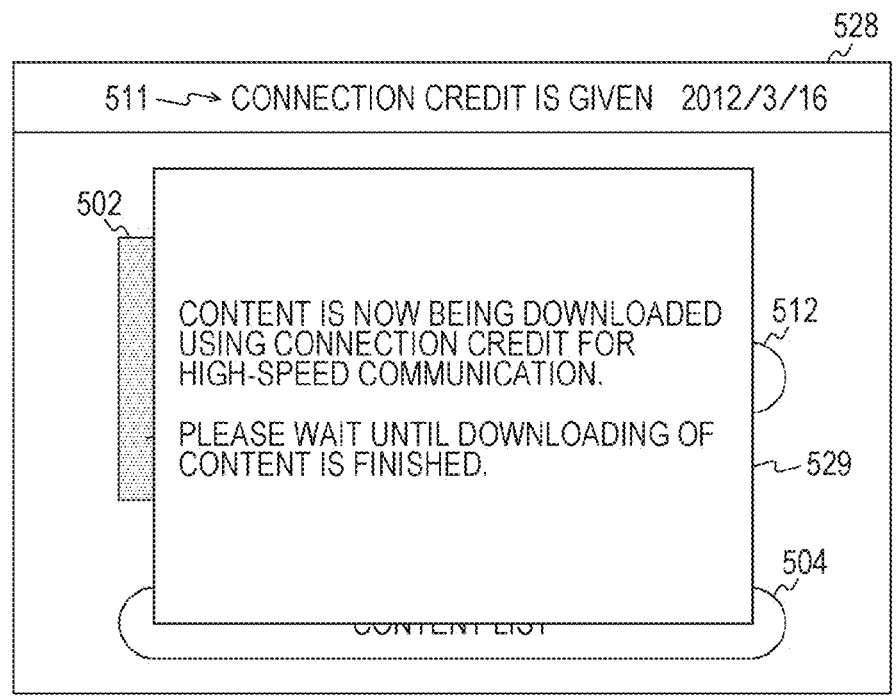
b

*FIG. 20*
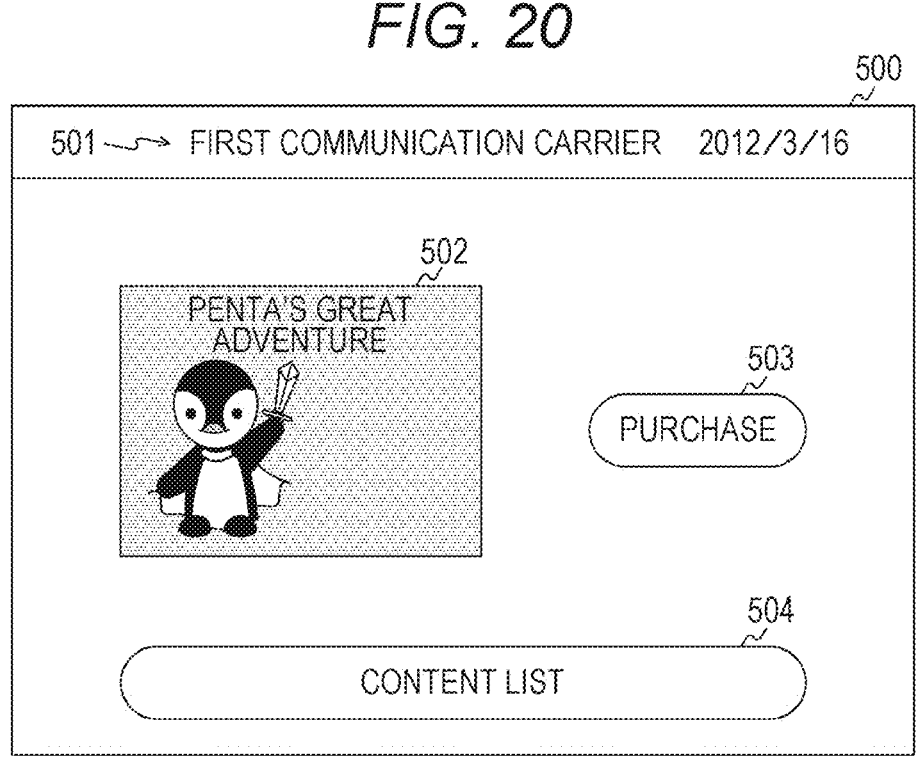
a
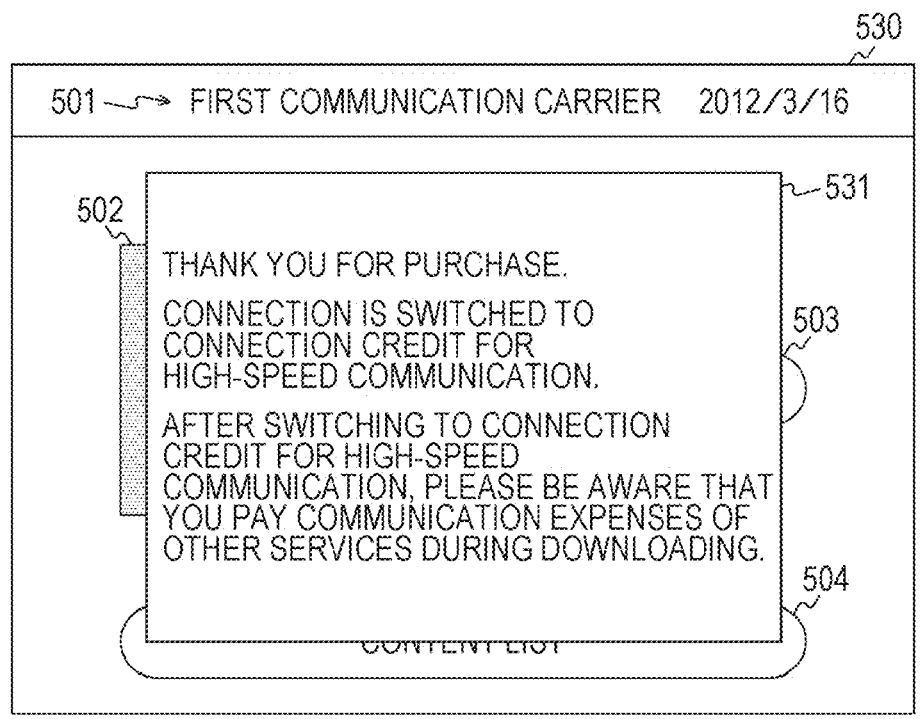
b

FIG. 21
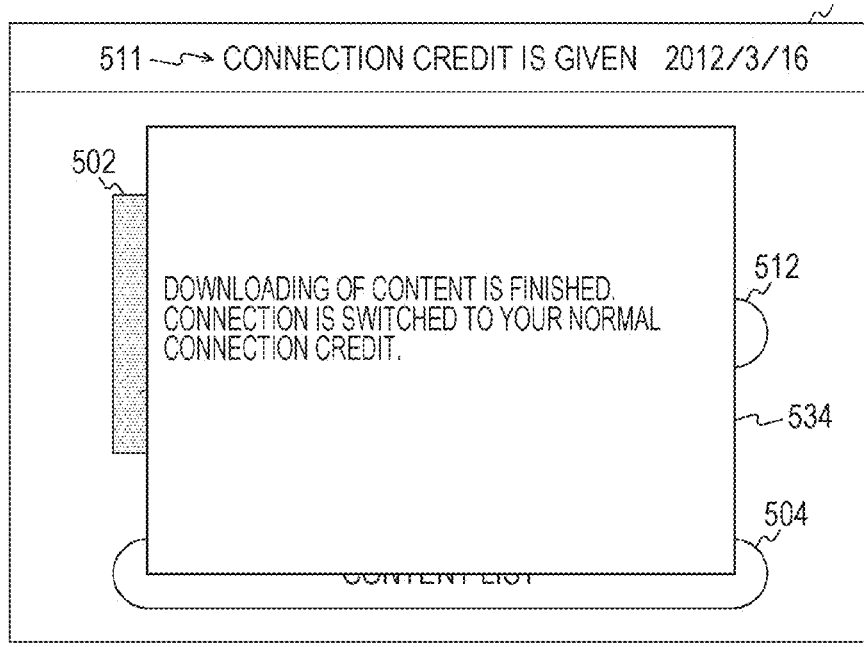
a
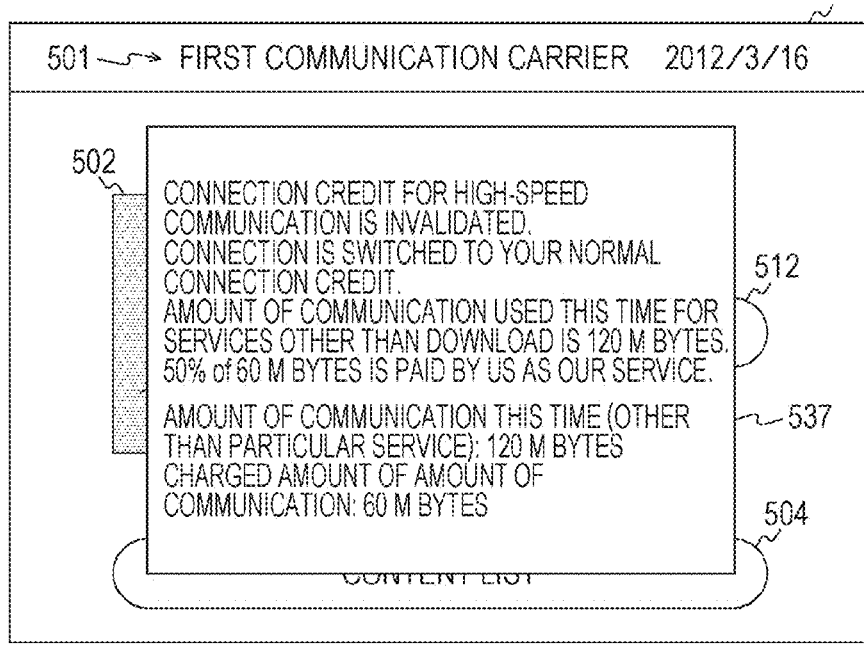
b

FIG. 22 EXAMPLE OF OPERATION OF COMMUNICATION CONTROL APPARATUS (FIRST COMMUNICATION CARRIER)

FIG. 23
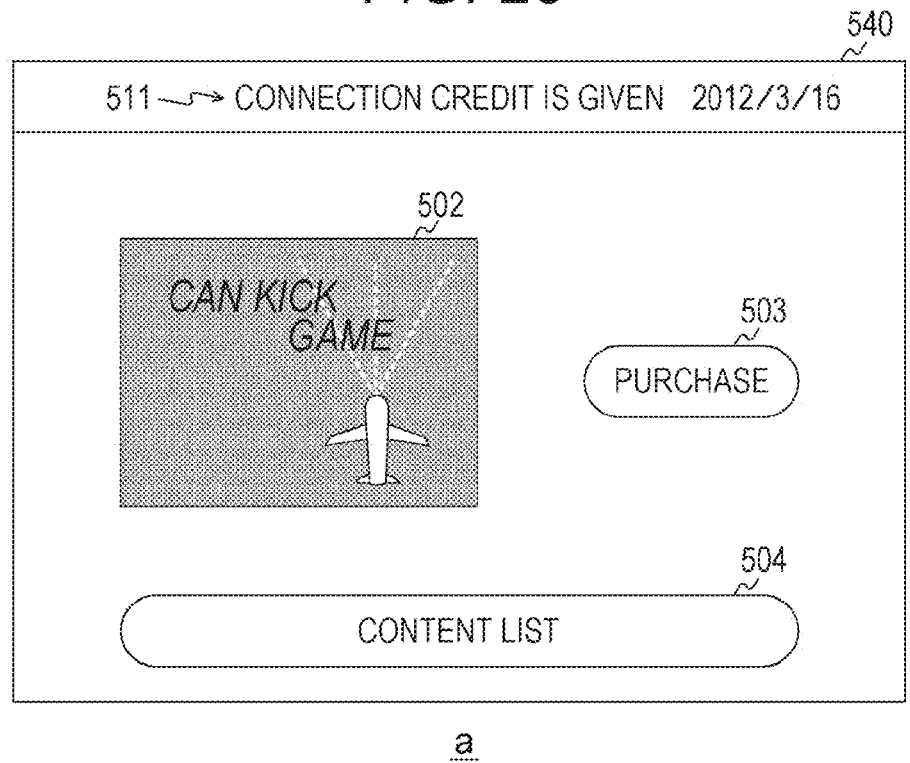
a
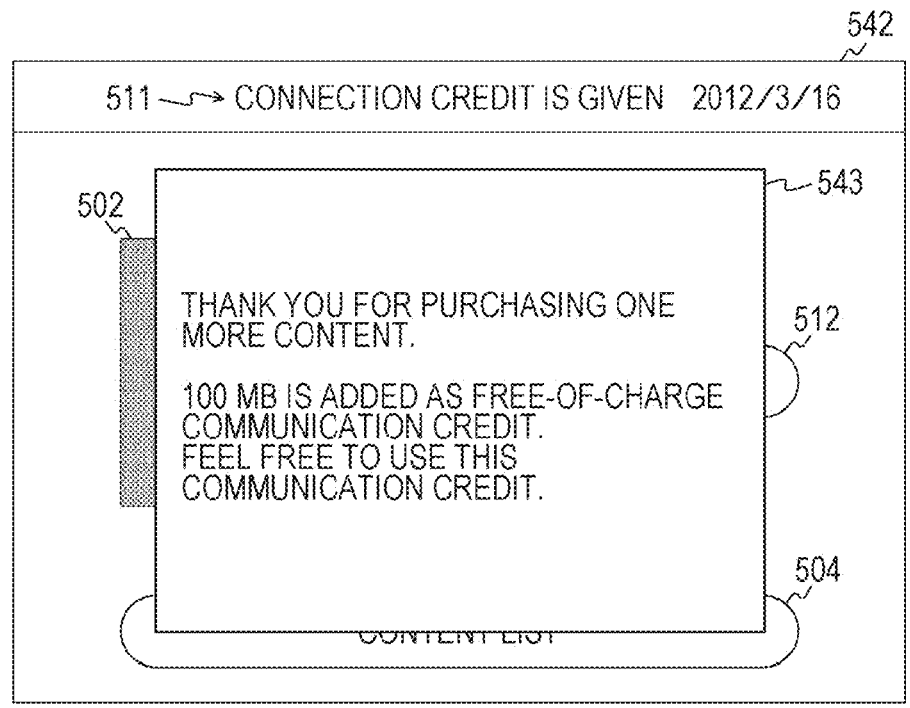
b

FIG. 25
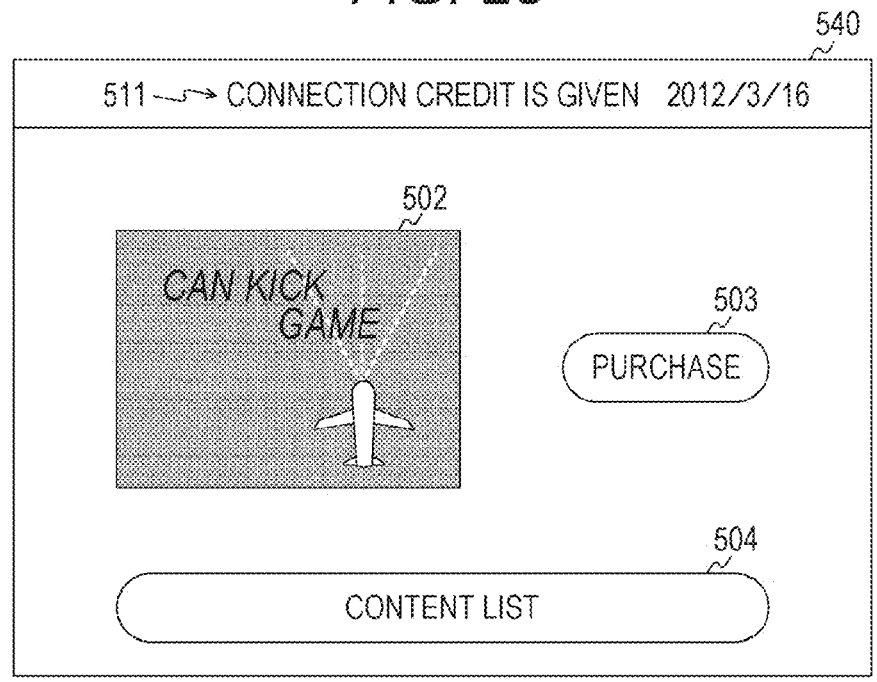
a
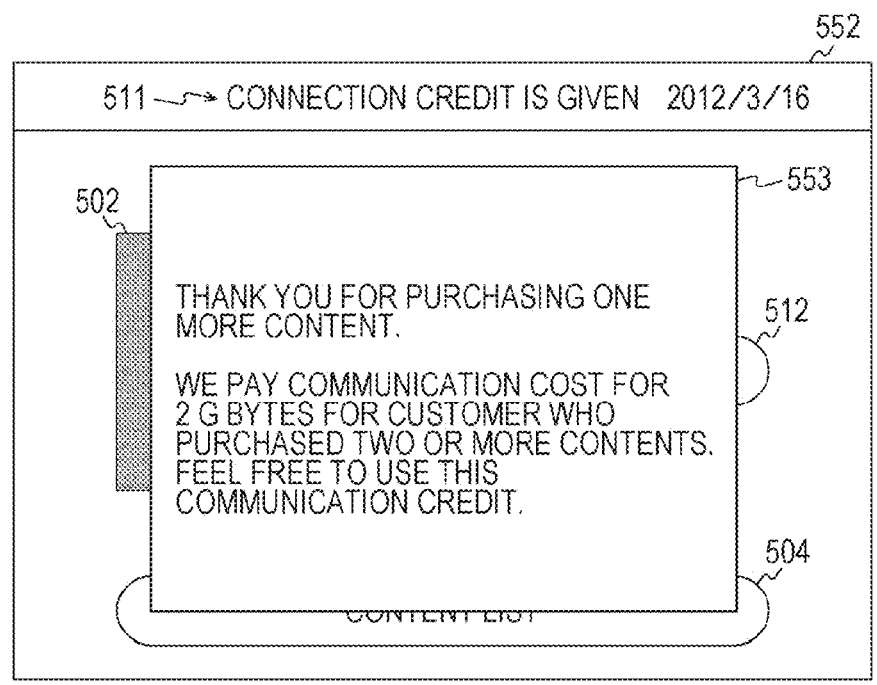
b

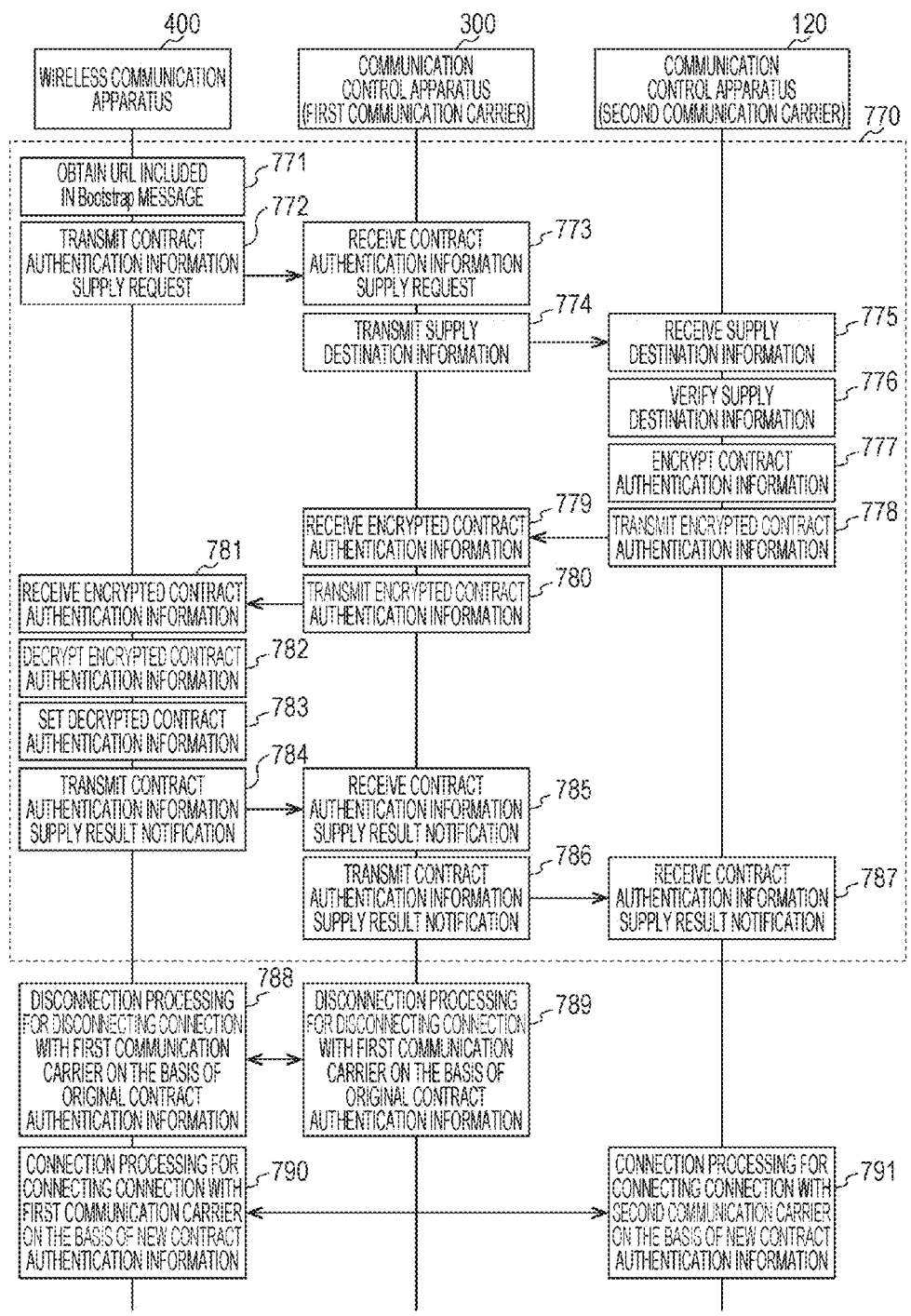

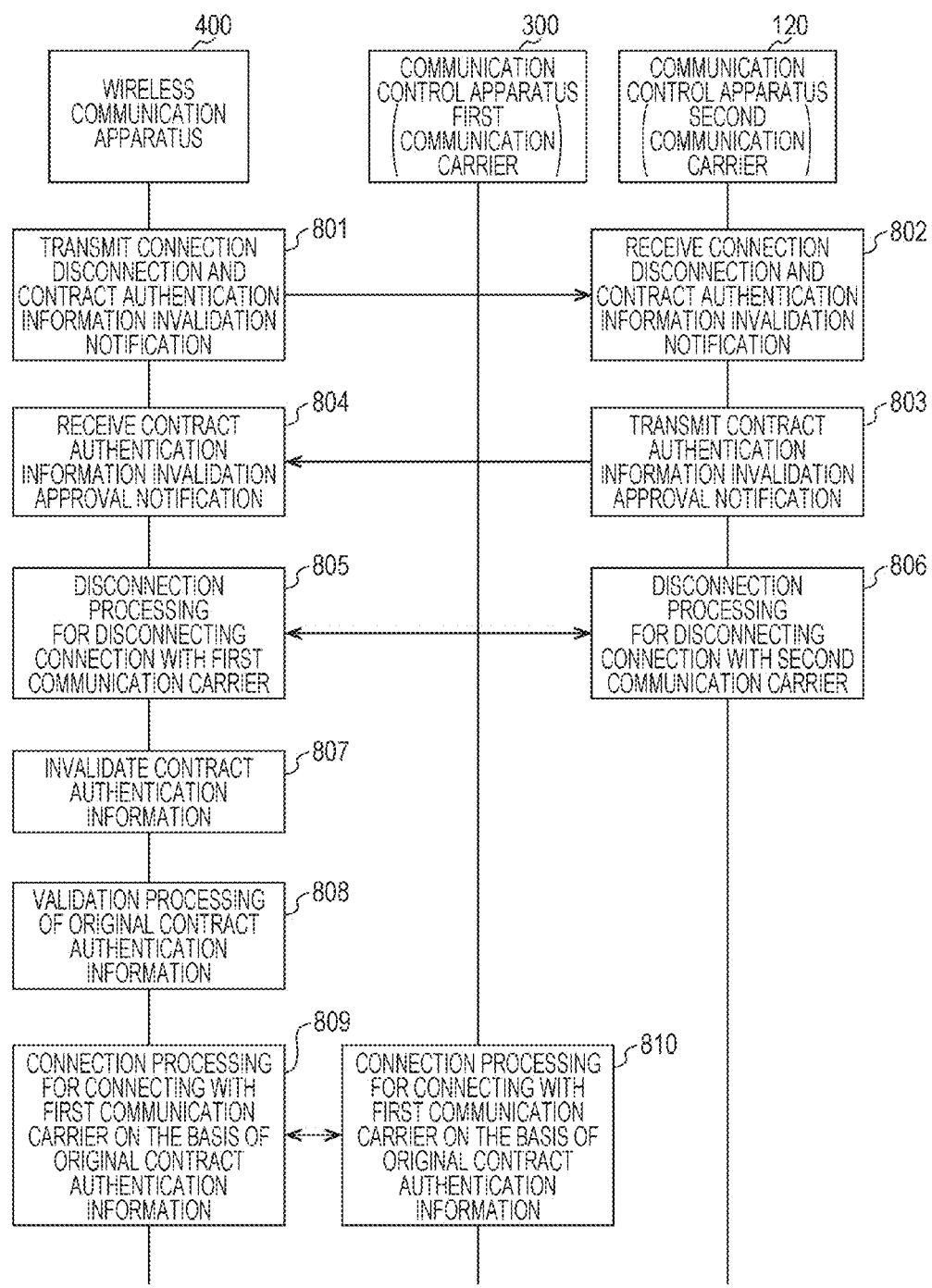

INFORMATION PROCESSING APPARATUS, WIRELESS COMMUNICATION APPARATUS, AND COMMUNICATION SYSTEM

TECHNICAL FIELD

The present technique relates to an information processing apparatus. More particularly, the present technique relates to an information processing apparatus, a wireless communication apparatus, and a communication system connected to a network.

BACKGROUND ART

Currently, expansion of function is considered by 3GPP (3rd Generation Partnership Project) which defined the technical specification of public wireless communication network (for example, see Non-Patent Document 1).

According to this expansion of function (which is called Machine to Machine Equipment), information indicating availability of services can be used in a flexible manner. This information indicating availability of services is contract authentication information (for example, rewritable connection credit). For example, this enables contract authentication information to be downloaded from a network, stopped temporarily, or resumed.

Currently, the contract authentication information needs to be saved in a physical device in an SIM (Subscriber Identity Module) card. However, when the contract authentication information is treated as software, the method for saving the contract authentication information can be more flexible.

CITATION LIST

Patent Document

Non-Patent Document 1: 3GPP TR 33.812 V9.2.0 (2010-06)

SUMMARY OF THE INVENTION

Problems to be Solved by the Invention

When the expansion of function explained above is used, methods of using the contract authentication information which are different from those in the past may be considered.

For example, when a wireless communication apparatus possessed by a user can easily receive desired communication service from a company which provides various kinds of communication services, it would be very convenient for the user. This in turn helps the company to increase the opportunity of providing various kinds of communication services.

The present technique is made in view of such circumstances, and it is an object of the present technique to provide communication services appropriate for the usage of the user.

Solutions to Problems

The present technique was made to solve the above problem, and a first aspect thereof is an information processing apparatus including: a control unit configured to perform control so as to give a wireless communication apparatus a connection credit for connecting to a predetermined network using a wireless communication, wherein the connection credit is used to provide a particular service; and a recording unit configured to record a usage history of a service other than a particular service by the wireless communication apparatus connecting to the network using the given connection credit. Therefore, this causes the effect that the connection credit used to provide the particular service is given to the wireless communication apparatus, and the usage history of the services other than the particular service by the wireless communication apparatus making a connection using this given connection credit is recorded.

Further, in the first aspect, the recording unit may record, as the usage history, an amount of communication of the service other than the particular service. Therefore, this causes the effect that the amount of communication of the services other than the particular service is recorded.

Further, in the first aspect, when the recorded amount of communication is more than a reference value, the control unit may perform control so as to invalidate the given connection credit. Therefore, this causes the effect that, when the amount of communication recorded is more than the reference value, the given connection credit is invalidated.

Further, in the first aspect, when the recorded amount of communication is more than a reference value, the control unit may perform control so as to switch from the given connection credit to an original connection credit. Therefore, this causes the effect that, when the amount of communication recorded is more than the reference value, switching is performed to change from the given connection credit to the original connection credit.

Further, in the first aspect, when the recorded amount of communication is more than a reference value, the control unit may permit only use of the particular service as communication using the given connection credit. Therefore, this causes the effect that, when the amount of communication recorded is more than the reference value, only the use of the particular service is permitted as communication using the given connection credit.

Further, in the first aspect, the control unit may perform control so as to change the reference value on the basis of the usage history of the particular service. Therefore, this causes the effect that, the reference value is changed on the basis of the usage history of the particular service.

Further, in the first aspect, when the reference value is changed, the control unit may perform control so as to cause the wireless communication apparatus to output information indicating that the reference value is changed. Therefore, this causes the effect that, when the reference value is changed, the wireless communication apparatus is caused to output information indicating that the reference value is changed.

Further, in the first aspect, the control unit may perform charge processing for charging the wireless communication apparatus on the basis of the usage history. Therefore, this causes the effect that the charge processing for charging the wireless communication apparatus is performed on the basis of the usage history.

Further, in the first aspect, the recording unit may distinguish a usage history of the particular service and a usage history of the service other than the particular service, and record the usage history of the particular service and the usage history of the service other than the particular service, and the control unit may perform the charge processing for charging the wireless communication apparatus on the basis of the usage history of the particular service and the usage history of the service other than the particular service. Therefore, this causes the effect that the charge processing for charging the wireless communication apparatus is performed on the basis of the usage history of the particular service and the usage history of the services other than the particular service.

Further, in the first aspect, the control unit may perform the charge processing for charging a service provider providing the particular service and the wireless communication apparatus on the basis of relationship of the usage history of the particular service and the usage history of the service other than the particular service. Therefore, this causes the effect that the charge processing for charging the wireless communication apparatus and the service provider is performed on the basis of the relationship between the usage history of the particular service and the usage history of the services other than the particular service.

Further, in the first aspect, the control unit may perform the charge processing for charging the service provider and the wireless communication apparatus in accordance with a borne ratio determined by the service provider on the basis of the relationship of the usage history of the particular service and the usage history of the service other than the particular service. Therefore, this causes the effect that the charge processing for charging the wireless communication apparatus and the service provider is performed according to the borne ratio determined by the service provider on the basis of the relationship between the usage history of the particular service and the usage history of the services other than the particular service.

Further, in the first aspect, the information processing apparatus further includes a management unit configured to manage a predetermined condition for use of the service other than the particular service, wherein the control unit may determine whether use of the service other than the particular service is allowed as communication using the given connection credit on the basis of the predetermined condition. Therefore, this causes the effect that the determination is made as to whether the use of the services other than the particular service is permitted as communication using the given connection credit on the basis of the predetermined condition.

Further, a second aspect of the present technique is an information processing apparatus including: a control unit configured to perform control so as to give a wireless communication apparatus a connection credit for connecting to a predetermined network using a wireless communication, wherein the connection credit is used to provide a particular service; and a generation unit configured to generate charge information for charging the wireless communication apparatus on the basis of a usage history of a service other than a particular service and a usage history of the particular service by the wireless communication apparatus connecting to the network using the given connection credit. Therefore, this causes the effect that the connection credit used to provide the particular service is given to the wireless communication apparatus, and the charge information about the wireless communication apparatus making a connection using this given connection credit is generated on the basis of the usage history of the services other than the particular service and the usage history of the particular service.

Further, a third aspect of the present technique is a wireless communication apparatus including: a communication control unit configured to perform control so as to request giving a connection credit for connecting to a predetermined network using a wireless communication, wherein the connection credit is used to provide a particular service; and a display control unit, wherein when a connection credit given in response to the request is used to connect to the network, and the particular service and the service other than the particular service are used, the display control unit displays information indicating that a predetermined condition about use of the service other than the particular service is changed in accordance with use of the particular service. Therefore, this causes the effect that, when the connection credit used for usage of the particular service is requested, and the particular service and the services other than the particular service are used by connecting to the network using the connection credit given in response to this request, information indicating that the predetermined condition about the usage of the services other than the particular service is changed is displayed in accordance with the usage of the particular service.

Further, a fourth aspect of the present technique is a communication system including: a wireless communication apparatus configured to request giving a connection credit for connecting to a predetermined network using a wireless communication, wherein the connection credit is used to provide a particular service; and an information processing apparatus including a control unit configured to perform control so as to give a wireless communication apparatus the connection credit, and a recording unit configured to record a usage history of a service other than a particular service by the wireless communication apparatus connecting to the network using the given connection credit. Therefore, this causes the effect that the connection credit used to provide the particular service is given to the wireless communication apparatus, and the usage history about the services other than the particular service by the wireless communication apparatus making a connection using this given connection credit is recorded.

Effects of the Invention

According to the present technique, advantageous effects of providing communication services appropriate for the usage of the user can be achieved.

BRIEF DESCRIPTION OF DRAWINGS

FIGS. 1a and 1b are block diagrams illustrating an example of a system configuration of a communication system 10 according to a first embodiment of the present technique.

FIG. 4 is a figure schematically illustrating a service management database 240 according to the first embodiment of the present technique.

FIG. 6 is a figure schematically illustrating a communication control condition database 330 according to the first embodiment of the present technique.

FIG. 7 is a figure schematically illustrating a device management database 340 according to the first embodiment of the present technique.

FIG. 8 is a figure schematically illustrating a communication amount management database 350 according to the first embodiment of the present technique.

FIGS. 11a and 11b are figures illustrating an example of a display screen displayed on a display unit 470 of the wireless communication apparatus 400 according to the first embodiment of the present technique.

FIGS. 12a and 12b are figures illustrating an example of a display screen displayed on the display unit 470 of the wireless communication apparatus 400 according to the first embodiment of the present technique.

FIGS. 13a and 13b are figures illustrating an example of a display screen displayed on the display unit 470 of the wireless communication apparatus 400 according to the first embodiment of the present technique.

FIGS. 14a and 14b are figures illustrating an example of a display screen displayed on the display unit 470 of the wireless communication apparatus 400 according to the first embodiment of the present technique.

FIGS. 20a and 20b are figures illustrating an example of a display screen displayed on the display unit 470 of the wireless communication apparatus 400 according to the second embodiment of the present technique.

FIGS. 21a and 21b are figures illustrating an example of a display screen displayed on the display unit 470 of the wireless communication apparatus 400 according to the second embodiment of the present technique.

FIGS. 23a and 23b are figures illustrating an example of a display screen displayed on the display unit 470 of the wireless communication apparatus 400 according to a third embodiment of the present technique.

FIGS. 25a and 25b are figures illustrating an example of a display screen displayed on the display unit 470 of the wireless communication apparatus 400 according to the third embodiment of the present technique.

FIG. 32 is a sequence chart illustrating an example of communication processing between devices constituting the communication system 100 according to the fourth embodiment of the present technique.

FIG. 33 is a sequence chart illustrating an example of communication processing between devices constituting the communication system 100 according to the fourth embodiment of the present technique.

MODE FOR CARRYING OUT THE INVENTION

Figure 2:
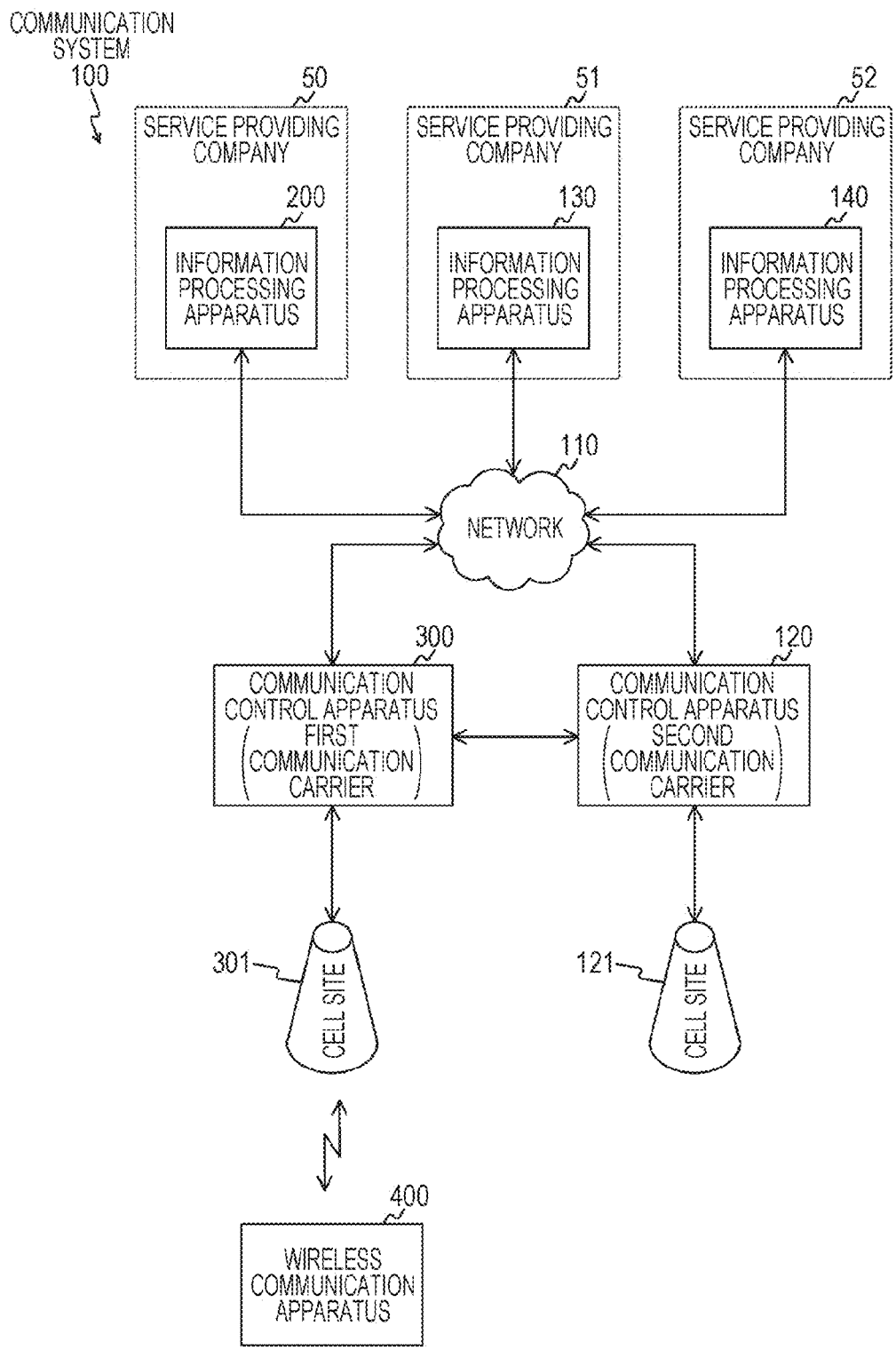
FIG. 2 is a block diagram illustrating an example of a system configuration of a communication system 100 according to the first embodiment of the present technique.

Modes for carrying out the present technique (hereinafter referred to as embodiments) will be hereinafter explained. The explanation will be given in the following order.

1. First embodiment (connection credit giving control: example where connection credit given only for use of particular service is allowed to be usable for another service for the predetermined amount of communication)

2. Second embodiment (connection credit giving control: example where communication expense of the given connection credit for the use of the another service is born by a service provider and a user)

3. Third embodiment (connection credit giving control: example where communication expense of the given connection credit for the use of the another service is increased or decreased in accordance with user's communication history)

4. Fourth embodiment (connection credit giving control: example where connection credit is given by communication carrier different from communication carrier related to original connection credit)

1. First Embodiment

[Example of Configuration of Communication System]

FIGS. 1a and 1b are block diagrams illustrating an example of a system configuration of a communication system 10 according to the first embodiment of the present technique.

FIGS. 1a and 1b show a example of configuration of a communication system based on the assumption of a network configuration including a communication control apparatus 30 to which only a wireless communication apparatus holding effective contract authentication information can connect, and a communication control apparatus 20 to which even a wireless communication apparatus not holding effective contract authentication information can connect.

FIG. 1a illustrates an example of wireless communication in a case where a wireless communication apparatus 400 holds effective contract authentication information 401. FIG. 1b illustrates an example of wireless communication in a case where the wireless communication apparatus 400 does not hold the effective contract authentication information 401.

In this case, the contract authentication information is, for example, information including telephone subscriber (Subscriber) information and authentication key (Authentication) information, and information for setting a rewritable connection credit. The contract authentication information is not limited to, for example, a particular communication carrier when a device is purchased (for example, cellular phone company), and is contract authentication information (so-called software SIM) with which a communication carrier can be set flexibly after the purchase. When the contract authentication information is rewritten from the network, the sales of a cellular phone device and the selection of a communication carrier can be easily separated from each other, and further, the contract authentication information can be easily shared by multiple wireless communication apparatuses. Not having any contract authentication information means, for example, a case where a device does not have any contract authentication information itself, or a case where a device has only contract authentication information which has been invalidated by invalidation processing of contract authentication information. The contract authentication information corresponds to, for example, MCIM (Machine Communication Identity Module) (for example, see Non-Patent Document 1). The contract authentication information is also referred to as, for example, software downloadable SIM (Subscriber Identity Module).

For example, holding the effective contract authentication information may also be recognized as a case of having a connection credit (rewritable connection credit) for connecting to the network 40 via wireless communication. More specifically, the connection credit is the right to connect to a cell site on the basis of contract authentication information for connecting to the cell site which is run by the communication carrier.

The communication system 10 includes communication control apparatuses 20, 30, cell sites 21, 31, a network 40, an information processing apparatus 200, and a wireless communication apparatus 400.

In this case, the communication control apparatus 20 and the communication control apparatus 30 indicate logical roles, and are considered to be run by different companies but may also be considered to be run by the same company. Alternatively, there may be multiple communication control apparatuses 20 and multiple communication control apparatuses 30. Each of the communication control apparatus 20 and the communication control apparatus 30 may be integrally constituted as information processing apparatuses, or may be constituted by multiple apparatuses. In this case, the communication control apparatus 20 and the communication control apparatus 30 mean relative roles in a case where a wireless communication apparatus having effective contract authentication information is adopted as a reference. For this reason, an apparatus may correspond to the communication control apparatus 20 with regard to any given wireless communication apparatus, but the same apparatus may correspond to the communication control apparatus 30 with regard to other wireless communication apparatuses.

It should be noted that the communication control apparatus 20 corresponds to, for example, RO (Registration Operator), and the communication control apparatus 30 corresponds to, for example, SHO (Selected Home Operator) (for example, see Non-Patent Document 1). More specifically, the communication system including the communication control apparatus 20 and the communication control apparatus 30 corresponds to, for example, a communication system based on a network configuration including SHO and RO (for example, see Non-Patent Document 1).

The wireless communication apparatus 400 is, for example, a cellular phone apparatus (for example, a smartphone having not only voice call function but also data communication function). The wireless communication apparatus 400 is an example of an information processing apparatus capable of using a software downloadable SIM. This can also be applied to other wireless communication apparatuses capable of using software downloadable SIMs. For example, this can be applied to an image-capturing apparatus having a wireless communication function (for example, a digital still camera, a digital video camera (for example, a camera-integrated recorder) and a sound output apparatus having a wireless communication function (for example, a portable music player). This may also be applied to a display apparatus having a wireless communication function (for example, a digital photo frame) and an electronic book display apparatus having a wireless communication function. For example, this may also be applied to an information processing apparatus capable of wirelessly communicating by attaching a wireless communication device having a wireless communication function (for example, a personal computer not having any wireless communication function).

As shown in FIG. 1a, when the wireless communication apparatus 400 has the effective contract authentication information 401, the wireless communication apparatus 400 can connect to the communication control apparatus 30 via a cell site 31 on the basis of the contract authentication information 401. In contrast, as shown in FIG. 1b, when the wireless communication apparatus 400 does not have the effective contract authentication information 401, the wireless communication apparatus 400 cannot connect to the communication control apparatus 30. In this case, however, the wireless communication apparatus 400 can connect to the communication control apparatus 20 via a cell site 21 on the basis of a PCID (Provisional Connectivity Identity).

In this case, the PCID is an identifier for connecting to the communication control apparatus 20, and the PCIDs given to all the wireless communication apparatuses (devices) having the mechanism of the software downloadable SIM.

The network 40 is a network such as a telephone network and the Internet (for example, public circuit network). The network 40 and the communication control apparatus 30 are connected via a gateway (not shown). Likewise, the network 40 and the communication control apparatus 20 are connected via a gateway (not shown).

Figure 5:
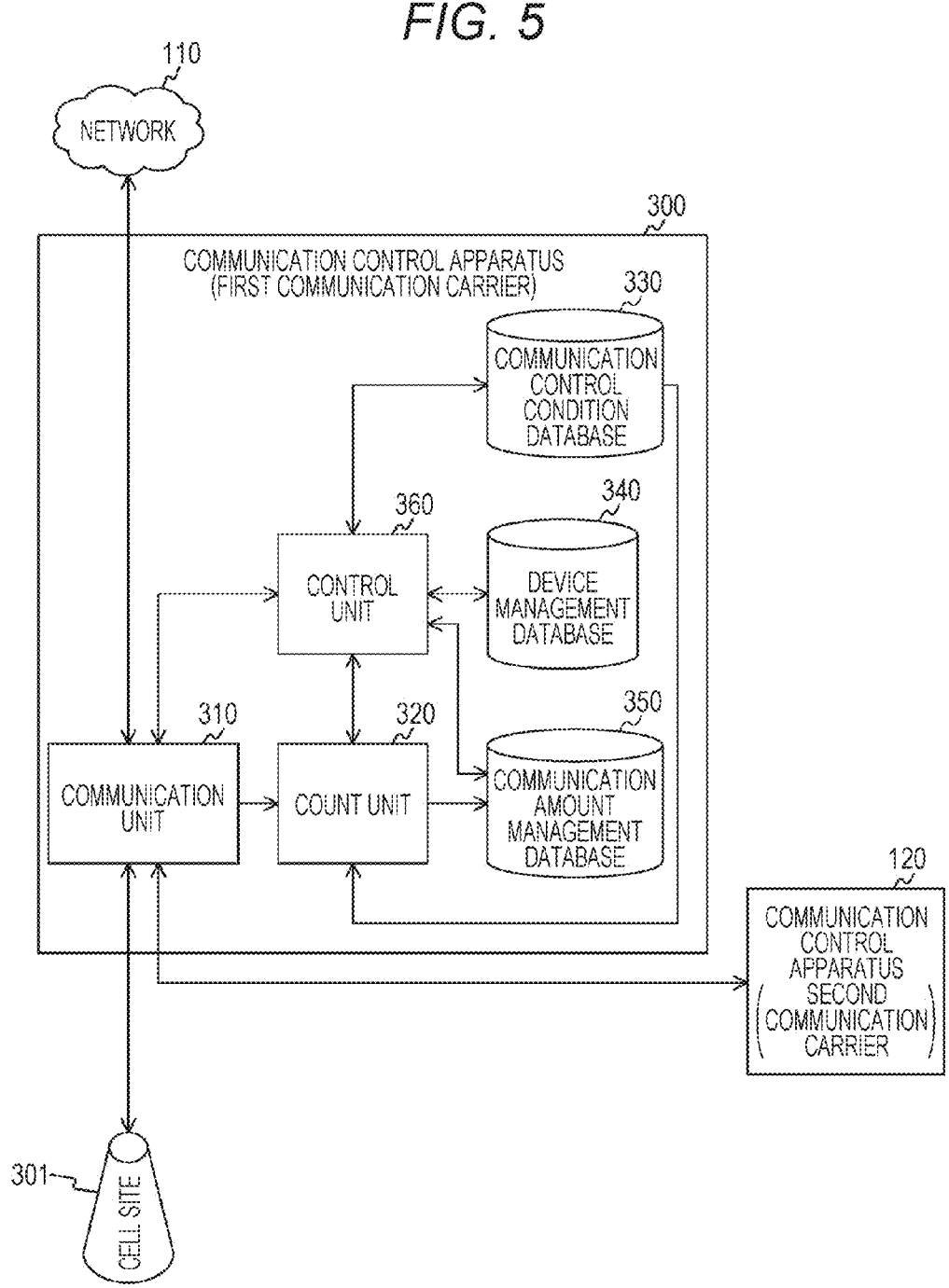
FIG. 5 is a block diagram illustrating an example of a functional configuration of a communication control apparatus (first communication carrier) 300 according to the first embodiment of the present technique.

The communication control apparatus 20 is a communication control apparatus managed by a wireless service operator providing services such as initial connection registration and the like. The communication control apparatus 20 corresponds to, for example, a wireless service operator (for example, cellular phone company) providing wireless connection service. The communication control apparatus 20 includes a control unit (corresponding to a control unit 360 as shown in FIG. 5).

The control unit of the communication control apparatus 20 performs authentication control of a wireless communication apparatus connected via the cell site 21. For example, the control unit of the communication control apparatus 20 authenticates the wireless communication apparatus connected via the cell site 21 on the basis of the PCID. The communication control apparatus 20 provides a service such as initial connection registration to the authenticated wireless communication apparatus. The control unit of the communication control apparatus 20 is also connected to the communication control apparatus 30 to exchange various kinds of information with the communication control apparatus 30.

The cell site 21 is a mobile communication cell site (Node B) connecting the wireless communication apparatus 400 and the communication control apparatus 20 via the wireless circuit.

The communication control apparatus 30 is a communication control apparatus managed by a wireless service operator providing wireless connection service. The communication control apparatus 30 provides the Internet services and the like, and corresponds to, for example, a wireless service operator (for example, cellular phone company) providing wireless connection service. The communication control apparatus 30 has a control unit (corresponds to the control unit 360 as shown in FIG. 5).

The control unit of the communication control apparatus 30 is configured to perform authentication control of a wireless communication apparatus connected via the cell site 31. For example, the control unit of the communication control apparatus 30 authenticates a wireless communication apparatus holding effective contract authentication information about the communication control apparatus 30 among wireless communication apparatuses connected via the cell site 31. The communication control apparatus 30 connects the authenticated wireless communication apparatus with the network 40 via a gateway (not shown).

The control unit of the communication control apparatus 30 is connected to the communication control apparatus 20, and exchange various kinds of information with the communication control apparatus 20. In this case, a wireless communication apparatus that does not have effective contract authentication information can connect with the communication control apparatus 20 via the communication control apparatus 30 on the basis of the PCID of the wireless communication apparatus (limited connection).

The cell site 31 is a mobile communication cell site (Node B) for connecting the wireless communication apparatus 400 and the communication control apparatus 30 via wireless circuit.

The service providing company 50 is a company providing various kinds of communication services (SP (Service Provider)) such as communication sales, online game, content save service, and content distribution service. The service providing company 50 includes the information processing apparatus 200 for providing the communication services. The information processing apparatus 200 is connected via the network 40 to the communication control apparatus 20 and the communication control apparatus 30. In this case, a company which provides various kinds of communication services is considered to be a communication carrier providing wireless connection service, that is, MVNO (Mobile Virtual Network Operator) (which is a company having a business model called virtual communication carrier).

The information processing apparatus 200 is an information processing apparatus providing various kinds of communication services via the network 40, and provides various kinds of communication services to the wireless communication apparatus 400 using the wireless communication. For example, information processing apparatus 200 provides communication service such as Web service, data download service, online game, e-mail service, and SNS (Social Networking Service).

For example, as shown in FIG. 1a, when the wireless communication apparatus 400 holds the effective contract authentication information 401, the wireless communication apparatus 400 connects to the cell site 31 via wireless circuit on the basis of the contract authentication information 401, and connects to the communication control apparatus 30 via the cell site 31. In this case, the wireless communication apparatus 400 connects to the communication control apparatus 30 via the cell site 31, and can receive various kinds of service (for example, downloading of contents) from the information processing apparatus 200. When the wireless communication apparatus 400 holding the effective contract authentication information 401 connects to the communication control apparatus 20, the wireless communication apparatus 400 connects to the communication control apparatus 20 via the communication control apparatus 30.

As shown in FIG. 1b, when the wireless communication apparatus 400 does not hold the effective contract authentication information 401, the wireless communication apparatus 400 can connect to the communication control apparatus 20 via the cell site 21 on the basis of the held PCID (limited connection). In this case, the wireless communication apparatus 400 connects to the communication control apparatus 20 via the cell site 21 (limited connection), which allows for only limited communication (for example, downloading of contract authentication information, validation/invalidation of contract authentication information).

When the wireless communication apparatus 400 does not hold the effective contract authentication information 401, the wireless communication apparatus 400 can communicate with any one of the cell sites 21 and 31, depending on the position where the wireless communication apparatus 400 is used, and the wireless communication apparatus 400 connects to the communication control apparatus 20 via the cell sites.

As described above, the wireless communication apparatus 400 not holding the effective contract authentication information 401 cannot receive various kinds of services from the information processing apparatus 200. More specifically, the wireless communication apparatus 400 not holding the rewritable connection credit (the wireless communication apparatus 400 not holding the effective contract authentication information 401) can be recognized as a device with service-limited connection. In contrast, the wireless communication apparatus holding the rewritable connection credit (the wireless communication apparatus 400 holding the effective contract authentication information 401) can be recognized as a device connected with service connection (normal connection). It should be noted that the wireless communication apparatus 400 not holding the rewritable connection credit obtains the effective contract authentication information 401 via the communication control apparatus 20 (for example, downloading of the contract authentication information, and validating of the contract authentication information) whereby the communication apparatus 400 can connect to the communication control apparatus 30.

As described above, when a user who possesses the wireless communication apparatus 400 has not made any contract for contract authentication information with the communication carrier which runs the communication control apparatus 30, the user who possesses the wireless communication apparatus 400 cannot receive various kinds of services from the information processing apparatus 200.

[Example of Configuration of Communication System]

FIG. 2 is a block diagram illustrating an example of a system configuration of a communication system 100 according to the first embodiment of the present technique.

The communication system 100 includes a network 110, cell sites 121, 301, a communication control apparatus (second communication carrier) 120, a communication control apparatus (first communication carrier) 300, information processing apparatuses 130, 140, 200, and a wireless communication apparatus 400.

It should be noted that the wireless communication apparatus 400 is considered to hold the effective contract authentication information for the communication control apparatus (first communication carrier) 300. More specifically, the wireless communication apparatus 400 is set with a connection credit for the communication control apparatus (first communication carrier) 300.

In this case, the communication system 100 is a system corresponding to the communication system 10 as shown in FIGS. 1a and 1b. More specifically, the communication control apparatus (second communication carrier) 120 corresponds to the communication control apparatus 20 as shown in FIGS. 1a and 1b, and the communication control apparatus (first communication carrier) 300 corresponds to the communication control apparatus 30 as shown in FIGS. 1a and 1b, and the information processing apparatus 200 corresponds to the information processing apparatus 200 as shown in FIGS. 1a and 1b. For this reason, in this example, some of the explanations about the same portions as those in the communication system 10 as shown in FIGS. 1a and 1b are not shown.

The network 110 is a network such as a telephone network and the Internet (for example, public circuit network). The network 110 and the communication control apparatus (second communication carrier) 120 are connected via a gateway (not shown). Likewise, the network 110 and the communication control apparatus (first communication carrier) 300 are connected via a gateway (not shown).

The communication control apparatus (second communication carrier) 120 is a communication control apparatus managed by a wireless service operator providing services such as initial connection registration, and wireless connection service, and corresponds to the communication control apparatus 20 as shown in FIGS. 1a and 1b. More specifically, the communication control apparatus (second communication carrier) 120 provides the Internet services, and the like. For example, this corresponds to a wireless service operator providing wireless connection service (for example, cellular phone company). The communication control apparatus (second communication carrier) 120 has a control unit (corresponding to the control unit 360 as shown in FIG. 5).

The control unit of the communication control apparatus (second communication carrier) 120 performs authentication control of a wireless communication apparatus connected via the cell site 121. For example, the control unit of the communication control apparatus (second communication carrier) 120 authenticates a wireless communication apparatus holding effective contract authentication information about the communication control apparatus (second communication carrier) 120 among wireless communication apparatuses connected via the cell site 121. The communication control apparatus (second communication carrier) 120 connects the authenticated wireless communication apparatus with the network 110 via a gateway (not shown).

The control unit of the communication control apparatus (second communication carrier) 120 authenticates the wireless communication apparatus connected via the cell site 121 on the basis of the PCID. The control unit of the communication control apparatus (second communication carrier) 120 provides a service such as initial connection registration to the authenticated wireless communication apparatus. The control unit of the communication control apparatus (second communication carrier) 120 is connected to the communication control apparatus (first communication carrier) 300, and exchanges various kinds of information with the communication control apparatus (first communication carrier) 300.

The cell site 121 is a mobile communication cell site (Node B) connecting the wireless communication apparatus 400 and the communication control apparatus (second communication carrier) 120 via the wireless circuit.

The communication control apparatus (first communication carrier) 300 is a communication control apparatus managed by a wireless service operator providing services such as initial connection registration, and wireless connection service, and corresponds to the communication control apparatus 30 as shown in FIGS. 1a and 1b. More specifically, the communication control apparatus (first communication carrier) 300 provides the Internet services, and the like, and corresponds to, for example, a wireless service operator (for example, cellular phone company) providing wireless connection service. The communication control apparatus (first communication carrier) 300 has a control unit 360 (shown in FIG. 5). It should be noted that the communication control apparatus (first communication carrier) 300 is an example of an information processing apparatus as described in the claims.

The control unit 360 performs authentication control of a wireless communication apparatus connected via the cell site 301. For example, the control unit 360 authenticates a wireless communication apparatus holding effective contract authentication information about the communication control apparatus (first communication carrier) 300 among wireless communication apparatuses connected via the cell site 301. The communication control apparatus (first communication carrier) 300 connects the authenticated wireless communication apparatus with the network 110 via a gateway (not shown).

The control unit 360 authenticates the wireless communication apparatus connected via the cell site 301 on the basis of the PCID. The control unit 360 provides a service such as initial connection registration to the authenticated wireless communication apparatus. The control unit 360 is connected to the communication control apparatus (second communication carrier) 120, and exchanges various kinds of information with the communication control apparatus (second communication carrier) 120.

Hereinafter, an example of setting effective contract authentication information (rewritable connection credit) for the communication control apparatus (first communication carrier) 300 in the communication system 100 (an example of setting of connection credit) will be explained. For example, each wireless communication apparatus is caused to hold contract authentication information. The control unit 360 (shown in FIG. 5) validates/invalidates the contract authentication information held in each wireless communication apparatus, and therefore, the rewritable connection credit can be set. Alternatively, the validation/invalidation of the contract authentication information held in each wireless communication apparatus may be done on the basis of the control given by the communication control apparatus (second communication carrier) 120. Accordingly, the control unit 360 may set the rewritable connection credit by validating/invalidating the contract authentication information held in each wireless communication apparatus. It should be noted that the validation of the contract authentication information corresponds to validating of connection credit, and the invalidation of the contract authentication information corresponds to invalidation of connection credit.

The rewritable connection credit may be set by transmitting the contract authentication information instead of causing each wireless communication apparatus to hold the contract authentication information. For example, setting information (including the contract authentication information) is transmitted from the communication control apparatus (first communication carrier) 300 to the wireless communication apparatus. By causing the wireless communication apparatus to hold the contract authentication information included in the setting information, the effective contract authentication information is set in the wireless communication apparatus. The transmission of the setting information (including the contract authentication information) to each wireless communication apparatus may be done by the communication control apparatus (second communication carrier) 120. Accordingly, the control unit 360 may set the rewritable connection credit by transmitting the setting information (including the contract authentication information) to each wireless communication apparatus.

The information processing apparatuses 130, 140 and 200 are information processing apparatuses (for example, contents servers) providing various kinds of communication services via the network 110, and provides various kinds of communication services to each wireless communication apparatus using the wireless communication. For example, the information processing apparatus 130 is provided in a service providing company 51 providing various kinds of communication services, and an information processing apparatus 140 is provided in a service providing company 52 providing various kinds of communication services. It should be noted that the information processing apparatus 200 will be explained in details with reference to FIG. 3.

As described above, the communication system 100 is a wireless communication system having a wireless communication apparatus (device) that can rewrite the contract authentication information via the network.

[Example of Configuration of Information Processing Apparatus]

Figure 3:
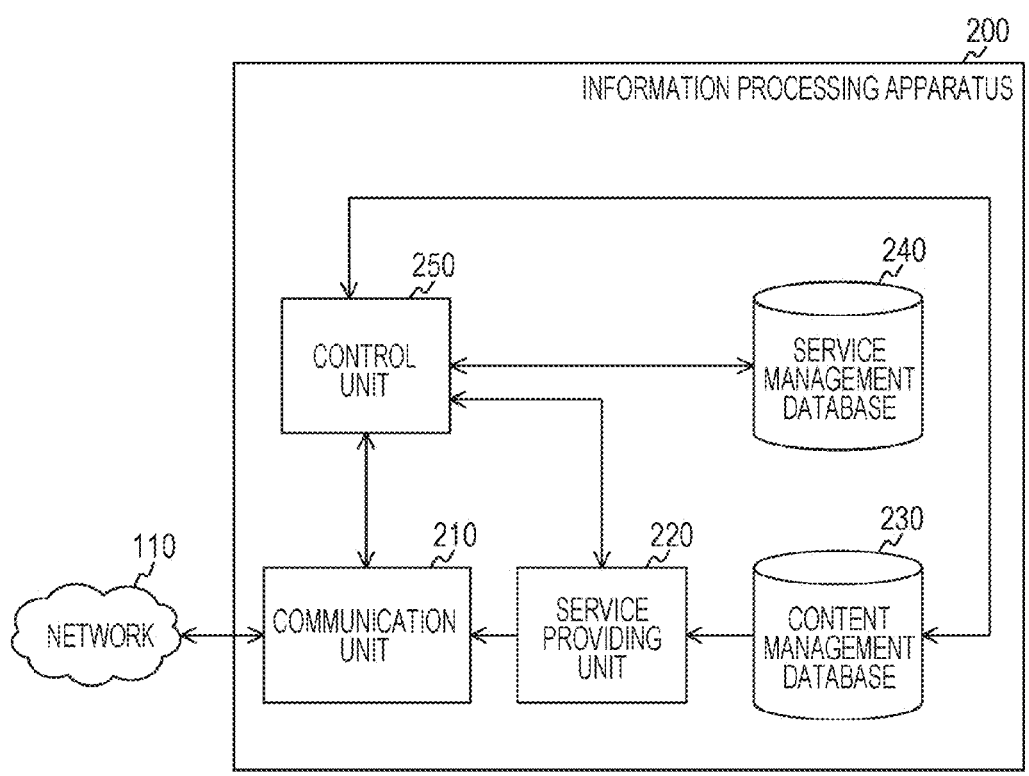
FIG. 3 is a block diagram illustrating an example of a functional configuration of an information processing apparatus 200 according to the first embodiment of the present technique.

FIG. 3 is a block diagram illustrating an example of a functional configuration of the information processing apparatus 200 according to the first embodiment of the present technique.

The information processing apparatus 200 includes a communication unit 210, a service providing unit 220, a content management database 230, a service management database 240, and a control unit 250.

The communication unit 210 is connected to the network 110, and communicates with each wireless communication apparatus connected via the network 110 on the basis of the control of the control unit 250. For example, the communication unit 210 receives via the network 110 the information transmitted from each wireless communication apparatus (for example, various kinds of notifications), and outputs the received information to the control unit 250. The communication unit 210 transmits various kinds of contents, which are output from the service providing unit 220 to each wireless communication apparatus via the network 110.

On the basis of control of the control unit 250, the service providing unit 220 provides various kinds of service to the wireless communication apparatus in response to a request given by the wireless communication apparatus connected via the network 110. The service providing unit 220 uses various kinds of data stored in the content management database 230 when the service providing unit 220 provides various kinds of communication services. For example, when a download request of a content is received from the wireless communication apparatus 400, the service providing unit 220 obtains the content related to the request (for example, a game content) from the content management database 230. Then, the service providing unit 220 transmits the obtained content via the communication unit 210 to the wireless communication apparatus 400.

The content management database 230 is a database for storing various kinds of data used when the service providing unit 220 provides various kinds of communication services, and storing data transmitted from the wireless communication apparatus. The content management database 230 stores, for example, a content uploaded from the wireless communication apparatus (for example, image contents) and a content used for providing a content to be downloaded (for example, game content, Web site).

The service management database 240 is a database for storing various kinds of data used when the information processing apparatus 200 provides various kinds of communication services. It should be noted that the service management database 240 will be explained in details with reference to FIG. 4.

The control unit 250 is to control communication performed between wireless communication apparatuses connected via the network 110. For example, the control unit 250 performs control to perform content providing processing, upload processing, or download processing (communication processing). It should be noted that the content providing processing is communication processing for providing a content from the information processing apparatus 200 to the wireless communication apparatus 400 (for example, viewing of a Web site). The upload processing is communication processing for uploading a content from the wireless communication apparatus 400 to the information processing apparatus 200, and on the other hand, the download processing for downloading a content from the information processing apparatus 200 to the wireless communication apparatus 400. In addition, the control unit 250 performs control so as to give the wireless communication apparatus a connection credit for connecting to the network 110 using the wireless communication (a connection credit used to provide a particular service).

[Example of Configuration of Service Management Database]

FIG. 4 is a figure schematically illustrating a service management database 240 according to the first embodiment of the present technique.

The service management database 240 includes a user ID 241, a password 242, a terminal identification information 243, and a usage history information 244, in such a manner that they are associated with each other. The information is updated in order by the control unit 250 on the basis of, for example, a registration correction request given by the service providing company 50. For example, when the user of the wireless communication apparatus 400 has made a contract for receiving a predetermined service with the service providing company 50, the content of the contract is reflected and registered in the service management database 240. For example, when the user of the wireless communication apparatus 400 receives the predetermined service of the service providing company 50, the content is registered in the service management database 240.

The user ID 241 stores a user ID (user identification information) used when the service of the service providing company 50 is received.

The password 242 stores a password used when the service of the service providing company 50 is received.

The terminal identification information 243 stores terminal identification information for identifying a wireless communication apparatus which receive service of the service providing company 50. This terminal identification information is identification information (for example, device unique ID) for identifying a wireless communication apparatus. The terminal identification information 243 stores, for example, IMEI (International Mobile Equipment Identity). The IMEI is expressed as a 15 digit number, but for the sake of ease of explanation, IMEIs are expressed as "AAAA", "BBBB", and the like in FIG. 4 and the like.

The usage history information 244 stores each pieces of information (usage history information) about usage of a service when the service of the service providing company 50 is received. For example, the usage history information 244 stores date/time, time, the amount of communication, purchase good (purchase content), purchase price, and the like when the service of the service providing company 50 is received.

[Example of Configuration of Communication Control Apparatus]

FIG. 5 is a block diagram illustrating an example of a functional configuration of a communication control apparatus (first communication carrier) 300 according to the first embodiment of the present technique.

The communication control apparatus (first communication carrier) 300 includes a communication unit 310, a count unit 320, a communication control condition database 330, a device management database 340, a communication amount management database 350, and a control unit 360.

The communication unit 310 is connected to the network 110, the communication control apparatus (second communication carrier) 120, and the cell site 301, and communicates with each wireless communication apparatus connected via the cell site 301 on the basis of the control of the control unit 360.

The count unit 320 counts the amount of communication between the wireless communication apparatus (the wireless communication apparatus to which the connection credit is given) and the information processing apparatus (service providing company) which is conducted via the communication control apparatus (first communication carrier) 300.

The count unit 320 records, in order, the amount of communication thus counted to the communication amount management database 350. More specifically, the count unit 320 records usage history (for example, the amount of communication) of services other than the particular service for the wireless communication apparatus connected to the network 110 using the given connection credit. In this case, the particular service is, for example, a service designated by the service providing company giving the connection credit, and is, for example, identified by a URL (Uniform Resource Locator). For example, the count unit 320 distinguishes, from each other, the amount of communication of the particular service and the amount of communication of services other than the particular service for the wireless communication apparatus connected to the network 110 using the given connection credit, and records, to the communication amount management database 350, the amount of communication of the particular service and the amount of communication of services other than the particular service. It should be noted that the count unit 320 is an example of a recording unit described in the claims.

The communication control condition database 330 is a database for storing various kinds of information for managing each communication control condition applied to the wireless communication apparatus to which the connection credit is given. It should be noted that the communication control condition database 330 will be explained in details with reference to FIG. 6.

The device management database 340 is a database for storing various kinds of information for managing each wireless communication apparatus (device) connected via the cell site 301. It should be noted that the device management database 340 will be explained in details with reference to FIG. 7.

The communication amount management database 350 is a database for storing the amount of communication counted by the count unit 320 for each wireless communication apparatus, and managing the amount of communication thus counted. It should be noted that the device management database 340 will be explained in details with reference to FIG. 8.

The control unit 360 performs various kinds of controls of wireless communication apparatuses connected via the cell site 301. For example, the control unit 360 performs control so as to give the wireless communication apparatus 400 a connection credit for connecting to the network 110 using the wireless communication (a connection credit used to provide a particular service). For example, the control unit 360 performs charge processing for charging the wireless communication apparatus to which the connection credit is given, on the basis of the information given by the information processing apparatus 200 and the content of the communication amount management database 350.

[Example of Configuration of Communication Control Condition Database]

FIG. 6 is a figure schematically illustrating a communication control condition database 330 according to the first embodiment of the present technique.

The communication control condition database 330 stores a service ID 331, a service name 332, a service provider 333, a particular service 334, and a maximum communication speed 335, in such a manner that they are associated with each other. The communication control condition database 330 stores a communication permission 336 for a service other than a designated service and a user charge 337 for the amount of communication of the service other than the designated service, in such a manner that they are associated with each other. The communication control condition database 330 stores a free-of-charge communication permission amount 338 for the service other than the designated service and a user borne ratio 339 of the amount of communication for the service other than the designated service, in such a manner that they are associated with each other. The information is, for example, updated in order by the control unit 360 on the basis of the request given by each service providing company.

The service ID 331 stores an identification information (service ID) about a service provided by the service providing company.

The service name 332 stores a name (service name) of a service provided by the service providing company.

The service provider 333 stores identification information for identifying a service providing company providing a service.

The particular service 334 stores information about the service designated by the service providing company (particular service) among the services provided by each service providing company. For example, the particular service 334 stores a URL of the particular service. The count unit 320 uses information stored in the particular service 334 to distinguish between the particular service and the services other than the particular service.

The maximum communication speed 335 stores the maximum communication speed which can be achieved by the connection credit given to the wireless communication apparatus when the service providing company provides the particular service. The control unit 360 gives the wireless communication apparatus which uses each particular service the connection credit corresponding to the maximum communication speed stored in the maximum communication speed 335.

The communication permission 336 for the service other than the designated service stores information indicating whether the connection credit given for the use of the particular service can be used for the service other than the designated service.

The user charge 337 of the amount of communication for the service other than the designated service stores information indicating whether the user is charged or not when the connection credit given for the use of the particular service is used for the service other than the designated service.

The free-of-charge communication permission amount 338 for the service other than the designated service stores information indicating the amount of communication for which the connection credit given for the use of the particular service can be used, free-of-charge, for the service other than the designated service.

The user borne ratio 339 of the amount of communication for the service other than the designated service stores information indicating a ratio borne by the user when the connection credit given for the use of the particular service is used for the service other than the designated service.

As described above, the communication control condition database 330 manages predetermined conditions about the usage of the services other than the particular service. It should be noted that the communication control condition database 330 is an example of a management unit described in the claims.

[Example of Configuration of Device Management Database]

FIG. 7 is a figure schematically illustrating the device management database 340 according to the first embodiment of the present technique.

The device management database 340 stores a user ID 341, terminal identification information 342, a communication expense 343, a contract authentication information identification information 344, and a giving time 345, in such a manner that they are associated with each other. The information is, for example, updated in order by the control unit 360 on the basis of the request given by each wireless communication apparatus.

The user ID 341 stores identification information for identifying each service. It should be noted that the user ID 341 corresponds to the user ID 241 shown in FIG. 4.

The terminal identification information 342 stores the terminal identification information for identifying each wireless communication apparatus. It should be noted that the terminal identification information 342 corresponds to the terminal identification information 243 shown in FIG. 4.

The communication expense 343 stores the communication expense charged to each wireless communication apparatus.

The contract authentication information identification information 344 stores information for managing the contract authentication information given to the wireless communication apparatus (contract authentication information, identification information). For example, when the wireless communication apparatus is given the contract authentication information, the management information thereof is stored.

The giving time 345 stores an elapsed time from when the contract authentication information is given to the wireless communication apparatus.

[Example of Configuration of Communication Amount Management Database]

FIG. 8 is a figure schematically illustrating the communication amount management database 350 according to the first embodiment of the present technique.

The communication amount management database 350 stores an operation ID 351, a terminal identification information 352, a service ID 353, a service start time 354, and a service end time 355, in such a manner that they are associated with each other. The communication amount management database 350 stores a particular service communication amount 356 and a non-particular service communication amount 357 in such a manner that they are associated with each other. The information is, for example, updated in order by the count unit 320 in such a manner that the count unit 320 counts the amount of communication between the wireless communication apparatus and the information processing apparatus.

The operation ID 351 stores identification information (operation ID) for identifying communication conducted by the wireless communication apparatus to which the connection credit is given.

The terminal identification information 352 stores identification information (terminal identification information) for identifying the wireless communication apparatus to which the connection credit is given. It should be noted that terminal identification information 352 corresponds to the terminal identification information 243 shown in FIG. 4.

The service ID 353 stores identification information (service ID) for identifying the particular service used by the wireless communication apparatus to which the connection credit is given. It should be noted that the service ID 353 corresponds to the service ID 331 shown in FIG. 6.

The service start time 354 stores a time when the wireless communication apparatus to which the connection credit is given starts to use the particular service.

The service end time 355 stores a time when the wireless communication apparatus to which the connection credit is given stops using the particular service after the wireless communication apparatus to which the connection credit is given started to use the particular service.

The particular service communication amount 356 stores the amount of communication when the wireless communication apparatus to which the connection credit is given uses the particular service.

The non-particular service communication amount 357 stores the amount of communication when the wireless communication apparatus to which the connection credit is given uses a service other than the particular service.

[Example of Configuration of Wireless Communication Apparatus]

Figure 9:
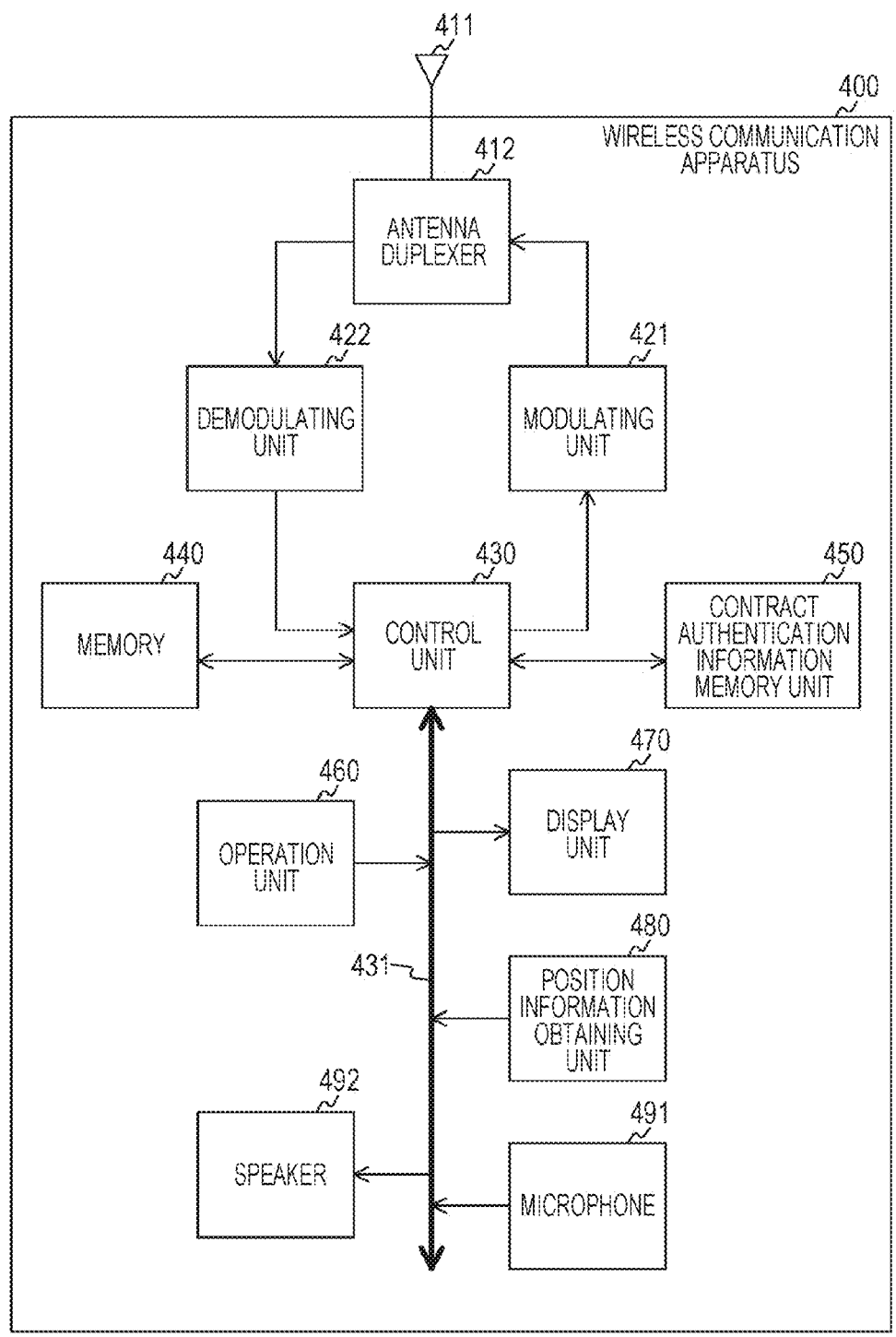
FIG. 9 is a block diagram illustrating an example of an internal configuration of a wireless communication apparatus 400 according to the first embodiment of the present technique.

FIG. 9 is a block diagram illustrating an example of an internal configuration of the wireless communication apparatus 400 according to the first embodiment of the present technique.

The wireless communication apparatus 400 includes an antenna 411, an antenna duplexer 412, a modulating unit 421, a demodulating unit 422, a control unit 430, a memory 440, and a contract authentication information memory unit 450. The wireless communication apparatus 400 includes an operation unit 460, a display unit 470, a position information obtaining unit 480, a microphone 491, and a speaker 492. These units are connected by a bus 431.

For example, when reception processing is performed, the radio wave received by the antenna 411 demodulated by the demodulating unit 422 by way of the antenna duplexer 412, and this demodulated reception data are provided to the control unit 430. When the reception processing is voice call reception processing, the demodulated reception data (sound data) are output as sound from the speaker 492 by way of the control unit 430.

For example, when the transmission processing is performed, the transmission data which are output from the control unit 430 are modulated by the modulating unit 421, and the modulated transmission data are transmitted from the antenna 411 by way of the antenna duplexer 412. When the transmission processing is voice call transmission processing, the sound data which are input from the microphone 491 are modulated by the modulating unit 421 by way of the control unit 430, and the modulated transmission data (sound data) are transmitted from the antenna 411 by way of the antenna duplexer 412.

The control unit 430 performs various kinds of controls on the basis of the control program stored in the memory 440. The control unit 430 is constituted by, for example, a microprocessor. For example, the control unit 430 is connected to the modulating unit 421 and the demodulating unit 422, and transmits and receives various kinds of data to and from the communication control apparatus (second communication carrier) 120 connected via the cell site 121. For example, the control unit 430 performs connection processing for connecting the communication control apparatus (first communication carrier) 300 and the communication control apparatus (second communication carrier) 120 via a wireless circuit by limited connection based on the PCID without using any contract authentication information.

For example, the control unit 430 performs control so as to request a connection credit for connecting to the network 110 using the wireless communication (a connection credit used for usage of the particular service). It should be noted that the control unit 430 is an example of a communication control unit and a display control unit described in the claims.

The memory 440 is a memory for storing control programs, with which the control unit 430 performs various kinds of controls, and storing transmission data, reception data, and the like. The memory 440 is constituted by, for example, a ROM (Read Only Memory) and a RAM (Random Access Memory). The memory 440 stores terminal identification information (for example, IMEI) for identifying the wireless communication apparatus 400.

The contract authentication information memory unit 450 is a memory for holding the contract authentication information. The contract authentication information memory unit 450 may be, for example, a UICC (Universal Integrated Circuit) card, or a dedicated memory for keeping the contract authentication information secure. It should be noted that when the contract authentication information memory unit 450 is a UICC card, the UICC card does not have the contract authentication information written thereto in a fixed manner, and allows for the validation processing and the invalidation processing of the contract authentication information. More specifically, the UICC card is used, with which the control unit 430 can perform the validation processing and the invalidation processing of the contract authentication information on the basis of the information received from the antenna 411 and demodulated (setting information, invalidation information). The UICC card is used, which allows for rewriting processing of the contract authentication information. It should be noted that the validation processing and the invalidation processing of the contract authentication information can be done according to validation processing and invalidation processing defined in 3GPP (Third Generation Partnership Project). When a secure area is secured in the memory 440, the contract authentication information memory unit 450 may be provided in the memory 440.

The operation unit 460 is an operation reception unit for receiving an operation input which is made when the user performs operation, and outputs a signal according to the received operation input to the control unit 430. The operation unit 460 includes various kinds of keys such as numeric keys and alphabet keys. The operation unit 460 receives operation for performing various kinds of communication services with the information processing apparatus 200.

The display unit 470 is a display unit for displaying various kinds of information (character information, time information, and the like) on the basis of the control of the control unit 430. For example, the display unit 470 displays each piece of information (for example, a display screen shown in FIGS. 11a and 11b to FIGS. 14a and 14b) for performing various kinds of communication services with the information processing apparatus 200. It should be noted that the display unit 470 may be, for example, display panels such as an organic EL (Electro Luminescence) panel, a LCD (Liquid Crystal Display) panel, and the like. It should be noted that the operation unit 460 and the display unit 470 can be integrally made using a touch panel which allows a user to give operation input by bringing a finger into contact with or closer to a display surface.

The position information obtaining unit 480 obtains position information indicating the position where the wireless communication apparatus 400 exists, and outputs this obtained position information to the control unit 430. The position information obtaining unit 480 can be achieved using a GPS (Global Positioning System) unit for calculating the position information on the basis of, for example, a GPS signal received by a GPS signal reception antenna (not shown). This calculated position information includes data indicating a position such as latitude, longitude, and altitude when the GPS signal is received. Alternatively, a position information obtaining apparatus for obtaining position information according to other methods for obtaining position information may also be used. For example, a position information obtaining apparatus may be used to derive the position information using access point information about wireless LAN (Local Area Network) existing therearound and obtain the position information.

[Example of Usage of Wireless Communication Apparatus]

Figure 10:
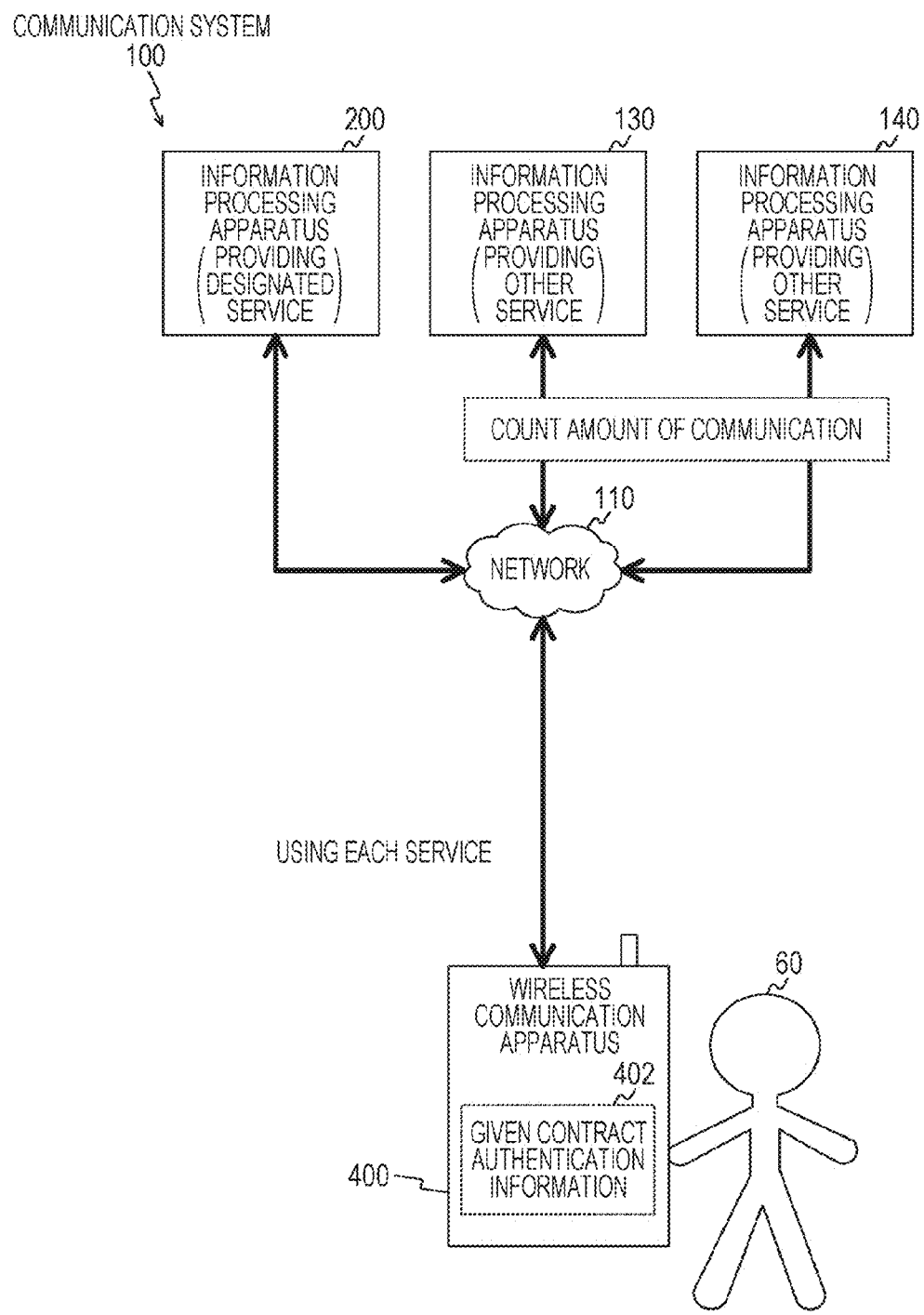
FIG. 10 is a figure illustrating, in a simplified manner, an example of usage of the wireless communication apparatus 400 according to the first embodiment of the present technique.

FIG. 10 is a figure illustrating, in a simplified manner, an example of usage of the wireless communication apparatus 400 according to the first embodiment of the present technique. FIG. 10 illustrates a state of usage of each service including the particular service using the wireless communication apparatus 400.

In FIG. 10, the wireless communication apparatus 400 is considered to be a wireless communication apparatus (for example, smartphone) having a function for viewing Web sites, and is considered to be able to use a software downloadable SIM. The information processing apparatus 200 is considered to be a server capable of providing a Web site (for example, content download site).

In this case, an example will be explained where the particular service (for example, content download site) provided by the information processing apparatus 200 is used using the wireless communication apparatus 400. For example, the user 60 uses the operation unit 460 of the wireless communication apparatus 400 to perform each operation for using the particular service (for example, content download site) provided by the information processing apparatus 200. An example of display of this screen will be explained in details with reference to FIGS. 11a and 11b and the like.

As described above, when the particular service (for example, content download site) provided by the information processing apparatus 200 is used, the contract authentication information 401 held in the wireless communication apparatus 400 is considered to be used. In this case, all the communication expenses for using the particular service are borne by the user of the wireless communication apparatus 400. Therefore, the user of the wireless communication apparatus 400 may worry about the communication expense, and may not use the particular service without haste. As described above, when the user worries about the communication expense and cannot use the particular service without haste, this in turn reduces the opportunity of sale for the service providing company 50 providing the particular service (for example, content download site).

Therefore, when the particular service of the service providing company 50 is to be used, the contract authentication information 402 for using the service may be given, so that the user can appropriately receive various kinds of services provided by the information processing apparatus 200. In this case, for example, the communication expense incurred by the given contract authentication information 402 is considered to be borne by the service providing company 50. However, if the service providing company 50 pays all the communication expenses when the user uses the service not designated by the service providing company 50 (services other than the particular service) while the contract authentication information 402 is given, the price paid by the service providing company 50 for the communication expenses may be too expensive. Therefore, while the contract authentication information 402 is given, the user may not be permitted to use services other than the particular service (for example, service "1234" of service ID 331 shown in FIG. 6). If the user is not permitted to use services other than the particular service while the contract authentication information 402 is given, this may impair user's convenience. For example, when a user is downloading newspaper content from a newspaper distribution service with free communication expense, the user may not be able to check his/her e-mails during downloading.

Therefore, the present technique embodiment shows an example for appropriately charging the communication expenses related to the user in question when the user uses the given connection credit.

First, the first embodiment of the present technique shows an example where the other services (services other than the particular service) can be used for the predetermined amount of communication by using the given connection credit. More specifically, in the first embodiment of the present technique, for example, a service corresponding to "1236" of the service ID 331 shown in FIG. 6 will be used as an example in the explanation.

[Example of Transition of Display During Content Download]

FIGS. 11a and 11b to FIGS. 14a and 14b are figures illustrating an example of a display screens displayed on the display unit 470 of the wireless communication apparatus 400 according to the first embodiment of the present technique. These display screens are displayed, for example, on the basis of information transmitted from the information processing apparatus 200.

FIG. 11a is a display screen displayed on the display unit 470, and shows an example of a display screen (content purchase screen 500) displayed after a connection operation is performed to connect to the usage site of the particular service (for example, content download site).

The content purchase screen 500 is provided with a communication carrier display area 501, a content display area 502, a purchase button 503, and a content list button 504.

The communication carrier display area 501 is an area for displaying a communication carrier related to a connection credit currently used. For example, the name of the first communication carrier with which the user of the wireless communication apparatus 400 has made a contract is displayed on the communication carrier display area 501.

The content display area 502 is an area for displaying an image representing a content of a purchase target. For example, an image representing a game content "Penta's great adventure" is displayed.

The purchase button 503 is a button that is pressed down when the content displayed in the content display area 502 is purchased. When the purchase button 503 is pressed down, the control unit 430 transmits, to the information processing apparatus 200, content purchase information for purchasing the content displayed in the content display area 502 (shown in FIG. 15). On the basis of this content purchase information, the information processing apparatus 200 gives the wireless communication apparatus 400 the contract authentication information. More specifically, the connection credit owned by the service providing company 50 of the information processing apparatus 200 is given to the wireless communication apparatus 400. FIG. 11b shows an example of a display screen displayed after the purchase button 503 is pressed down.

The content list button 504 is a button that is pressed down to display, in a list format, contents other than the content displayed in the content display area 502.

FIG. 11b shows an example of a display screen (connection credit giving notification screen 505) that is displayed after the purchase button 503 is pressed down in the content purchase screen 500 shown in FIG. 11*a*.

The connection credit giving notification screen 505 is a display screen having a connection credit giving message display area 506 provided on the content purchase screen 500 shown in FIG. 11*a*. FIG. 12*a* is an example of a display screen displayed after the connection credit owned by the service providing company 50 of the information processing apparatus 200 is given to the wireless communication apparatus 400 after the connection credit giving notification screen 505 is displayed.

FIG. 12*a* illustrates an example of a display screen (downloading screen 510) displayed after the connection credit owned by the service providing company 50 of the information processing apparatus 200 is given to the wireless communication apparatus 400.

The downloading screen 510 is a display screen displayed after the purchase button 503 is pressed down in the content purchase screen 500 shown in FIG. 11*a* and the connection credit giving notification screen 505 shown in FIG. 11*b* is displayed. The downloading screen 510 is a display screen for notifying that the content "Penta's great adventure" purchased in the content purchase screen 500 shown in FIG. 11*a* is being downloaded.

The downloading screen 510 is provided with a connection credit-being-given indication area 511 and a downloading indication area 512. It should be noted that the portions corresponding to the content purchase screen 500 shown in FIG. 11*a* are denoted with the same reference numerals, and explanation thereabout is omitted.

The connection credit-being-given indication area 511 is an area for notifying the user a notification indicating that the connection credit owned by the service providing company 50 of the information processing apparatus 200 is given (a notification indicating that the contract authentication information is given). For example, for a predetermined time after the notification is given, the connection credit-being-given indication area 511 may be blinked and displayed or may be displayed in a conspicuous color in order to allow the user to easily recognize the notification. Then, after a predetermined time elapses since the notification, the connection credit-being-given indication area 511 may be, for example, displayed in a smaller size or may be displayed in a less conspicuous color in order to allow the user to easily recognize the notification.

As described above, when the downloading screen 510 is displayed, the user can use other services. For example, the user can use the operation unit 460 to perform start operation for starting the user of another service. An example of a display screen for performing this start operation is shown in FIG. 12*b*.

FIG. 12*b* illustrates an example of a display screen (search screen 515) for performing the start operation for starting the use of another service after the connection credit owned by the service providing company 50 of the information processing apparatus 200 is given to the wireless communication apparatus 400.

The search screen 515 is a display screen provided with an Internet search area 516 on the downloading screen 510 shown in FIG. 12*a*. For example, in the Internet search area 516, a keyword desired by a user is input, and a desired Web site can be searched and displayed. An example of display is shown in FIG. 13*a*.

FIG. 13*a* illustrates an example of a display screen (display screen 520) displaying a Web site searched in the search screen 515 shown in FIG. 12*b*.

The display screen 520 is a display screen provided with a Web site display area 521 on the downloading screen 510 shown in FIG. 12*a*. For example, a news site searched through user's operation is displayed.

In this case, the first embodiment of the present technique is an example where only the predetermined amount of communication can be used for services other than the particular service. Therefore, when the user's usage of services other than the particular service is more than the predetermined amount, then, the user cannot use the services anymore. An example of notification in this case is shown in FIG. 13*b*.

FIG. 13*b* illustrates an example of a display screen (free-of-charge communication end notification screen 522) displayed when the user uses the services other than the particular service for an amount equal to or more than the predetermined amount.

The free-of-charge communication end notification screen 522 is a display screen provided with a free-of-charge communication end message display area 523 on the downloading screen 510 shown in FIG. 12*a*. The free-of-charge communication end message display area 523 is provided with a YES button 524 and a NO button 525.

The YES button 524 is a button pressed down when the given connection credit is returned. When the YES button 524 is pressed down, the given connection credit is returned even when the content is being downloaded. Therefore, after the connection credit is returned, the content is downloaded on the basis of the connection credit given under the contract the user has made. An example of a display screen displayed after the YES button 524 is pressed down is shown in FIG. 14*a*.

The NO button 525 is a button that is pressed down when the given connection credit is to be returned after the connection credit is continuously given until the downloading of the content is finished and then the downloading of the content is finished. When the NO button 525 is pressed down, the given connection credit is not returned as long as the content is downloaded. Then, after the downloading of the content is finished, the given connection credit is returned. An example of a display screen displayed after the NO button 525 is pressed down is shown in FIG. 14*b*.

FIG. 14*a* illustrates an example of a display screen (connection credit returning notification screen 526) that is pressed down after the YES button 524 is pressed down in the free-of-charge communication end notification screen 522 shown in FIG. 13*b*.

The connection credit returning notification screen 526 is a display screen in which the service providing company 50 notifies the user that the given connection credit is returned, and is provided with a returned connection credit indication area 527. After the connection credit returning notification screen 526 is displayed, communication is performed on the basis of the connection credit possessed by the user of the wireless communication apparatus 400 (the original connection credit).

FIG. 14*b* illustrates an example of a display screen (connection credit returning plan notification screen 528) displayed after the NO button 525 is pressed down in the free-of-charge communication end notification screen 522 shown in FIG. 13*b*.

The connection credit returning plan notification screen 528 is a display screen in which the service providing company 50 notifies the user that the given connection credit is going to be returned, and is provided with a connection credit returning plan display area 529. After the connection credit returning plan notification screen 528 is displayed, the download processing of the content is done, and thereafter, the connection credit given by the service providing company 50 is returned.

[Example of Communication in Case where Given Connection Credit is Used]

Figure 15:
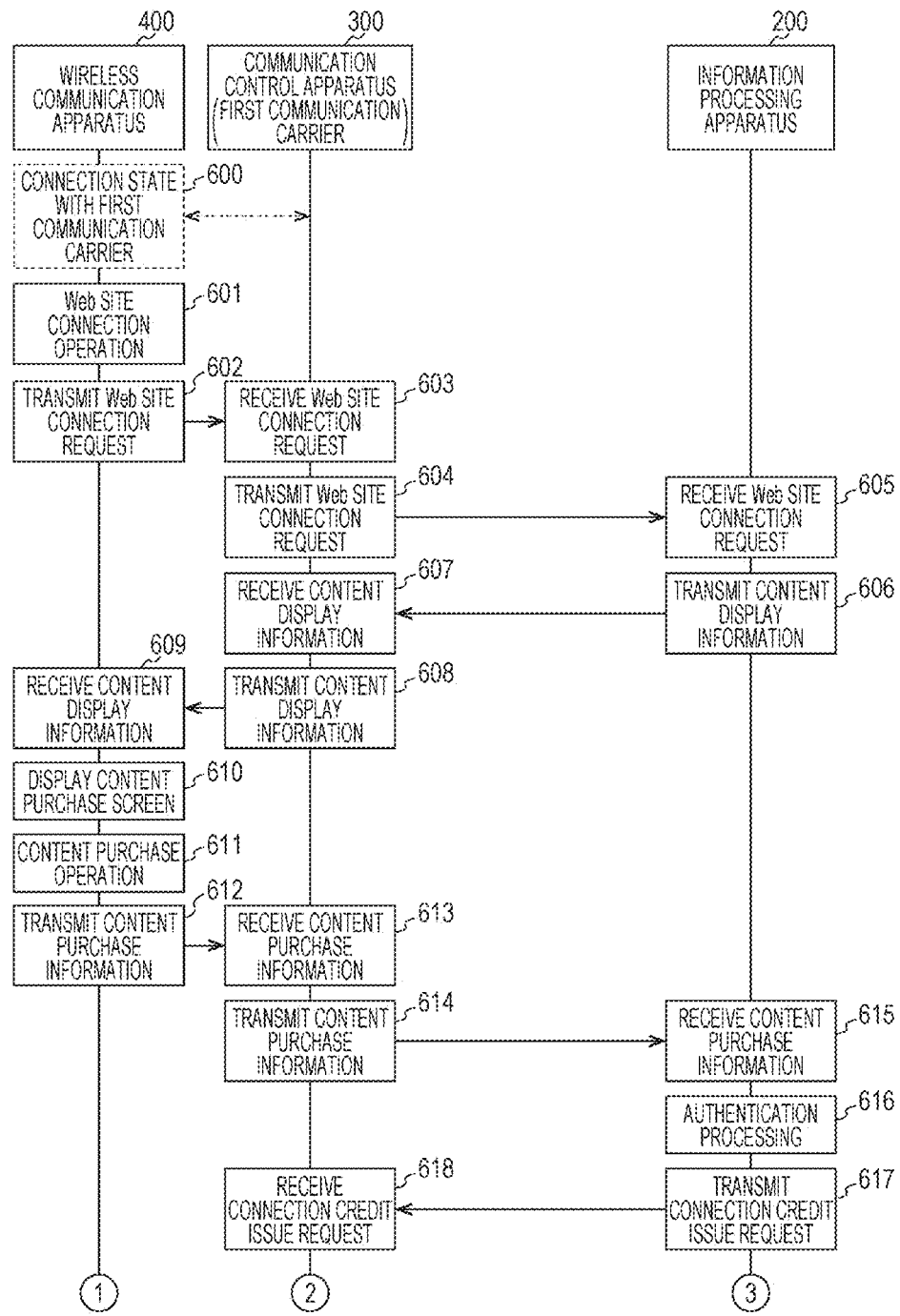
FIG. 15 is a sequence chart illustrating an example of communication processing between devices constituting the communication system 100 according to the first embodiment of the present technique.
Figure 16:
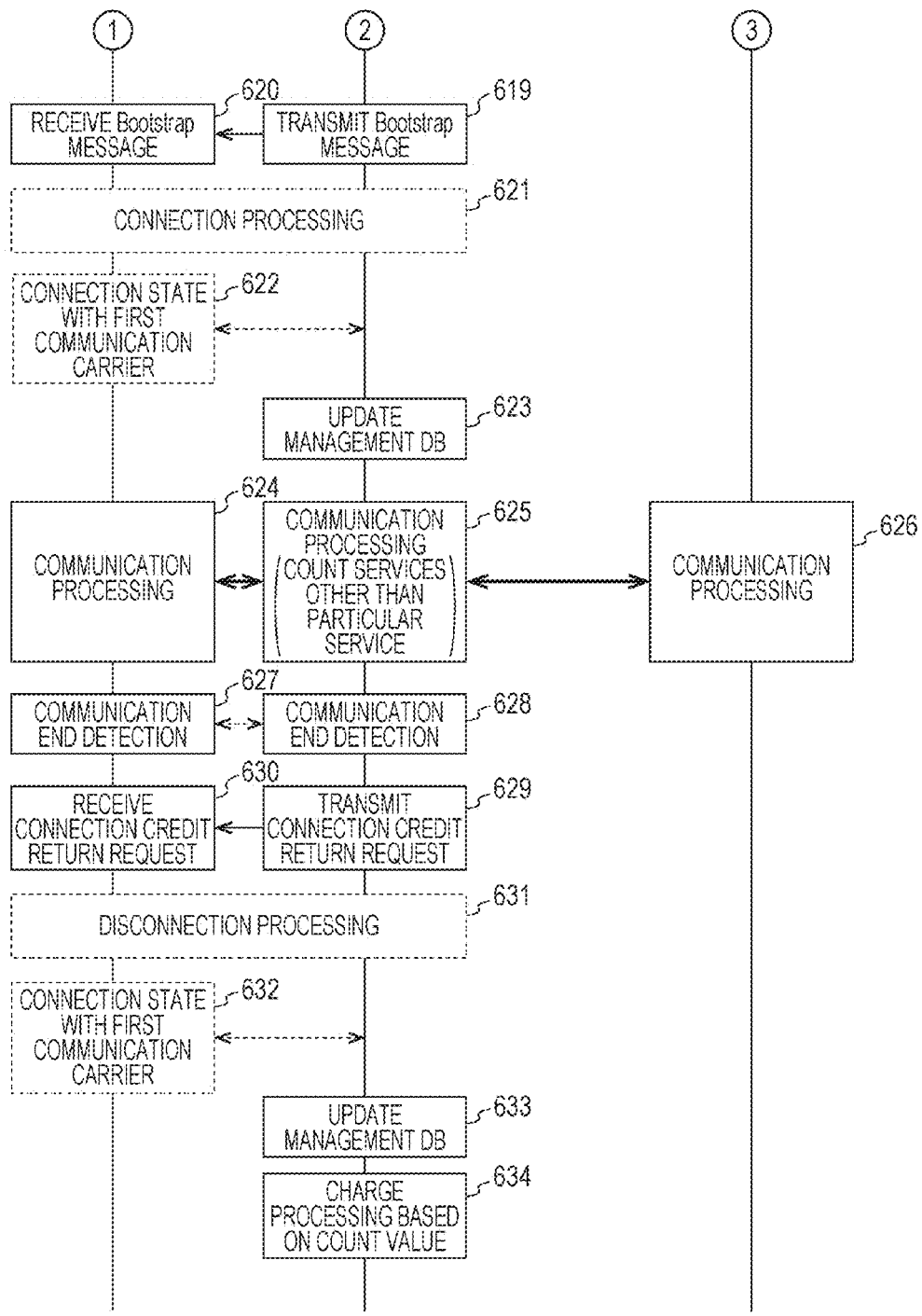
FIG. 16 is a sequence chart illustrating an example of communication processing between devices constituting the communication system 100 according to the first embodiment of the present technique.

FIGS. 15 and 16 are sequence charts illustrating an example of communication processing between the apparatuses constituting the communication system 100 according to the first embodiment of the present technique.

In this example, the wireless communication apparatus 400 is considered to hold contract authentication information (contract authentication information of the first communication carrier). The connection credit given by the service providing company 50 is considered to be used for services other than the service (particular service) provided by the service providing company 50 for only a predetermined amount of communication.

In the initial state, the wireless communication apparatus 400 is considered to be in the connection state (600) with the communication control apparatus (first communication carrier) 300. The contract authentication information held in advance in the wireless communication apparatus 400 is considered to be used for communication until the contract authentication information is given.

First, a user does connection operation of a Web site (for example, download site of contents) using the wireless communication apparatus 400 (601). For example, in a menu screen, the user presses down a Web site connection button to perform the connection operation of the Web site (601). When the connection operation of the Web site is performed (601), a Web site connection request is transmitted to the information processing apparatus 200 (602 to 605). More specifically, the control unit 430 of the wireless communication apparatus 400 transmits a Web site connection request via the communication control apparatus (first communication carrier) 300 to the information processing apparatus 200 (602 to 605).

When the information processing apparatus 200 receives a Web site connection request (605), the service providing unit 220 of the information processing apparatus 200 transmits the content display information to the wireless communication apparatus 400 on the basis of the control of the control unit 250 (606 to 609). More specifically, information for displaying a content of download target (content display information) is transmitted to the wireless communication apparatus 400 via the communication control apparatus (first communication carrier) 300 (606 to 609).

When the wireless communication apparatus 400 receives the content display information (609), the control unit 430 of the wireless communication apparatus 400 causes the content purchase screen to be displayed on the display unit 470 on the basis of the content display information (610). For example, the content purchase screen 500 shown in FIG. 11a is displayed (610).

Subsequently, in the content purchase screen displayed on the display unit 470, the user performs the content purchase operation (611). For example, in the content purchase screen 500 shown in FIG. 11a, the purchase button 503 is pressed down (611). As described above, when the content purchase operation is performed in the content purchase screen (611), the control unit 430 of the wireless communication apparatus 400 transmits content purchase information according to the content purchase operation to the information processing apparatus 200 (612 to 615). More specifically, the content purchase information according to the content purchase operation is transmitted from the wireless communication apparatus 400 to the information processing apparatus 200 via the communication control apparatus (first communication carrier) 300 (612 to 615). In this case, for example, user ID, password, terminal identification information, information indicating that software downloadable SIM is supported are transmitted as the content purchase information according to the content purchase operation. It should be noted that the password is transmitted according to the service content.

It should be noted that the user ID and the password may be configured to be input in a display screen (not shown) for inputting the user ID and the password, or the user ID and the password may be stored in advance in the memory 440, and the user ID and the password stored in the memory 440 may be used.

When the information processing apparatus 200 receives the content purchase information (615), the control unit 250 of the information processing apparatus 200 performs authentication processing to authenticate the wireless communication apparatus 400 which transmitted the content purchase information (616). This authentication processing is authentication processing to determine whether the contract authentication information can be given to the wireless communication apparatus 400 which transmitted the content purchase information.

For example, suppose that the particular service is provided to only a wireless communication apparatus registered in the service management database 240. In this case, the control unit 250 performs the authentication processing by comparing each content in the service management database 240 and the content purchase information (616). More specifically, the control unit 250 determines whether the user ID 241, the password 242, and the terminal identification information 243 in the service management database 240 match the user ID, the password, and the terminal identification information included in the log-in information, respectively. Then, when the user ID, the password, and the terminal identification information respectively match therewith, the control unit 250 determines that the contract authentication information can be given. On the other hand, when at least one of the user ID, the password, and the terminal identification information does not match therewith, the control unit 250 determines that the contract authentication information cannot be given. As described above, when the control unit 250 determines that the contract authentication information cannot be given (that is, in a case where the authentication fails), a notification to that effect is transmitted to the wireless communication apparatus 400 to be displayed thereon, so that the user is prompted to do log-in operation again. Alternatively, an error notification may be transmitted to the wireless communication apparatus 400 to be displayed thereon. As described above, when the authentication fails, the connection processing of a Web site is terminated.

When the control unit 250 determines that the contract authentication information can be given (that is, in a case where the authentication is successfully completed), the control unit 250 checks whether the wireless communication apparatus that is successfully authenticated supports the software downloadable SIM or not (616). When the wireless communication apparatus that is successfully authenticated does not support the software downloadable SIM, communication processing for providing a Web site is performed without giving the contract authentication information to the wireless communication apparatus.

When the control unit 250 determines that the contract authentication information can be given (616), the control unit 250 of the information processing apparatus 200 transmits a connection credit issue request to the communication control apparatus (first communication carrier) 300 (617, 618). This connection credit issue request includes information for identifying the wireless communication apparatus to which the connection credit is given (for example, a terminal identification information).

When the communication control apparatus (first communication carrier) 300 receives the connection credit issue request (618), the control unit 360 of the communication control apparatus (first communication carrier) 300 transmits a Boot strap message to the wireless communication apparatus 400 (619, 620). In this case, the Boot strap message serves as a trigger for causing the wireless communication apparatus 400 to actually start processing for obtaining contract authentication information (for example, see Non-Patent Document 1 (5. 1. 3. 6. 3)).

In this example, the communication control apparatus (first communication carrier) 300 transmits the Boot strap message to the wireless communication apparatus 400 to cause the wireless communication apparatus 400 to obtain the given contract authentication information. Alternatively, this processing may be done by the wireless communication apparatus 400 may also be done by the wireless communication apparatus 400 on the basis of the control of the information processing apparatus 200. For example, the information processing apparatus 200 transmits a request for downloading the given contract authentication information and a request for validating the given contract authentication information to the wireless communication apparatus 400, so that the wireless communication apparatus 400 can be caused to perform such processing.

When the Boot strap message is received (620), the control unit 430 of the wireless communication apparatus 400 performs processing (connection processing) to connect to the communication control apparatus (first communication carrier) 300 (reconnection using the given contract authentication information) (621). In this connection processing, the wireless communication apparatus 400 obtains the contract authentication information (the given contract authentication information), and performs processing to re-connect to the communication control apparatus (first communication carrier) 300. While this connection processing is performed, the control unit 430 of the wireless communication apparatus 400 displays a notification to that effect on the display unit 470. For example, the connection credit giving notification screen 505 as shown in FIG. 11b is displayed. In this connection processing, the given contract authentication information is used to make the wireless communication apparatus 400 in the connection state (622) with the communication control apparatus (first communication carrier) 300. It should be noted that the connection processing will be explained in details with reference to FIG. 17.

After the connection processing is completed (621), the control unit 360 of the communication control apparatus (first communication carrier) 300 records, to the device management database 340, information indicating that the contract authentication information is given to the wireless communication apparatus 400, and updates the device management database 340 (623). More specifically, the device management database 340 records information indicating that the contract authentication information is given to the wireless communication apparatus 400, and the device management database 340 is updated accordingly (623).

After the connection processing is completed (621), the wireless communication apparatus 400 is in the connection state (622) with the communication control apparatus (first communication carrier) 300 on the basis of the given contract authentication information. Therefore, the wireless communication apparatus 400 connects to the information processing apparatus 200 via the communication control apparatus (first communication carrier) 300, and can perform communication processing with the information processing apparatus 200 (624 to 626). More specifically, the wireless communication apparatus 400 is in the state of capable of using the communication service (download of content) via the network (for example, the Internet) 110 (624 to 626). For example, the downloading screen 510 as shown in FIG. 12a is displayed. As described above, the user of the wireless communication apparatus 400 can use the contract authentication information given by the service providing company 50 to download the content provided by the service providing company 50 in such state that the communication expense is free-of-charge.

As described above, the wireless communication apparatus 400 performs communication processing (download processing of content) to communicate with the information processing apparatus 200 via the communication control apparatus (first communication carrier) 300 (624 to 626).

In this case, as described above, the connection credit given by the service providing company 50 can be used for other services for the predetermined amount of communication. Therefore, during this communication processing, the user can use the given connection credit to use other services. For example, the user causes a display screen for using another service to be displayed using the operation unit 460 of the wireless communication apparatus 400. For example, the user causes the search screen 515 as shown in FIG. 12b to be displayed on the display unit 470. Then, on the search screen 515, the user can search a desired Web site, and can use the desired service.

For example, the user can cause the display screen 520 as shown in FIG. 13a to be displayed on the display unit 470, and the user can view the news displayed on the display screen 520. For example, each of these services is provided by an apparatus other than the information processing apparatus 200 (for example, the information processing apparatuses 130 and 140 as shown in FIG. 10). When the particular service provided by the information processing apparatus 200 or services other than the particular service are used, the count unit 320 of the communication control apparatus (first communication carrier) 300 counts the amount of communication. Then, the count unit 320 distinguishes, from each other, the amount of communication of the particular service and non-particular service communication amount, and stores the amount of communication of the particular service and non-particular service communication amount to the communication amount management database 350.

In this case, suppose that non-particular service communication amount is more than the upper limit value. For example, the control unit 360 of the communication control apparatus (first communication carrier) 300 compares the content of the communication control condition database 330 and the content of the communication amount management database 350. Then, the control unit 360 determines whether non-particular service communication amount 357 is more than the upper limit value (free-of-charge communication permission amount 338 for the service other than the designated service shown in FIG. 6). When non-particular service communication amount 357 is more than the upper limit value, the control unit 360 causes the notification to be displayed on the display unit 470 of the wireless communication apparatus 400. For example, the free-of-charge communication end notification screen 522 shown in FIG. 13b is displayed.

As described above, when the free-of-charge communication end notification screen 522 is displayed, the user of the wireless communication apparatus 400 determines whether the given connection credit is to be returned or not. For example, when the given connection credit is to be immediately returned, the YES button 524 is pressed down. For example, after the YES button 524 is pressed down, the given connection credit is immediately returned, and the connection credit returning notification screen 526 as shown in FIG. 14*a* is displayed. In this case, for the content being downloaded, the download processing is performed using the original connection credit.

On the other hand, in a case where the given connection credit is to be returned after the download processing of the content which is currently being downloaded is finished, the NO button 525 is pressed down. In this case, the connection credit returning plan notification screen 528 as shown in FIG. 14*b* is displayed, and the download processing of the current content is performed, and thereafter, the connection credit given by the service providing company 50 is returned.

As described above, the point in time when the communication processing is finished can be detected on the basis of the user operation (627). The control unit 360 of the communication control apparatus (first communication carrier) 300 may detect the point in time when non-particular service communication amount becomes more than the upper limit value as the point in time when the communication processing is finished, and may terminate the communication processing regardless of user's operation (628).

As described above, when the finish of the communication processing is detected (627, 628), the control unit 360 of the communication control apparatus (first communication carrier) 300 transmits the connection credit return request to the wireless communication apparatus 400 (629, 630). This connection credit return request is to request the wireless communication apparatus (wireless communication apparatus 400), to which the contract authentication information is given, to invalidate the contract authentication information.

When the connection credit return request is received (630), the control unit 430 of the wireless communication apparatus 400 performs processing (disconnection processing) for disconnecting the connection with the communication control apparatus (first communication carrier) 300, and invalidating the given contract authentication information (631). In this disconnection processing, the wireless communication apparatus 400 performs processing to invalidate the given contract authentication information and disconnect the connection with the communication control apparatus (first communication carrier) 300. It should be noted that this disconnection processing will be explained in details with reference to FIG. 18.

After the disconnection processing is finished (631), the control unit 360 of the communication control apparatus (first communication carrier) 300 records, to the device management database 340, information indicating that the contract authentication information is invalidated in the wireless communication apparatus 400. Then, the device management database 340 is updated (633). More specifically, information indicating that the contract authentication information is given to the wireless communication apparatus 400 is deleted from the device management database 340, and the device management database 340 is updated accordingly (633).

As described above, the wireless communication apparatus 400 returns back to the connection state with the communication control apparatus (first communication carrier) 300 based on the original contract authentication information (632).

Subsequently, the control unit 360 of the communication control apparatus (first communication carrier) 300 performs charge processing for charging the wireless communication apparatus 400 on the basis of the counted value recorded in the communication amount management database 350 (634). In this example, the communication based on the given connection credit is not charged (for example, the content of 337 corresponding to the service ID 331 "1236" shown in FIG. 6). Therefore, the amount charged to the wireless communication apparatus 400 is zero yen.

As described above, when the amount of communication (357 shown in FIG. 8) recorded in the communication amount management database 350 is more than a reference value (338 shown in FIG. 6), the control unit 360 of the communication control apparatus (first communication carrier) 300 performs control so as to invalidate the given connection credit. When the amount of communication recorded in the communication amount management database 350 is more than the reference value, the control unit 360 of the communication control apparatus (first communication carrier) 300 performs control so as to switch from the given connection credit to the original connection credit (original contract authentication information). When the amount of communication recorded in the communication amount management database 350 is more than the reference value, the control unit 360 of the communication control apparatus (first communication carrier) 300 can permit the wireless communication apparatus 400 to use only the particular service in the communication using the given connection credit. The control unit 360 of the communication control apparatus (first communication carrier) 300 can determine whether the services other than the particular service are allowed to be used in the communication using the given connection credit on the basis of the predetermined condition (336 shown in FIG. 6).

[Example of Communication where Connection Processing is Performed]

Figure 17:
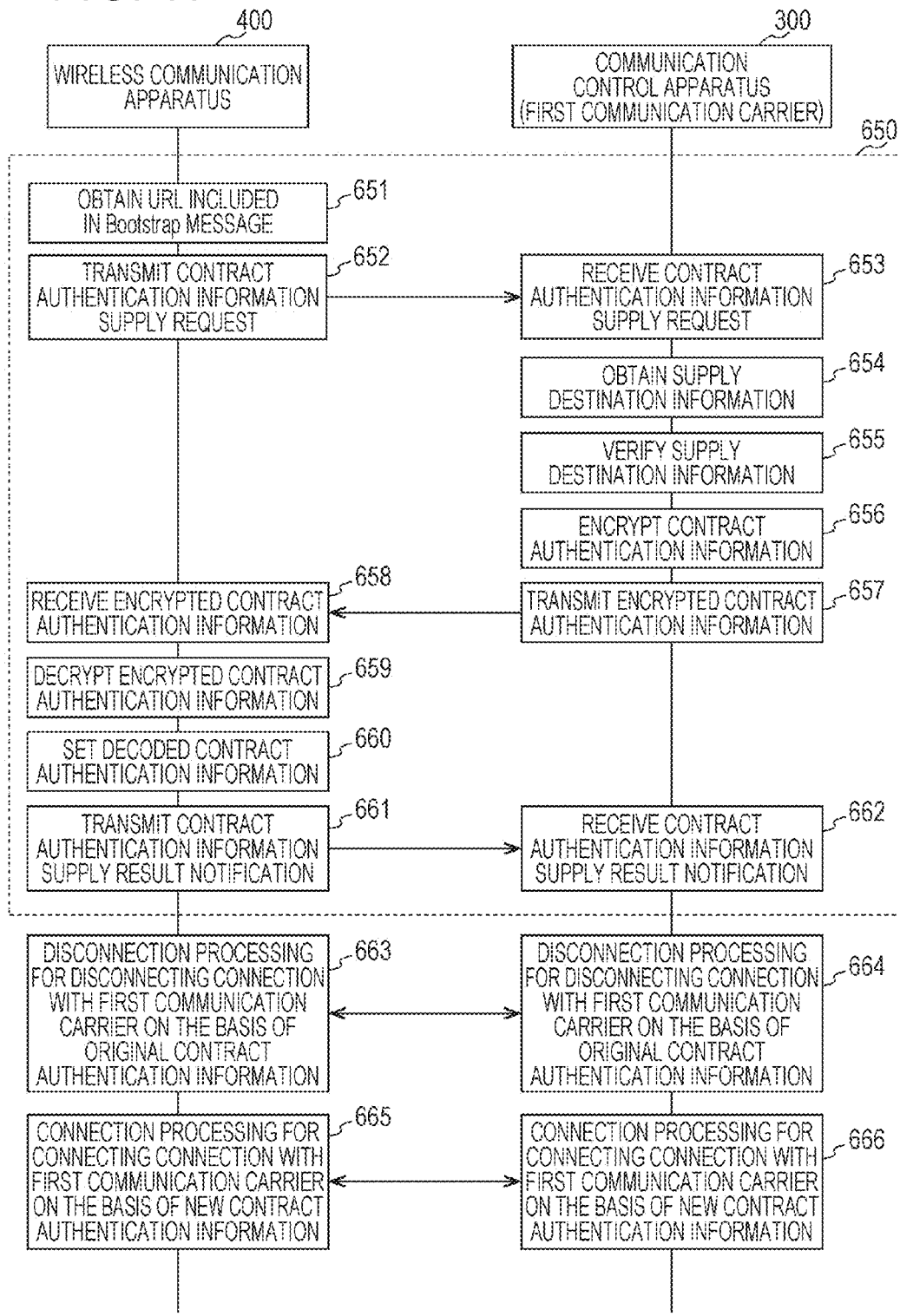
FIG. 17 is a sequence chart illustrating an example of communication processing between devices constituting the communication system 100 according to the first embodiment of the present technique.

FIG. 17 is a sequence chart illustrating an example of communication processing between the apparatuses constituting the communication system 100 according to the first embodiment of the present technique. The example of communication processing as shown in FIG. 17 is processing corresponding to the connection processing (621) as shown in FIG. 16. More specifically, this shows the example of communication processing where the wireless communication apparatus 400 obtains the contract authentication information (given contract authentication information) and connects to the communication control apparatus (first communication carrier) 300. It should be noted that communication processing encircled by a rectangular dotted line 650 is processing corresponding to Non-Patent Document 1 (5. 1. 3. 6. 3).

The control unit 430 of the wireless communication apparatus 400 receiving the Boot strap message obtains a URL included in the received Boot strap message (651). Subsequently, the control unit 430 uses the obtained URL to access the communication control apparatus (first communication carrier) 300 and transmit a contract authentication information supply request to the transmission (652, 653). This contract authentication information supply request is to request the contract authentication information to be set, and this contract authentication information supply request includes the terminal identification information of the wireless communication apparatus 400.

When the communication control apparatus (first communication carrier) 300 transmits the contract authentication information supply request (653), the control unit 360 of the communication control apparatus (first communication carrier) 300 obtains supply destination information (654). This supply destination information is, for example, each pieces of information (for example, terminal identification information) about a wireless communication apparatus which transmitted the contract authentication information supply request.

Subsequently, the control unit 360 of the communication control apparatus (first communication carrier) 300 verifies the wireless communication apparatus identified by the supply destination information thus obtained (655). In this verification, for example, a determination is performed to determine whether the wireless communication apparatus identified by the supply destination information thus obtained is a legally legitimate apparatus. For example, a determination is performed to determine whether the wireless communication apparatus identified by the supply destination information thus obtained is a stolen apparatus or an apparatus officially registered. When the control unit 360 of the communication control apparatus (first communication carrier) 300 determines that the contract authentication information should not be provided to the wireless communication apparatus identified by the received supply destination information in this verification, the notification to that effect is transmitted to the wireless communication apparatus 400.

When the control unit 360 of the communication control apparatus (first communication carrier) 300 determines that the contract authentication information can be provided to the wireless communication apparatus identified by the received supply destination information in this verification (655), then the control unit 360 encrypts the contract authentication information which is to be provided to the wireless communication apparatus (656). Subsequently, the control unit 360 transmits the encrypted contract authentication information to the wireless communication apparatus (wireless communication apparatus 400) which have transmitted the contract authentication information supply request (657, 658).

When the wireless communication apparatus 400 receives the encrypted contract authentication information (658), the control unit 430 of the wireless communication apparatus 400 decrypts the encrypted contract authentication information (659). Subsequently, the control unit 430 sets the decrypted contract authentication information (660). More specifically, the control unit 430 stores the decrypted contract authentication information to the contract authentication information memory unit 450, so that the decrypted contract authentication information is in a usable state (provisioning) (660).

Subsequently, the control unit 430 transmits the contract authentication information supply result notification (provisioning result) to the communication control apparatus (first communication carrier) 300 (661, 662).

After the decrypted contract authentication information has been set (660), the control unit 430 of the wireless communication apparatus 400 performs disconnection processing for disconnecting connection with the communication control apparatus (first communication carrier) 300 based on the original contract authentication information (663, 664). During this disconnection processing, the terminal identification information about the wireless communication apparatus 400 may be notified from the wireless communication apparatus 400 to the communication control apparatus (first communication carrier) 300.

Subsequently, after the disconnection processing of the wireless communication apparatus 400 and communication control apparatus (first communication carrier) 300 is finished (663, 664), the connection processing is performed (665, 666). More specifically, the control unit 430 of the wireless communication apparatus 400 performs connection processing for establishing connection with the communication control apparatus (first communication carrier) 300 based on the given contract authentication information (665, 666). During this connection processing, the terminal identification information about the wireless communication apparatus 400 may be notified from the wireless communication apparatus 400 to the communication control apparatus (first communication carrier) 300.

[Example of Communication where Disconnection Processing is Performed]

Figure 18:
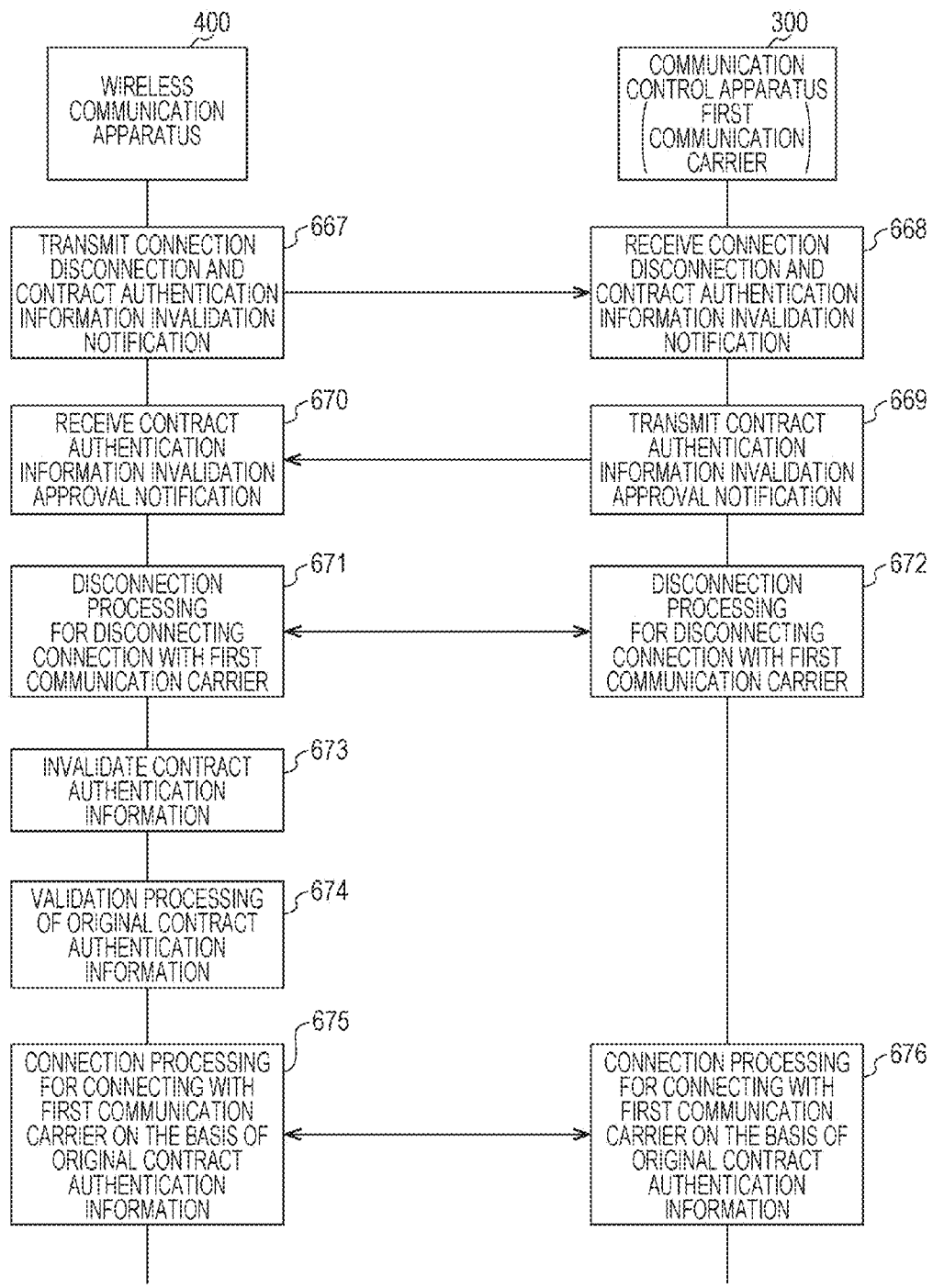
FIG. 18 is a sequence chart illustrating an example of communication processing between devices constituting the communication system 100 according to the first embodiment of the present technique.

FIG. 18 is a sequence chart illustrating an example of communication processing between the apparatuses constituting the communication system 100 according to the first embodiment of the present technique. The example of communication processing shown in FIG. 18 is processing corresponding to the disconnection processing (631) shown in FIG. 16. More specifically, this illustrates an example of communication processing when the wireless communication apparatus 400 disconnects connection with the communication control apparatus (first communication carrier) 300 based on the given contract authentication information.

The control unit 430 of the wireless communication apparatus 400 disconnects connection with the communication control apparatus (first communication carrier) 300, and transmits the connection disconnection and the contract authentication information invalidation notification for invalidating the given contract authentication information to the communication control apparatus (first communication carrier) 300 (667, 668). This contract authentication information supply request includes the terminal identification information about the wireless communication apparatus 400.

When the connection disconnection and the contract authentication information invalidation notification are received (668), the control unit 360 of the communication control apparatus (first communication carrier) 300 transmits a contract authentication information invalidation approval notification indicating approval of invalidating of the contract authentication information to the wireless communication apparatus 400 (669, 670). It should be noted that the wireless communication apparatus identified by the terminal identification information included in the connection disconnection and the contract authentication information invalidation notification may not be the wireless communication apparatus to which the contract authentication information is given. In this case, the control unit 360 of the communication control apparatus (first communication carrier) 300 transmits the contract authentication information invalidation approval notification indicating approval of invalidation of the contract authentication information to the wireless communication apparatus 400 (669, 670).

When the contract authentication information invalidation approval notification is received (670), the control unit 430 of the wireless communication apparatus 400 performs disconnection processing for disconnecting the connection with the communication control apparatus (first communication carrier) 300 (671, 672). During this disconnection processing, the terminal identification information about the wireless communication apparatus 400 may be notified from the wireless communication apparatus 400 to the communication control apparatus (first communication carrier) 300.

Subsequently, the control unit 430 of the wireless communication apparatus 400 performs invalidation processing for invalidating the given contract authentication information (673). In this invalidation processing, the given contract authentication information may be continued to be held as invalid contract authentication information, or the contract authentication information itself may be deleted.

Subsequently, the control unit 430 of the wireless communication apparatus 400 performs validation processing for validating the contract authentication information (original contract authentication information) held in advance (674). More specifically, the original contract authentication information stored in the contract authentication information memory unit 450 is changed from the invalid state to the valid state. As described above, the wireless communication apparatus 400 is switched to the original contract authentication information (original connection credit).

Subsequently, the control unit 430 of the wireless communication apparatus 400 performs the connection processing for establishing the connection with the communication control apparatus (first communication carrier) 300 based on the original contract authentication information (675, 676). During this connection processing, the terminal identification information about the wireless communication apparatus 400 may be notified from the wireless communication apparatus 400 to the communication control apparatus (first communication carrier) 300.

[Example of Operation of Communication Control Apparatus]

Figure 19:
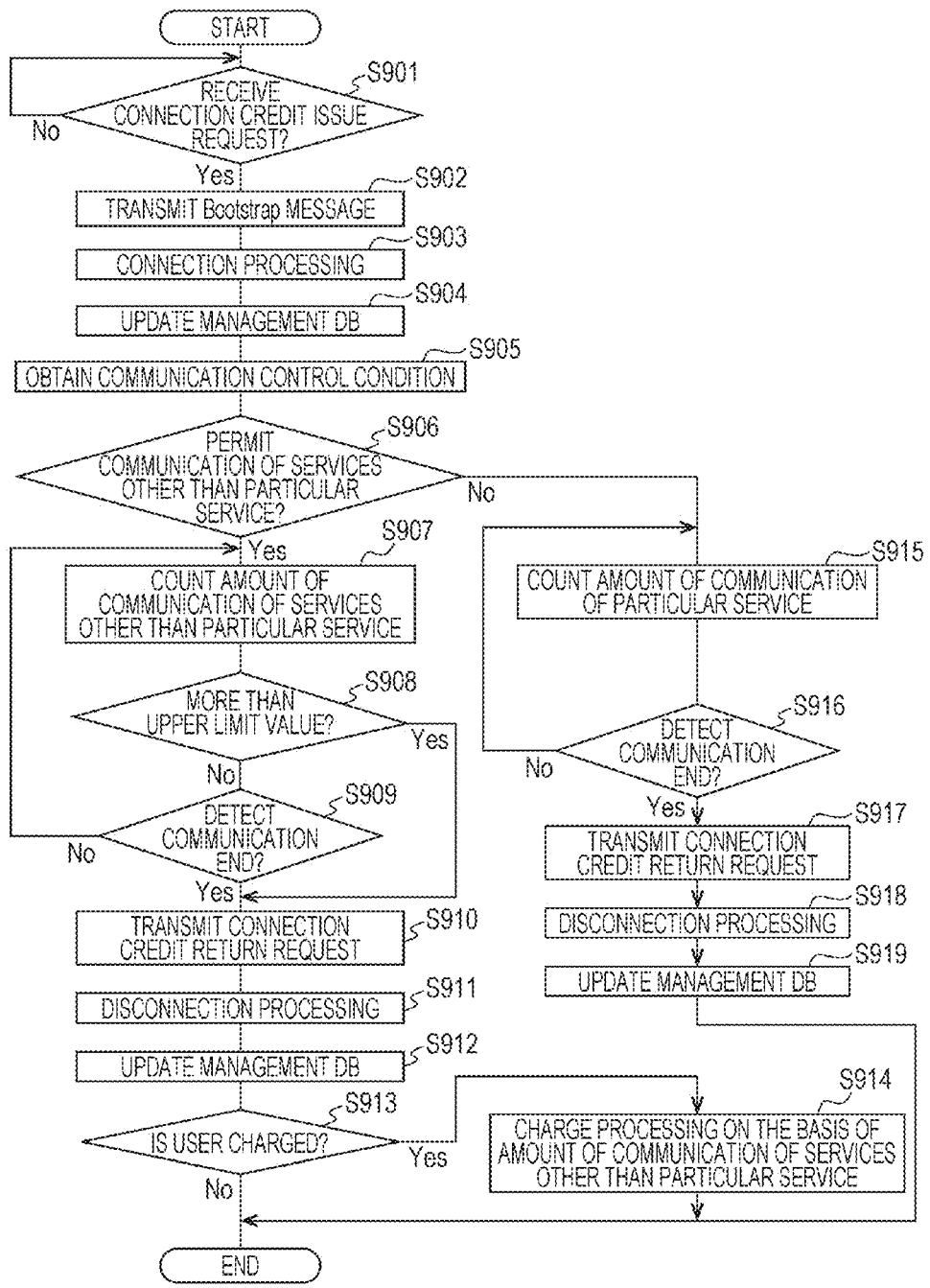
FIG. 19 is a flowchart illustrating an example of processing procedure of communication processing performed by the communication control apparatus (first communication carrier) 300 according to the first embodiment of the present technique.

FIG. 19 is a flowchart illustrating an example of processing procedure of communication processing of the communication control apparatus (first communication carrier) 300 according to the first embodiment of the present technique.

First, the control unit 360 determines whether the connection credit issue request is received or not (step S901), and when the control unit 360 determines that the connection credit issue request is not received, the control unit 360 continues to perform monitoring. On the other hand, when the control unit 360 determines that the connection credit issue request is received (step S901), the control unit 360 transmits the Boot strap message to the wireless communication apparatus related to the connection credit issue request (step S902).

Subsequently, the control unit 360 performs the connection processing with the wireless communication apparatus which transmitted the Boot strap message (step S903). This connection processing corresponds to the connection processing (621) shown in FIG. 16.

Subsequently, the control unit 360 records, to the device management database 340, information indicating that the contract authentication information is given to the wireless communication apparatus 400, and updates the device management database 340 accordingly (step S904).

Subsequently, the communication processing is performed (steps S905 to S908, S915). This communication processing corresponds to the communication processing (625) as shown in FIG. 16.

More specifically, the control unit 360 obtains, from the communication control condition database 330, the communication control condition of the service that is performed by the wireless communication apparatus which transmitted the Boot strap message (step S905). Subsequently, the control unit 360 determines whether the obtained communication control condition (for example, 336 shown in FIG. 6) permits the communication for the services other than the particular service (step S906).

The communication for the services other than the particular service is to be permitted (step S906), the count unit 320 distinguishes, from each other, the amount of communication of the particular service and the amount of communication of the services other than the particular service, and counts the amount of communication of the particular service and the amount of communication of the services other than the particular service (step S907). Subsequently, the control unit 360 determines whether the amount of communication of the services other than the particular service is more than the upper limit value (for example, 338 shown in FIG. 6) (step S908), and when the amount of communication of the services other than the particular service is determined to be more than the upper limit value, step S910 is subsequently performed.

On the other hand, when the amount of communication of the services other than the particular service is determined not more than the upper limit value (step S908), the control unit 360 determines whether the communication end is detected or not (step S909), and when the communication end is not detected, step S907 is subsequently performed again. When the communication end is detected (step S909), the control unit 360 transmits the connection credit return request to the wireless communication apparatus for which the communication end is detected (step S910).

Subsequently, the disconnection processing is performed (step S911). This disconnection processing corresponds to the communication processing (631) shown in FIG. 16.

Subsequently, the control unit 360 records, to the device management database 340, information indicating that the contract authentication information is invalidated in the wireless communication apparatus, and updates the device management database 340 (step S912).

Subsequently, the control unit 360 performs charge processing for charging the wireless communication apparatus on the basis of the counted value recorded in the communication amount management database 350 (steps S913, S914). According to the first embodiment of the present technique, the communication based on the given connection credit is not charged, but when it is charged, the charge processing is performed on the basis of non-particular service communication amount (step S914).

When the communication for the services other than the particular service is not permitted (step S906), the count unit 320 counts the amount of communication of the particular service (step S915). Subsequently, the control unit 360 determines whether the communication end is detected or not (step S916), and when the communication end is not detected, step S915 is subsequently performed again. When the communication end is detected (step S915), the control unit 360 transmits the connection credit return request to the wireless communication apparatus for which the communication end is detected (step S917).

Subsequently, the disconnection processing is performed (step S918). This disconnection processing corresponds to the communication processing (631) as shown in FIG. 16.

Subsequently, the control unit 360 records, to the device management database 340, information indicating that the contract authentication information is invalidated in the wireless communication apparatus, and updates the device management database 340 accordingly (step S919).

2. Second Embodiment

The first embodiment of the present technique shows an example where the connection credit given for the use of the particular service is allowed to be used for other services for the predetermined amount of communication. More specifically, in the first embodiment of the present technique, for example, when the amount of communication using the given connection credit (the amount of communication where the services other than the particular service are used) is more than the upper limit value, the given connection credit is invalidated. However, the user may want to use the given connection credit beyond the upper limit value. In this case, for example, the given connection credit may be allowed to be used without setting any upper limit value, and after the given connection credit is invalidated, the amount of used communication may be charged. In this case, the communication expenses of the given connection credit for the use of the other services may be borne by the service provider and the user.

Therefore, the second embodiment of the present technique shows an example where the communication expenses of the given connection credit for the use of the other services are borne by the service provider and the user. More specifically, in the second embodiment of the present technique, for example, a service corresponding to "1237" in the service ID 331 shown in FIG. 6 will be explained as an example. It should be noted that the configuration of the communication system according to the second embodiment of the present technique is substantially the same as the example as shown in FIG. 2 and the like. For this reason, the same portions are those of the first embodiment of the present technique are denoted with the same reference numerals, and some of the explanations thereabout are omitted.

[Example of Transition of Display During Content Download]

FIGS. 20a and 20b and FIGS. 21a and 21b are figures illustrating an example of a display screen displayed on a display unit 470 of a wireless communication apparatus 400 according to the second embodiment of the present technique. These display screens are displayed on the basis of, for example, information transmitted from the information processing apparatus 200.

It should be noted that each of the display screens shown in FIGS. 20a and 20b and FIGS. 21a and 21b is obtained by modifying a portion of each display screen shown in FIGS. 11a and 11b to FIGS. 14a and 14b. Accordingly, the same portions as those in each of the display screens shown in FIGS. 11a and 11b to FIGS. 14a and 14b are denoted with the same reference numerals, and explanation thereabout is omitted.

The display screen shown in FIG. 20a is the same as FIG. 11a.

FIG. 20b illustrates an example of a display screen (connection credit giving notification screen 530) that is displayed after a purchase button 503 is pressed down in a content purchase screen 500 shown in FIG. 20a.

The connection credit giving notification screen 530 is a display screen provided with a connection credit giving message display area 531 on the content purchase screen 500 shown in FIG. 20a. The display screen that is displayed after the connection credit giving notification screen 530 is displayed and the connection credit owned by the service providing company 50 of the information processing apparatus 200 is given to the wireless communication apparatus 400 is the same as those in FIGS. 12a and 12b and FIG. 13a.

In this case, according to the second embodiment of the present technique, the user can perform communication for the services other than the particular service for as much amount as the user wants. Therefore, before the use of the particular service is finished, the user can freely use the services other than the particular service. When the user finished using the particular service, the given connection credit is invalidated. An example of notification in this case is shown in FIG. 21a.

FIG. 21a illustrates an example of a display screen (particular service end notification screen 533) displayed when the use of the particular service is finished.

The particular service end notification screen 533 is a display screen provided with a particular service end message display area 534 on the downloading screen 510 shown in FIG. 12a. The particular service end message display area 534 indicates that the particular service (download of content) is finished and that switching is performed to change from the given connection credit to the original connection credit. An example of a display screen displayed after the particular service end notification screen 533 is displayed is shown in FIG. 21b.

FIG. 21b illustrates an example of a display screen (communication expense notification screen 536) displayed when the switching is performed to change from the given connection credit to the original connection credit.

The communication expense notification screen 536 is a display screen provided with a communication expense message display area 537 on the downloading screen 510 shown in FIG. 12a. The communication expense message display area 537 indicates that switching is performed to change from the given connection credit to the original connection credit and a message concerning the communication expenses which are to be borne related to the use of the given connection credit.

As described above, after the switching is performed to change from the given connection credit to the original connection credit, the communication expense notification screen 536 is displayed, so that the user can easily find the communication expenses which are to be borne related to the given connection credit.

[Example of Operation of Communication Control Apparatus]

Figure 22:
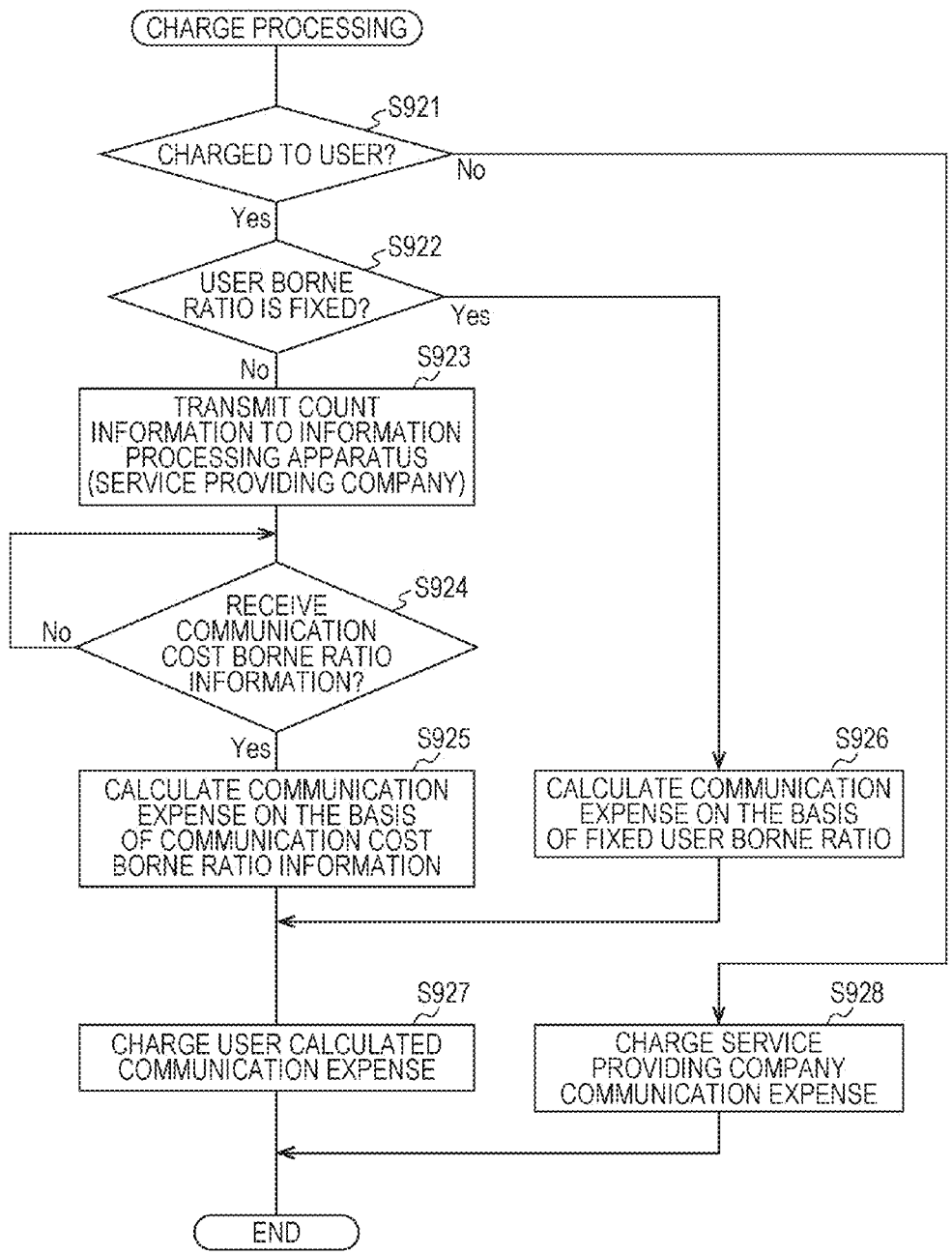
FIG. 22 is a flowchart illustrating an example of processing procedure of communication processing of the communication control apparatus (first communication carrier) 300 according to the second embodiment of the present technique.

FIG. 22 is a flowchart illustrating an example of processing procedure of communication processing performed by the communication control apparatus (first communication carrier) 300 according to the second embodiment of the present technique. It should be noted that the processing procedure shown in FIG. 22 is a modification of processing procedure (steps S913, S914) shown in FIG. 19. Therefore, each processing other than the charge processing shown in FIG. 22 is the same as FIG. 19, and therefore, the processing is not shown here and the explanation thereabout is omitted.

First, the control unit 360 determines whether a wireless communication apparatus, which is a processing target, uses a service which is charged to the user (step S921). For example, this is determined on the basis of the content of the communication control condition database 330 (337 shown in FIG. 6). When the wireless communication apparatus, which is the processing target, uses a service which is not charged to the user (step S921), the communication expenses based on the amount of communication of the services other than the particular service are charged to the service providing company providing the particular service in question (step S928).

When the wireless communication apparatus, which is the processing target uses a service which is charged to the user (step S921), the control unit 360 determines whether the user borne ratio is fixed or not (step S922). For example, this is determined on the basis of the content of the communication control condition database 330 (339 shown in FIG. 6). When the user borne ratio of the service used by the wireless communication apparatus, which is the processing target, is fixed (step S922), the control unit 360 calculates the communication expenses of the user and the service providing company on the basis of the fixed user borne ratio (step S926). For example, when the summation of the communication expenses is 800 yen and the user borne ratio is fixed at 50% (step S922), 400 yen is calculated as the communication expenses of the user and the service providing company (step S926).

When the user borne ratio of the service used by the wireless communication apparatus, which is the processing target, is not fixed (step S922), the control unit 360 transmits the count information to the service providing company providing the service in question (for example, information processing apparatus 200) (step S923). For example, the counted value recorded to the communication amount management database 350 shown in FIG. 8 (the particular service communication amount 356, and the non-particular service communication amount 357) are transmitted as the count information.

Subsequently, the control unit 360 determines whether the communication cost borne ratio information is received or not from the service providing company (step S924), and when the control unit 360 determines that the communication cost borne ratio information is not received, the control unit 360 continues to perform monitoring. On the other hand, when the communication cost borne ratio information is received (step S924), the control unit 360 calculates the communication expenses of the user and the service providing company on the basis of the communication cost borne ratio information received (step S925). In this case, the communication cost borne ratio information is information including the user borne ratio determined by the service providing company. For example, when the summation of the communication expenses is 800 yen and the user borne ratio is determined to be 40%, 320 yen is calculated as the communication expenses of the user and the communication expense of the service providing company is calculated as 480 yen.

Subsequently, the control unit 360 charges the calculated communication expense to the user (step S927). For example, the calculated communication expense is added to the communication expense 343 of the device management database 340 shown in FIG. 7, and the service providing company is also charged.

As described above, the control unit 360 performs charge processing of the wireless communication apparatus on the basis of the usage history of the wireless communication apparatus (for example, the amount of communication, and the content purchase price). For example, the control unit 360 performs charge processing for charging the wireless communication apparatus on the basis of the amount of communication of the particular service and the amount of communication of the services other than the particular service. In this case, for example, the control unit 360 can perform the charge processing for charging the service provider providing the particular service and the wireless communication apparatus on the basis of the relationship between the amount of communication of the particular service and the amount of communication of the services other than the particular service (for example, the ratio of the amounts of communications). The control unit 360 can perform the charge processing for charging the wireless communication apparatus and the service provider in accordance with the borne ratio determined by the service provider on the basis of the relationship between the amount of communication of the particular service and the amount of communication of the services other than the particular service.

3. Third Embodiment

The second embodiment of the present technique shows an example where the communication expenses of the given connection credit for the use of the other services are borne by the service provider and the user. In this case, for example, suppose a case where a user makes purchase at a price equal to or more than the predetermined price when the user uses the particular service. In such case, the communication expenses related to the use of the given connection credit (the communication expense related to the use of the services other than the particular service) are considered to be reduced according to the purchase price.

In this case, the third embodiment of the present technique shows an example where the communication expenses of the given connection credit for the use of the other services are increased or decreased according to the user's communication history. It should be noted that the configuration of the communication system according to the third embodiment of the present technique is substantially the same as the example shown in FIG. 2 and the like. Therefore, the same portions as those of the first embodiment of the present technique will be denoted with the same reference numerals, and some of the explanations thereabout are omitted.

[Example of Transition of Display During Content Download]

Figure 24:
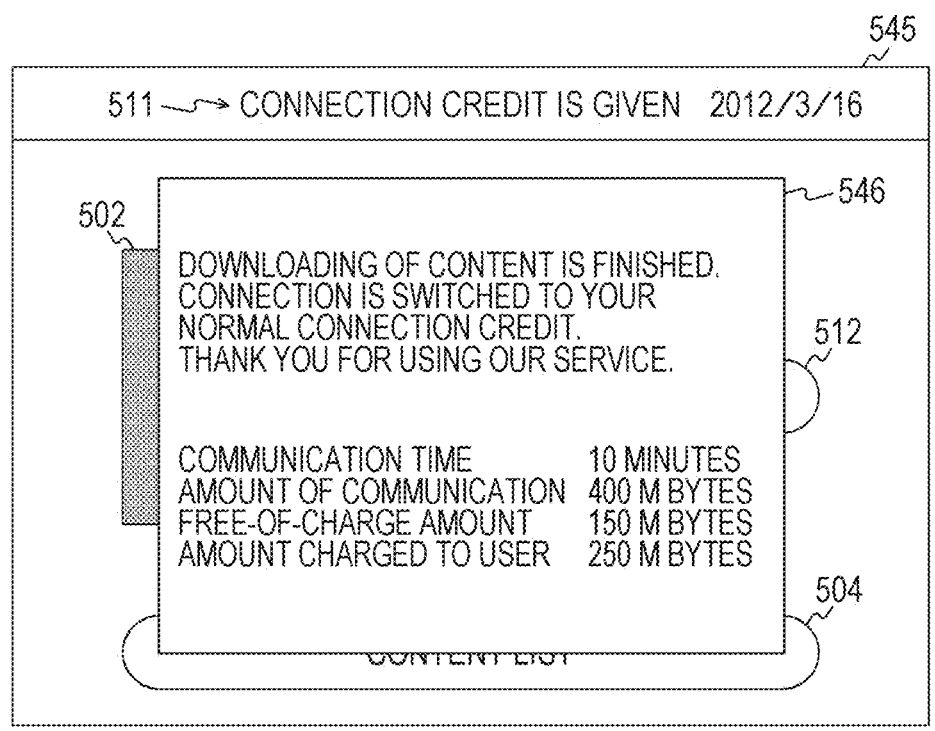
FIG. 24 is a figure illustrating an example of a display screen displayed on the display unit 470 of the wireless communication apparatus 400 according to the third embodiment of the present technique.

FIGS. 23a and 23b and FIG. 24 are figures illustrating an example of a display screen displayed on the display unit 470 of the wireless communication apparatus 400 according to the third embodiment of the present technique. The display screens are displayed on the basis of, for example, information transmitted from the information processing apparatus 200.

It should be noted that each of the display screens shown in FIGS. 23a and 23b and FIG. 24 is obtained by modifying a portion of each display screen shown in FIGS. 11a and 11b to FIGS. 14a and 14b. Accordingly, the same portions as those in each of the display screens shown in FIGS. 11a and 11b to FIGS. 14a and 14b are denoted with the same reference numerals, and explanation thereabout is omitted.

Like the first embodiment of the present technique, FIGS. 23a and 23b and 24 are examples for setting, in advance, the upper limit value of the amount of communication for which the given connection credit can be used (the amount of communication for which the services other than the particular service can be used). However, the upper limit value thereof is changed in order in accordance with the summation value of the purchase prices of the contents purchased by the user, and even when the amount of communication is more than the upper limit value, the communication can be performed continuously.

FIG. 23a illustrates an example of a display screen (content purchase screen 540) displayed after the download of content is finished, which is notified by the downloading screen 510 shown in FIG. 12a. The content purchase screen 540 is the same as the content purchase screen 500 in FIG. 11a except that the connection credit-being-given indication area 511 is displayed instead of the communication carrier display area 501, and an image representing a different content is displayed in the content display area 502. More specifically, the content purchase screen 540 is a content purchase screen for downloading two or more contents.

FIG. 23b illustrates an example of a display screen (free-of-charge communication addition notification screen 542) displayed after the purchase button 503 is pressed down in the content purchase screen 540 as shown in FIG. 23a.

The free-of-charge communication addition notification screen 542 is a display screen provided with a free-of-charge communication addition message display area 543 on the content purchase screen 540 shown in FIG. 23a. The free-of-charge communication addition message display area 543 displays a message indicating that the amount of communication usable is added as a result of purchase of one more content. As described above, the message indicating that the amount of communication usable is added is displayed, and the user can easily find that the amount of communication usable is added is displayed.

FIG. 24 is an example of a display screen (particular service end notification screen 545) displayed when the use of the particular service is finished.

The particular service end notification screen 545 is provided with a particular service end message display area 546. The particular service end message display area 546 indicates that the particular service (download of content) is finished, and the switching is performed to change from the given connection credit to the original connection credit, and a message about the communication expenses which are to be borne related to the use of the given connection credit.

As described above, the particular service end notification screen 545 is displayed, so that the user can easily find that the switching is performed to change from the given connection credit to the original connection credit, and the communication expenses which are to be borne related to the use of the given connection credit.

[Example of Transition of Display During Content Download]

Figure 26:
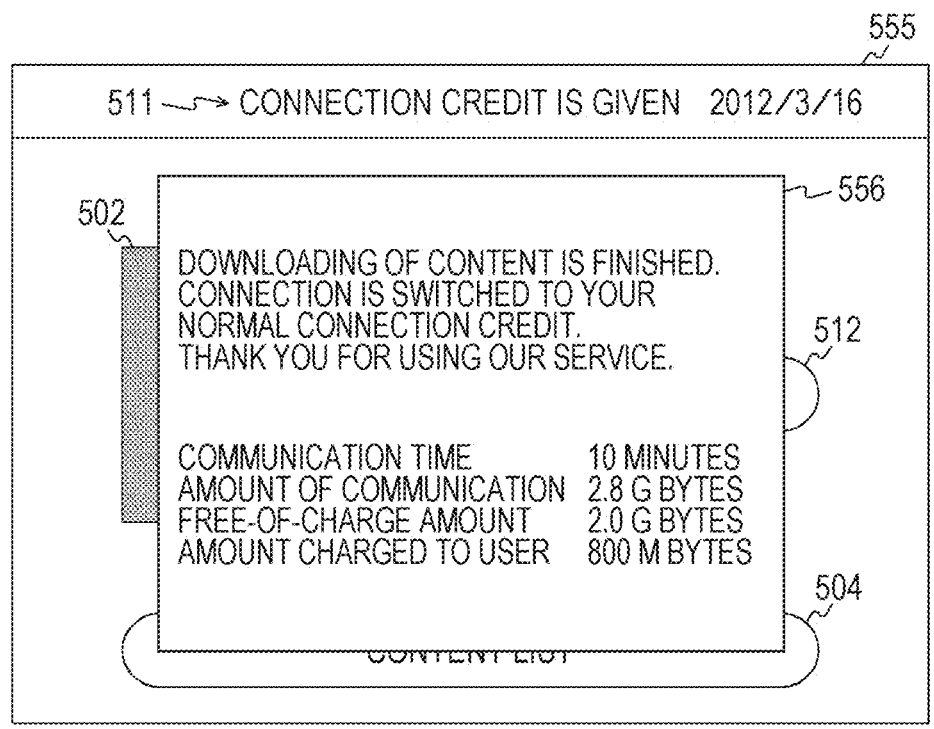
FIG. 26 is a figure illustrating an example of a display screen displayed on the display unit 470 of the wireless communication apparatus 400 according to the third embodiment of the present technique.

FIGS. 25a and 25b and 26 are figures illustrating an example of a display screen displayed on the display unit 470 of the wireless communication apparatus 400 according to the third embodiment of the present technique. Each of these display screens is displayed, for example, on the basis of each pieces of information transmitted from the information processing apparatus 200.

It should be noted that each of the display screens shown in FIGS. 25a and 25b and shown in FIG. 26 is obtained by modifying a portion of each display screen shown in FIGS. 11a and 11b to FIGS. 14a and 14b, and FIGS. 20a and 20b, and FIGS. 21a and 21b. Accordingly, the same portions as those in each of the display screens shown in FIGS. 11a and 11b to FIGS. 14a and 14b, FIGS. 20a and 20b, and FIGS. 21a and 21b are denoted with the same reference numerals, and explanation thereabout is omitted.

Like the second embodiment of the present technique, FIGS. 25a and 25b and FIG. 26 are examples for determining a borne ratio (borne ratio of the user and the service providing company) of the communication expense of the amount of communication related to the use of the given connection credit (the amount of communication related to the use of the services other than the particular service). However, the ratio thereof is changed in order in accordance with the summation value of the purchase price of the content by the user.

The content purchase screen 540 shown in FIG. 25a is the same as FIG. 23a.

FIG. 25b indicates an example of a display screen (free-of-charge communication addition notification screen 552) displayed after the purchase button 503 is pressed down in the content purchase screen 540 shown in FIG. 25a.

The free-of-charge communication addition notification screen 552 is a display screen provided with a free-of-charge communication addition message display area 553 on the content purchase screen 540 shown in FIG. 25a. The free-of-charge communication addition message display area 553 displays a message indicating that the amount of communication usable is added as a result of purchase of one more content. As described above, the message indicating that the amount of communication usable is added is displayed, so that the user can easily find that the amount of communication usable is added.

FIG. 26 illustrates an example of a display screen (particular service end notification screen 555) displayed when the use of the particular service is finished.

The particular service end notification screen 555 is provided with a particular service end message display area 556. The particular service end message display area 556 indicates that the particular service (download of content) is finished, and the switching is performed to change from the given connection credit to the original connection credit, and a message about the communication expenses which are to be borne related to the use of the given connection credit.

As described above, the particular service end notification screen 555 is displayed, and the user can easily find that the switching is performed to change from the given connection credit to the original connection credit, and the message about the communication expenses which are to be borne related to the use of the given connection credit.

[Example of Communication where Given Connection Credit is Used]

Figure 27:
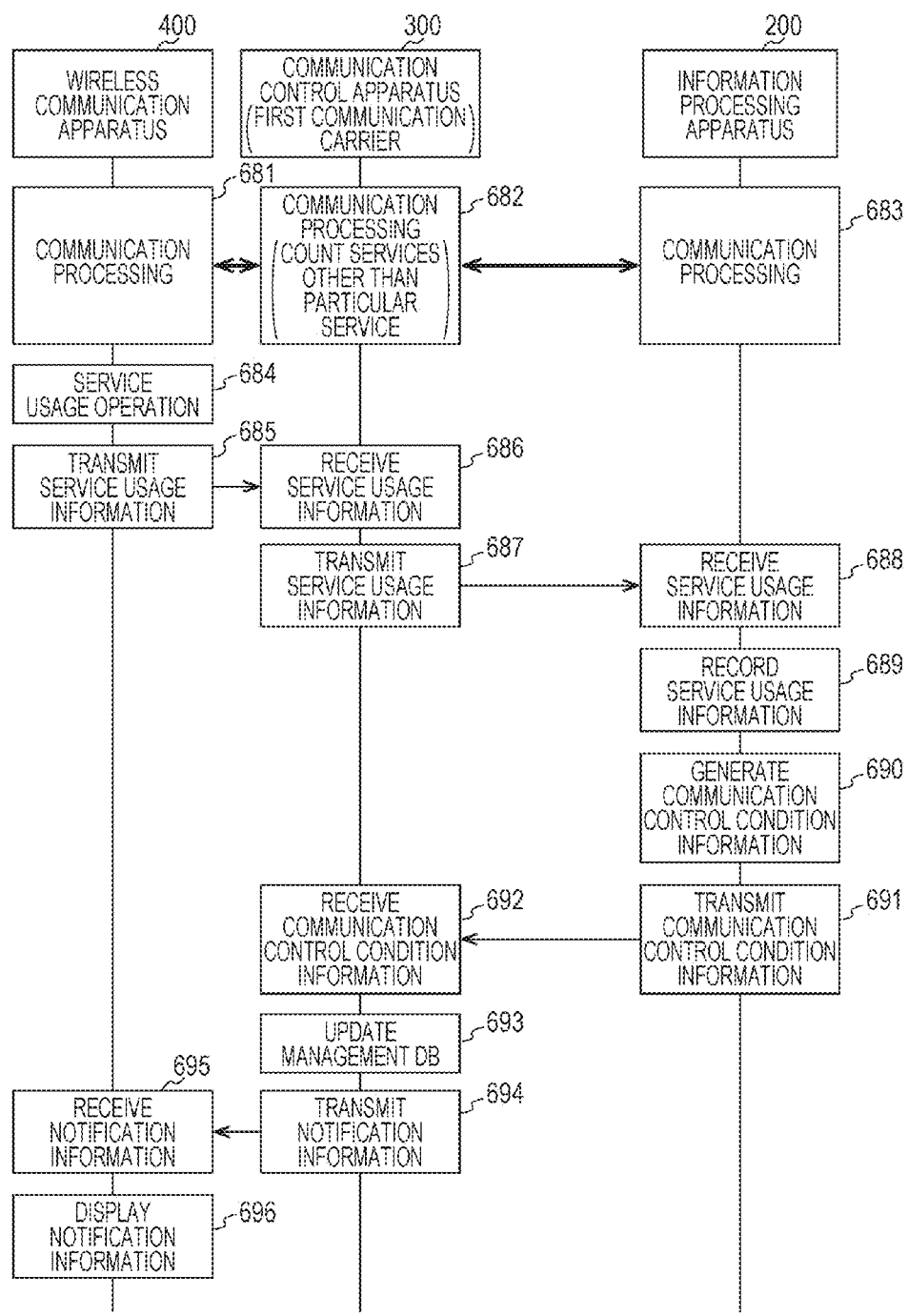
FIG. 27 is a sequence chart illustrating an example of communication processing between devices constituting the communication system 100 according to the third embodiment of the present technique.

FIG. 27 is a sequence chart illustrating an example of communication processing between the apparatuses constituting the communication system 100 according to the third embodiment of the present technique. The communication processing shown in FIG. 27 is a modification of the communication processing shown in FIGS. 15 and 16. Therefore, the same portions as those in FIGS. 15 and 16 are not shown, and the explanation thereabout is omitted.

For example, after the connection processing as shown in FIG. 16 is completed (621), the wireless communication apparatus 400 is in the connection state with the communication control apparatus (first communication carrier) 300 on the basis of the given contract authentication information. The wireless communication apparatus 400 is considered to be connected with the information processing apparatus 200 via the communication control apparatus (first communication carrier) 300, and perform the communication processing with the information processing apparatus 200 (681 to 683).

In this case, the wireless communication apparatus 400 performs the service usage operation (684). For example, the purchase button 503 is pressed down in the content purchase screen 540 shown in FIG. 23a (684). When the service usage operation is performed (684), the service usage information is transmitted to the information processing apparatus 200 (685 to 688).

In a case where the information processing apparatus 200 receives the service usage information (688), the control unit 250 of the information processing apparatus 200 records the service usage information to the service management database 240 (689). For example, it is recorded to the usage history information 244 of the service management database 240 shown in FIG. 4.

Subsequently, the control unit 250 of the information processing apparatus 200 generates communication control condition information on the basis of the usage history information 244 of the service management database 240

(690). For example, when the purchase operation for purchasing one more content is performed as service usage operation, the amount of communication which can be performed free-of-charge is calculated for the purchase, and this calculated amount of communication which can be performed free-of-charge (for example, communication control condition information including the amount of communication which can be performed free-of-charge as shown in FIG. 23b, FIG. 25b) is generated (690). Subsequently, the control unit 250 of the information processing apparatus 200 transmits the generated communication control condition information to the communication control apparatus (first communication carrier) 300 (691, 692).

When the communication control apparatus (first communication carrier) 300 receives the communication control condition information (692), the control unit 360 of the communication control apparatus (first communication carrier) 300 updates the communication control condition database 330 according to the communication control condition information (693). For example, when the communication control condition information includes the amount of communication which can be performed free-of-charge, the content of 338 shown in FIG. 6 is added by the amount of communication which can be performed free-of-charge (693). It should be noted that this addition may be valid only for the communication currently performed, or may be valid also for the communication subsequent thereto.

Subsequently, the control unit 360 of the communication control apparatus (first communication carrier) 300 transmits the notification information related to the update of the communication control condition database 330 to the wireless communication apparatus 400 (694, 695). Subsequently, the control unit 430 of the wireless communication apparatus 400 causes the received notification information to be displayed on the display unit 470 (696). For example, the free-of-charge communication addition notification screen 542 as shown in FIG. 23b and the free-of-charge communication addition notification screen 552 as shown in FIG. 25b are displayed.

As described above, during the communication processing, each processing (685 to 696) is repeatedly performed every time the wireless communication apparatus 400 performs the service usage operation (684).

As described above, the control unit 360 of the communication control apparatus (first communication carrier) 300 performs control so as to change the reference value (338 shown in FIG. 6) on the basis of the usage history related to the particular service (for example, content purchase price). When the reference value is changed, the control unit 360 of the communication control apparatus (first communication carrier) 300 performs control so as to cause the message to that effect to be output from the wireless communication apparatus 400.

The control unit 430 of the wireless communication apparatus 400 performs control so as to use the particular service and the services other than the particular service by connecting to the network 110 using the given connection credit. During this usage, the control unit 430 of the wireless communication apparatus 400 causes the display unit 470 to indicate that the predetermined condition of the usage of the services other than the particular service is changed according to the usage of the particular service (for example, the amount of communication which can be performed free-of-charge is added).

[Example of Communication where Given Connection Credit is Used]

Figure 28:
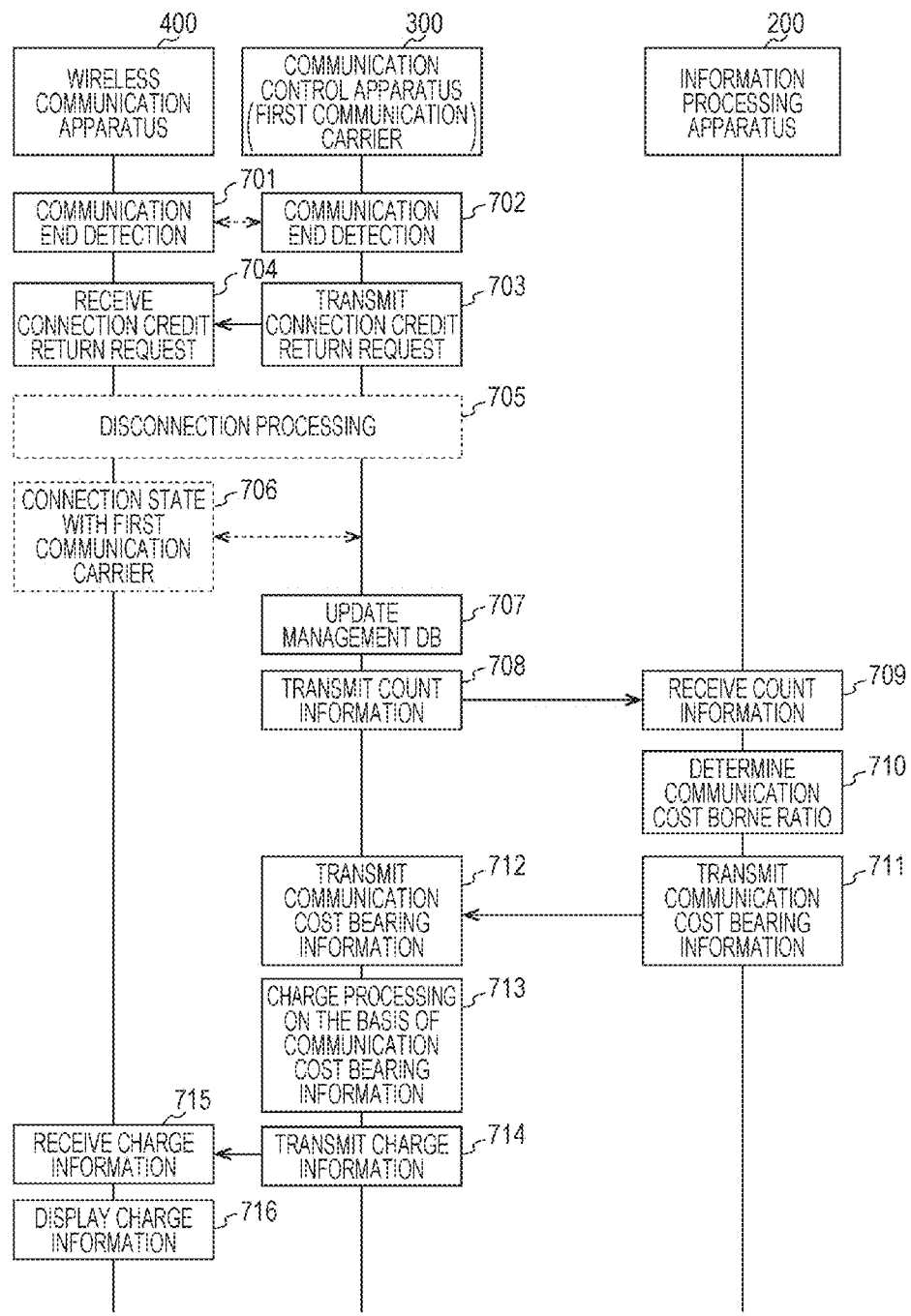
FIG. 28 is a sequence chart illustrating an example of communication processing between devices constituting the communication system 100 according to the third embodiment of the present technique.

FIG. 28 is a sequence chart illustrating an example of communication processing between the apparatuses constituting the communication system 100 according to the third embodiment of the present technique. The communication processing shown in FIG. 28 is a modification of communication processing shown in FIG. 16. Therefore, the same portions as those in FIG. 16 are not shown, and the explanation thereabout is omitted.

The processing (701 to 707) as shown in FIG. 28 corresponds to the processing (627 to 633) as shown in FIG. 16.

After the device management database 340 is updated (707), the control unit 360 of the communication control apparatus (first communication carrier) 300 transmits the count information to the service providing company (information processing apparatus 200) providing the service related to the update (708, 709). For example, the counted value recorded in the communication amount management database 350 shown in FIG. 8 (the particular service communication amount 356 and the non-particular service communication amount 357) is transmitted as the count information.

Subsequently, when the information processing apparatus 200 receives the count information (709), the control unit 250 of the information processing apparatus 200 determines the communication cost borne ratio of the user and the service providing company 50 on the basis of the received count information (710). For example, the ratio borne by the user can be reduced in accordance with the number of contents purchased. Subsequently, the control unit 250 of the information processing apparatus 200 transmits the communication cost bearing information including the determined communication cost borne ratio to the communication control apparatus (first communication carrier) 300 (711, 712).

When the communication control apparatus (first communication carrier) 300 receives the communication cost bearing information (712), the control unit 360 of the communication control apparatus (first communication carrier) 300 performs the charge processing on the basis of the received communication cost bearing information (713). For example, the charge processing (steps S925, S927) shown in FIG. 22 is performed.

Subsequently, the control unit 360 of the communication control apparatus (first communication carrier) 300 transmits, to the wireless communication apparatus 400, the charge information based on the received communication cost bearing information (714, 715). Subsequently, the control unit 430 of the wireless communication apparatus 400 causes the received charge information to be displayed on the display unit 470 (716). For example, the particular service end notification screen 545 shown in FIG. 24 or the particular service end notification screen 555 shown in FIG. 26 is displayed.

[Example of Operation of Information Processing Apparatus]

Figure 29:
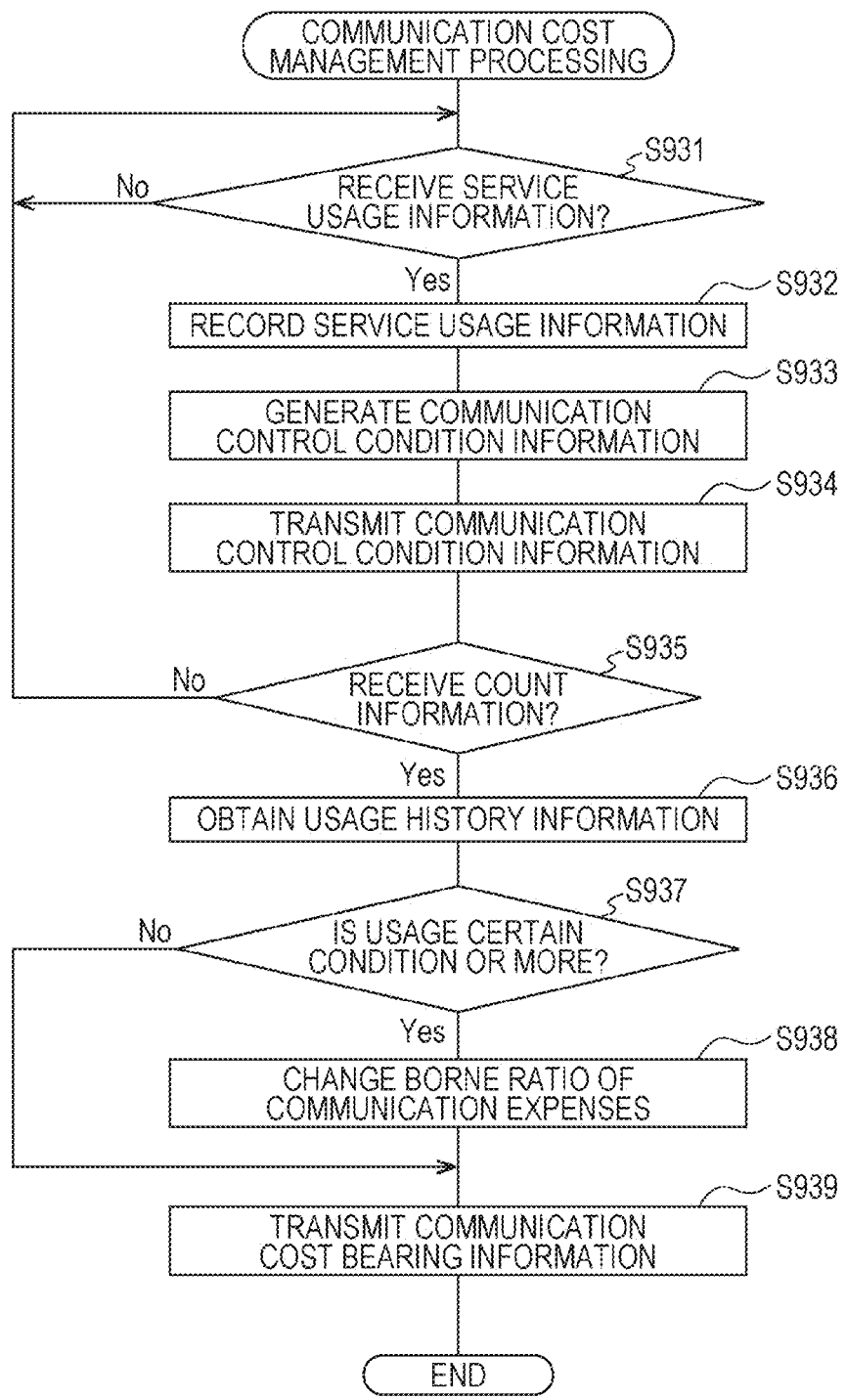
FIG. 29 is a flowchart illustrating an example of processing procedure of communication processing performed by an information processing apparatus 200 according to the third embodiment of the present technique.

FIG. 29 is a flowchart illustrating an example of processing procedure of communication processing performed by the information processing apparatus 200 according to the third embodiment of the present technique. FIG. 29 illustrates a processing procedure corresponding to the communication processing shown in FIGS. 27 and 28.

First, the control unit 250 determines whether the service usage information is received or not (step S931), and when the service usage information is not received, the control unit 250 continues to perform monitoring. On the other hand, when the service usage information is received (step S931), the control unit 250 records the service usage information to the service management database 240 (step S932).

Subsequently, the control unit 250 generates communication control condition information on the basis of the usage history information 244 of the service management database 240 (step S933). Subsequently, the control unit 250 transmits the generated communication control condition information to the communication control apparatus (first communication carrier) 300 (step S934).

Subsequently, the control unit 250 determines whether the count information is received or not (step S935), and when the count information is determined not to be received, step S931 is subsequently performed. On the other hand, when the count information is received (step S935), the control unit 250 obtains the usage history information 244 of the service management database 240 (step S936).

Subsequently, the control unit 250 determines whether the obtained usage history information satisfies certain condition or not (step S937). For example, the control unit 250 determines whether the purchase price identified by the obtained usage history information is equal to or more than a certain value (for example, 1700 yen). Then, when the obtained usage history information is determined not to satisfy the certain condition (step S937), step S939 is subsequently performed. On the other hand, when the obtained usage history information is determined to satisfy the certain condition (step S937), the control unit 250 changes the borne ratio of the communication expense on the basis of the obtained usage history information (step S938). For example, the purchase price identified by obtained usage history information is equal to or more than the certain value, the control unit 250 makes change to reduce the ratio of the communication expense borne by the user.

Subsequently, the control unit 250 transmits the communication cost bearing information (charge information) to the communication control apparatus (first communication carrier) 300 (step S939). For example, when the borne ratio of the communication expense is changed, the communication cost bearing information based on the changed borne ratio of the communication expense is transmitted. On the other hand when the borne ratio of the communication expense is not changed, the communication cost bearing information based on the borne ratio of the communication expense which is set in advance is transmitted.

As described above, with regard to the wireless communication apparatus connecting to the network 110 using the given connection credit, the control unit 250 generates charge information about the wireless communication apparatus on the basis of the usage history of the services other than the particular service and the usage history of the particular service.

4. Fourth Embodiment

The first to third embodiments of the present technique shows an example where the original connection credit and the given connection credit are managed by the same communication carrier (first communication carrier). However, the present technique embodiment can also be applied to a case where the original connection credit and the given connection credit are managed by different communication companies (for example, the first communication carrier, and the second communication carrier).

For example, a communication based on the original connection credit is used to set a given connection credit in a wireless communication apparatus. When the given connection credit is returned, a communication based on the given connection credit is used to set the original connection credit in the wireless communication apparatus again.

Accordingly, the fourth embodiment of the present technique is an example where the original connection credit and the given connection credit are managed by different communication companies. It should be noted that the configuration of the communication system according to the fourth embodiment of the present technique is substantially the same as the example as shown in FIG. 2 and the like. Therefore, the same portions as those in the first embodiment of the present technique will be denoted with the same reference numerals, and some of the explanations thereabout are omitted.

[Example of Communication where Given Connection Credit is Used]

Figure 30:
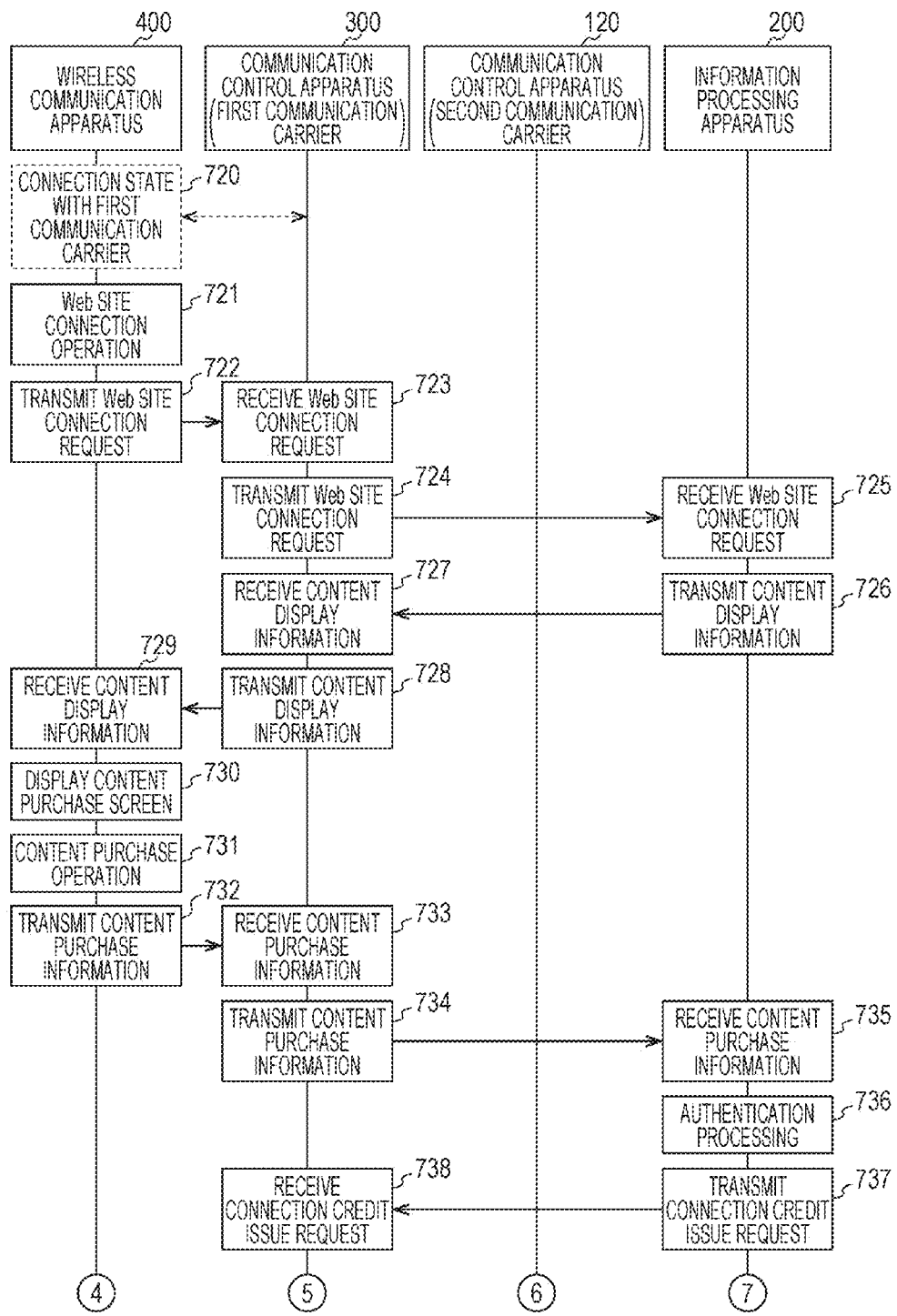
FIG. 30 is a sequence chart illustrating an example of communication processing between devices constituting a communication system 100 according to a fourth embodiment of the present technique.
Figure 31:
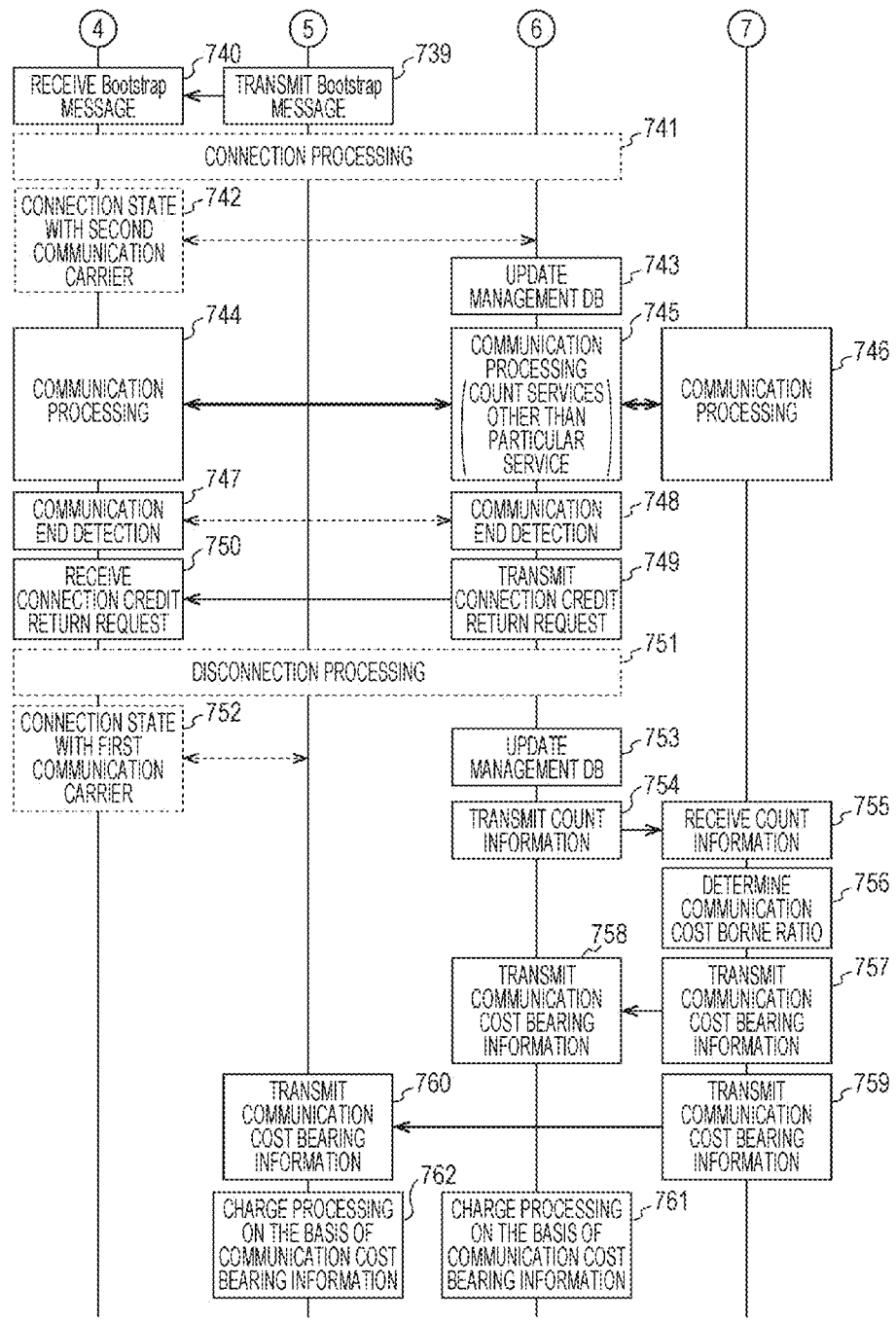
FIG. 31 is a sequence chart illustrating an example of communication processing between devices constituting the communication system 100 according to the fourth embodiment of the present technique.

FIGS. 30 and 31 are sequence charts illustrating an example of communication processing between the apparatuses constituting the communication system 100 according to the fourth embodiment of the present technique. The communication processing shown in FIGS. 30 and 31 is a modification of communication processing shown in FIGS. 15 and 16. Therefore, some of the explanations about the same portions as those in FIGS. 15 and 16 are omitted. FIGS. 30 and 31 illustrates an example where the connection credit of the communication control apparatus (second communication carrier) 120 is given to the wireless communication apparatus 400. It should be noted that the configuration of the communication control apparatus (second communication carrier) 120 is considered to be substantially the same as the communication control apparatus (first communication carrier) 300 shown in FIG. 5.

The processing shown in FIGS. 30 and 31 (720 to 740) correspond to the processing shown in FIGS. 15 and 16 (600 to 620).

When the Boot strap message is received (740), the control unit 430 of the wireless communication apparatus 400 performs processing (connection processing) to connect to the communication control apparatus (second communication carrier) 120 (reconnection using the given contract authentication information) (741). In this connection processing, the wireless communication apparatus 400 obtains the contract authentication information (given contract authentication information) and performs processing to connect to the communication control apparatus (second communication carrier) 120 again. In this connection processing, the wireless communication apparatus 400 is in the connection state (742) with the communication control apparatus (second communication carrier) 120 by using the given contract authentication information. It should be noted that the connection processing will be explained in details with reference to FIG. 32.

The processing shown in FIGS. 31 (743 to 750) corresponds to the processing shown in FIGS. 16 (623 to 630). However, the processing is different in that the connection destination of the wireless communication apparatus 400 is the communication control apparatus (second communication carrier) 120.

When the connection credit return request is received (750), the control unit 430 of the wireless communication apparatus 400 performs processing to disconnect connection with the communication control apparatus (second communication carrier) 120 and invalidate the given contract authentication information (disconnection processing) (751). In this disconnection processing, the wireless communication apparatus 400 performs processing to invalidate the given contract authentication information and disconnect the connection with the communication control apparatus (second communication carrier) 120. It should be noted that this disconnection processing will be explained in details with reference to FIG. 33.

After the disconnection processing is finished (751), the control unit (corresponding to the control unit 360) of the communication control apparatus (first communication carrier) 120 updates the device management database (corresponding to the device management database 340) (753). More specifically, the information indicating that the contract authentication information is given to the wireless communication apparatus 400 is deleted from the device management database of the communication control apparatus (first communication carrier) 120, and the device management database is updated accordingly (753).

As described above, the wireless communication apparatus 400 returns back to the connection state with the communication control apparatus (first communication carrier) 300 on the basis of the original contract authentication information (752).

The processing shown in FIGS. 31 (754 to 762) corresponds to the processing shown in FIGS. 28 (708 to 713). However, the processing is different in that the information processing apparatus 200 transmits the communication cost bearing information to the communication control apparatus (first communication carrier) 300 and the communication control apparatus (second communication carrier) 120, and each of these apparatuses perform charge processing. Like the processing shown in FIG. 28, the charge information may be transmitted from each apparatus to the wireless communication apparatus 400, and may be displayed.

[Example of Communication where Connection Processing is Performed]

FIG. 32 is a sequence chart illustrating an example of communication processing between the apparatuses constituting the communication system 100 according to the fourth embodiment of the present technique.

The example of communication processing shown in FIG. 32 is processing corresponding to the connection processing (741) shown in FIG. 31. More specifically, FIG. 31 shows an example of communication processing where the wireless communication apparatus 400 obtains the contract authentication information (given contract authentication information) and connects to the communication control apparatus (second communication carrier) 120. It should be noted that the communication processing encircled by a rectangular dotted line 770 is processing corresponding to Non-Patent Document 1 (5. 1. 3. 6. 3).

The communication processing shown in FIG. 32 is a modification of the communication processing shown in FIG. 17. Therefore, some of the explanations about the same portions as those in FIG. 17 are omitted.

The control unit 430 of the wireless communication apparatus 400 having received the Boot strap message obtains a URL included in the received Boot strap message (771). Subsequently, the control unit 430 uses the obtained URL to access the communication control apparatus (first communication carrier) 300 and transmit the contract authentication information supply request (772, 773). This contract authentication information supply request is to request setting of the contract authentication information, and includes the terminal identification information about the wireless communication apparatus 400.

When the contract authentication information supply request is received (773), the control unit 320 of the communication control apparatus (first communication carrier) 300 transmits the supply destination information to the communication control apparatus (second communication carrier) 120 (774, 775). For example, this supply destination information is each pieces of information (for example, terminal identification information) about the wireless communication apparatus which transmitted the contract authentication information supply request.

When the supply destination information is received (775), the control unit of the communication control apparatus (second communication carrier) 120 verifies the wireless communication apparatus identified by the received supply destination information (776).

The processing shown in FIGS. 32 (777 to 787) corresponds to the processing shown in FIGS. 17 (656 to 662). However, the processing is different in that information between the wireless communication apparatus 400 and the communication control apparatus (second communication carrier) 120 is exchanged via the communication control apparatus (first communication carrier) 300.

After the decrypted contract authentication information is set (783), the control unit 430 of the wireless communication apparatus 400 performs disconnection processing to disconnect connection with the communication control apparatus (first communication carrier) 300 (788, 789). In this disconnection processing, the terminal identification information about the wireless communication apparatus 400 may be notified from the wireless communication apparatus 400 to the communication control apparatus (first communication carrier) 300.

Subsequently, after the disconnection processing of the wireless communication apparatus 400 and the communication control apparatus (first communication carrier) 300 is finished (788, 789), the connection processing is performed (790, 791). More specifically, the control unit 430 of the wireless communication apparatus 400 performs the connection processing for establishing the connection with the communication control apparatus (second communication carrier) 120 on the basis of the given contract authentication information (790, 791). In this connection processing, the terminal identification information about the wireless communication apparatus 400 may be notified from the wireless communication apparatus 400 to the communication control apparatus (second communication carrier) 120.

[Example of Communication where Disconnection Processing is Performed]

FIG. 33 is a sequence chart illustrating an example of communication processing between the apparatuses constituting the communication system 100 according to the fourth embodiment of the present technique.

The example of communication processing shown in FIG. 33 corresponds to processing corresponding to the disconnection processing (751) shown in FIG. 31. More specifically, the wireless communication apparatus 400 illustrates an example of communication processing when disconnecting connection with the communication control apparatus (second communication carrier) 120 on the basis of the given contract authentication information.

The communication processing shown in FIG. 33 is a modification of communication processing shown in FIG. 18. Therefore, some of the explanations about the same portions as those in FIG. 18 are omitted.

The processing shown in FIGS. 33 (801 to 808) corresponds to the processing shown in FIGS. 18 (667 to 674). However, the processing is different in that information is exchanged between the wireless communication apparatus 400 and the communication control apparatus (second communication carrier) 120.

After the validation processing is performed (808), the control unit 430 of the wireless communication apparatus 400 performs the connection processing for establishing the connection with the communication control apparatus (first communication carrier) 300 on the basis of the original contract authentication information (809, 810). In this connection processing, the terminal identification information about the wireless communication apparatus 400 may be notified from the wireless communication apparatus 400 to the communication control apparatus (first communication carrier) 300.

As described above, according to the present technique embodiment, even when the user uses the given connection credit, the user can use the other services (the services other than the particular service designated by the service provider). In this case, the user can be appropriately charged according to a charge method configured by the service provider. For example, the service provider uses the user's service usage history (for example, the purchase price of the content) and the like to dynamically change the communication cost charged to the user, and this can promote the user to use the service. More specifically, appropriate communication service can be provided according to the user's usage.

In the present technique embodiment, for example, the contract authentication information is given on the basis of the request from the wireless communication apparatus. Alternatively, for example, the contract authentication information may be given on the basis of the control from the service provider. For example, when an electronic book content of a periodical publication is downloaded to a wireless communication apparatus, the contract authentication information is given to the wireless communication apparatus and the downloading can be done automatically when the periodical publication is issued.

In the present technique embodiment, the integrally-made information processing apparatus (the communication control apparatuses 120, 300, the information processing apparatuses 130, 140, 200, and the like) is used as an example in the explanation. However, the present technique embodiment can also be applied to even an information processing system in which the units provided in the information processing apparatus (for example, the control units 250, 360) are constituted by multiple apparatuses.

The present technique embodiment can also be applied to a portable wireless communication apparatus (for example, a data communication dedicated terminal apparatus) and a fixed-type wireless communication apparatus. For example, the present technique embodiment can be applied to a wireless communication apparatus for the purpose of data collection of vending machines, and wireless communication apparatus provided in an elevator, an automobile, an electronic device (for example, a home electric appliance, a game machine, and a digital photo frame).

The present technique embodiment can also be applied to even a connection credit for connecting to a predetermined network by using other information (for example, USIM (Universal Subscriber Identity Module)) as contract authentication information.

It should be noted that the above embodiments show examples for embodying the present technique, and the matters as described in the embodiments are respectively collated with the invention-identifying matters as described in claims. Likewise, the invention-identifying matters as described in claims are respectively collated with the matters as described in the embodiments of the present technique denoted with the same names. However, the present technique is not limited to the embodiments, and the present technique can be embodied by applying various modifications to the embodiments without deviating from the gist.

The processing procedure explained in the embodiments may be understood as a method having the series of procedure explained above, or may be understood as a program for causing a computer to execute the series of procedure explained above, or a recording medium storing the program. Examples of recording media include a CD (Compact Disc), an MD (MiniDisc), a DVD (Digital Versatile Disk), a memory card, a Blu-ray Disc (registered trademark), and the like.

It should be noted that the present technique may be configured as follows.

(1) An information processing apparatus including:
a control unit configured to perform control so as to give a wireless communication apparatus a connection credit for connecting to a predetermined network using a wireless communication, wherein the connection credit is used to provide a particular service; and
a recording unit configured to record a usage history of a service other than a particular service by the wireless communication apparatus connecting to the network using the given connection credit.

(2) The information processing apparatus according to (1), wherein the recording unit records, as the usage history, an amount of communication of the service other than the particular service.

(3) The information processing apparatus according to (2), wherein when the recorded amount of communication is more than a reference value, the control unit performs control so as to invalidate the given connection credit.

(4) The information processing apparatus according to (2), wherein when the recorded amount of communication is more than a reference value, the control unit performs control so as to switch from the given connection credit to an original connection credit.

(5) The information processing apparatus according to (2), wherein when the recorded amount of communication is more than a reference value, the control unit permits only use of the particular service as communication using the given connection credit.

(6) The information processing apparatus according to any of (3) to (5), wherein the control unit performs control so as to change the reference value on the basis of the usage history of the particular service.

(7) The information processing apparatus according to (6), wherein when the reference value is changed, the control unit performs control so as to cause the wireless communication apparatus to output information indicating that the reference value is changed.

(8) The information processing apparatus according to any of (1) to (7), wherein the control unit performs charge processing for charging the wireless communication apparatus on the basis of the usage history.

(9) The information processing apparatus according to (8), wherein the recording unit distinguishes a usage history of the particular service and a usage history of the service other than the particular service, and records the usage history of the particular service and the usage history of the service other than the particular service, and
the control unit performs the charge processing for charging the wireless communication apparatus on the basis of the usage history of the particular service and the usage history of the service other than the particular service.

(10) The information processing apparatus according to (9), wherein the control unit performs the charge processing for charging a service provider providing the particular service and the wireless communication apparatus on the basis of relationship of the usage history of the particular service and the usage history of the service other than the particular service.

(11) The information processing apparatus according to (10), wherein the control unit performs the charge processing for charging the service provider and the wireless communication apparatus in accordance with a borne ratio determined by the service provider on the basis of the relationship of the usage history of the particular service and the usage history of the service other than the particular service.

(12) The information processing apparatus according to any of (1) to (11) further including a management unit configured to manage a predetermined condition for use of the service other than the particular service, wherein the control unit determines whether use of the service other than the particular service is allowed as communication using the given connection credit on the basis of the predetermined condition.

(13) An information processing apparatus including:

a control unit configured to perform control so as to give a wireless communication apparatus a connection credit for connecting to a predetermined network using a wireless communication, wherein the connection credit is used to provide a particular service; and a generation unit configured to generate charge information for charging the wireless communication apparatus on the basis of a usage history of a service other than a particular service and a usage history of the particular service by the wireless communication apparatus connecting to the network using the given connection credit.

(14) A wireless communication apparatus including:

a communication control unit configured to perform control so as to request giving a connection credit for connecting to a predetermined network using a wireless communication, wherein the connection credit is used to provide a particular service; and a display control unit, wherein when a connection credit given in response to the request is used to connect to the network, and the particular service and the service other than the particular service are used, the display control unit displays information indicating that a predetermined condition about use of the service other than the particular service is changed in accordance with use of the particular service.

(15) A communication system including:

a wireless communication apparatus configured to request giving a connection credit for connecting to a predetermined network using a wireless communication, wherein the connection credit is used to provide a particular service; and an information processing apparatus including a control unit configured to perform control so as to give a wireless communication apparatus the connection credit, and a recording unit configured to record a usage history of a service other than a particular service by the wireless communication apparatus connecting to the network using the given connection credit.

REFERENCE SIGNS LIST

10 Communication system
20, 30 Communication control apparatus
21, 31, 121, 301 Cell site
40, 110 Network
100 Communication system
120 Communication control apparatus (second communication carrier)
130, 140, 200 Information processing apparatus
210 Communication unit
220 Service providing unit
230 Content management database
240 Service management database
250 Control unit
300 Communication control apparatus (first communication carrier)
310 Communication unit
320 Count unit
320 Control unit
330 Communication control condition database
340 Device management database
350 Communication amount management database
360 Control unit
400 Wireless communication apparatus
411 Antenna
412 Antenna duplexer
421 Modulating unit
422 Demodulating unit
430 Control unit
431 Bus
440 Memory
450 Contract authentication information memory unit
460 Operation unit
470 Display unit
480 Position information obtaining unit
491 Microphone
492 Speaker

The invention claimed is:

1. An information processing apparatus comprising:
one or more databases configured to store information associated with a wireless communication apparatus;
one or more first circuits configured to communicate with the wireless communication apparatus via a predetermined network; and
one or more second circuits configured to:
perform control so as to give the wireless communication apparatus a connection credit for connecting to the predetermined network using a wireless communication, wherein the connection credit is used to provide a particular service; and
record, in the one or more databases, a usage history of a service other than the particular service by the wireless communication apparatus connecting to the predetermined network using the given connection credit, wherein the one or more second circuits are configured to perform charge processing for charging a communication expense to the wireless communication apparatus based on a usage history of the particular service and the usage history of the service other than the particular service.

2. The information processing apparatus according to claim 1, wherein the one or more second circuits are configured to record in the one or more databases, as the usage history, an amount of communication of the service other than the particular service.

3. The information processing apparatus according to claim 2, wherein when the recorded amount of communication is more than a reference value, the one or more second circuits are configured to perform control so as to invalidate the given connection credit.

4. The information processing apparatus according to claim 2, wherein when the recorded amount of communication is more than a reference value, the one or more second circuits are configured to perform control so as to switch from the given connection credit to an original connection credit.

5. The information processing apparatus according to claim 2, wherein when the recorded amount of communication is more than a reference value, the one or more second circuits are configured to permit only use of the particular service as communication using the given connection credit.

6. The information processing apparatus according to claim 3, wherein the one or more second circuits are configured to perform control so as to change the reference value on the basis of the usage history of the particular service.

7. The information processing apparatus according to claim 6, wherein when the reference value is changed, the one or more second circuits are configured to perform control so as to cause the wireless communication apparatus to output information indicating that the reference value is changed.

8. The information processing apparatus according to claim 1, wherein the one or more second circuits are configured to:
   distinguish the usage history of the particular service and the usage history of the service other than the particular service, and
   record the usage history of the particular service in the one or more databases.

9. The information processing apparatus according to claim 8, wherein the one or more second circuits are configured to perform the charge processing for charging a service provider providing the particular service and the wireless communication apparatus on the basis of relationship of the usage history of the particular service and the usage history of the service other than the particular service.

10. The information processing apparatus according to claim 9, wherein the one or more second circuits are configured to perform the charge processing for charging the service provider and the wireless communication apparatus in accordance with a borne ratio determined by the service provider on the basis of the relationship of the usage history of the particular service and the usage history of the service other than the particular service.

11. The information processing apparatus according to claim 1, wherein the one or more second circuits are configured to manage a predetermined condition for use of the service other than the particular service, wherein the one or more second circuits are configured to determine whether use of the service other than the particular service is allowed as communication using the given connection credit on the basis of the predetermined condition.

12. An information processing apparatus comprising:
   a database configured to store a usage history of a service other than a particular service and a usage history of the particular service by a wireless communication apparatus;
   one or more first circuits configured to communicate with the wireless communication apparatus via a predetermined network; and
   one or more second circuits configured to:
      perform control so as to give the wireless communication apparatus a connection credit for connecting to the predetermined network using a wireless communication, wherein the connection credit is used to provide the particular service; and
      generate charge information for charging a communication expense to the wireless communication apparatus based on a relationship of the usage history of the service other than the particular service and the usage history of the particular service by the wireless communication apparatus connecting to the predetermined network using the given connection credit.

13. A wireless communication apparatus comprising:
   one or more circuits configured to:
      perform control so as to request giving a connection credit for connecting to a predetermined network using a wireless communication, wherein the connection credit is used to provide a particular service,
      wherein when the connection credit given in response to the request is used to connect to the predetermined network, and the particular service and a service other than the particular service are used, the one or more circuits are configured to display information indicating that a predetermined condition about use of the service other than the particular service is changed in accordance with use of the particular service; and
   a display screen configured to display a message related to communication expenses to be borne for the use of the given connection credit.

14. A communication system comprising:
   a wireless communication apparatus configured to request giving a connection credit for connecting to a predetermined network using a wireless communication, wherein the connection credit is used to provide a particular service; and
   an information processing apparatus including one or more circuits configured to:
      perform control so as to give the wireless communication apparatus the connection credit, and
      record a usage history of a service other than the particular service by the wireless communication apparatus connecting to the predetermined network using the given connection credit, wherein the one or more circuits are configured to perform charge processing for charging a communication expense to the wireless communication apparatus based on a usage history of the particular service and the usage history of the service other than the particular service.

\* \* \* \* \*